(12) United States Patent
He et al.

(10) Patent No.: US 12,061,403 B2
(45) Date of Patent: Aug. 13, 2024

(54) METHOD FOR FABRICATING SOLID STATE ELECTROCHROMIC DEVICE, SOLID STATE ELECTROCHROMIC DEVICE AND ITS APPLICATIONS

(71) Applicant: Ambilight Inc., Grand Cayman (KY)

(72) Inventors: Jiazhi He, Shenzhen (CN); Hong Wang, Shenzhen (CN); Chao Wang, Milpitas, CA (US); Yuling Li, Shenzhen (CN); Liyan You, Milpitas, CA (US); Yu Zhou, Shenzhen (CN)

(73) Assignee: Ambilight Inc., Grand Cayman (KY)

( * ) Notice: Subject to any disclaimer, the term of this patent is extended or adjusted under 35 U.S.C. 154(b) by 939 days.

(21) Appl. No.: 17/076,700

(22) Filed: Oct. 21, 2020

(65) Prior Publication Data
US 2021/0041757 A1 Feb. 11, 2021

Related U.S. Application Data

(63) Continuation-in-part of application No. 16/942,070, filed on Jul. 29, 2020, now Pat. No. 10,921,673,
(Continued)

(51) Int. Cl.
*G02F 1/161* (2006.01)
*C09K 9/02* (2006.01)
(Continued)

(52) U.S. Cl.
CPC ............... *G02F 1/161* (2013.01); *C09K 9/02* (2013.01); *G02F 1/133305* (2013.01);
(Continued)

(58) Field of Classification Search
CPC ............... G02F 1/161; G02F 1/133305; G02F 1/133553; G02F 1/13439; G02F 1/1508;
(Continued)

(56) References Cited

U.S. PATENT DOCUMENTS

| 4,938,571 A | 7/1990 | Cogan et al. |
| 5,086,351 A | 2/1992 | Couput et al. |

(Continued)

FOREIGN PATENT DOCUMENTS

| CN | 103101433 A | 5/2013 |
| CN | 104698715 A | 6/2015 |

(Continued)

OTHER PUBLICATIONS

Takahito Itoh, Yosiaki Ichikawa, Takahiro Uno, Masataka Kubo. Composite polymer electrolytes based on poly(ethylene oxide), hyperbranched polymer, BaTiO3 and LiN(CF3SO2)2. Solid State Ionics 156 (2003) 393-399 (Year: 2003).*
(Continued)

*Primary Examiner* — Collin X Beatty

(57) ABSTRACT

An electrochromic apparatus includes a first glass, a first adhesive layer disposed on the first glass, a second glass, a second adhesive layer disposed on the second glass, a solid-state electrochromic device (ECD) interposed between the first adhesive layer and the second adhesive layer, and a sealant disposed at edges of the first glass and the second glass to seal the ECD. The first adhesive layer and the second adhesive layer are disposed between the first glass and the second glass. The first adhesive layer and the second adhesive layer are optically transparent. Edges of the adhesive layers are flush with or beyond edges of the ECD. The sealant is adhesive and waterproof.

19 Claims, 22 Drawing Sheets

Related U.S. Application Data which is a continuation of application No. PCT/US2019/051112, filed on Sep. 13, 2019.

(60) Provisional application No. 62/730,977, filed on Sep. 13, 2018, provisional application No. 62/839,419, filed on Apr. 26, 2019, provisional application No. 62/839,431, filed on Apr. 26, 2019, provisional application No. 62/849,808, filed on May 17, 2019, provisional application No. 62/849,810, filed on May 17, 2019, provisional application No. 62/852,050, filed on May 23, 2019, provisional application No. 62/861,399, filed on Jun. 14, 2019.

(51) Int. Cl.

| | | |
|---|---|---|
| *G02F 1/1333* | (2006.01) | |
| *G02F 1/1335* | (2006.01) | |
| *G02F 1/1343* | (2006.01) | |
| *G02F 1/1506* | (2019.01) | |
| *G02F 1/1516* | (2019.01) | |
| *G02F 1/155* | (2006.01) | |
| *G02F 1/157* | (2006.01) | |

(52) U.S. Cl.
CPC .... *G02F 1/133553* (2013.01); *G02F 1/13439* (2013.01); *G02F 1/1508* (2013.01); *G02F 1/15165* (2019.01); *G02F 1/155* (2013.01); *G02F 1/157* (2013.01); *C09K 2211/1458* (2013.01); *G02F 1/133354* (2021.01); *G02F 2202/28* (2013.01); *G02F 2203/02* (2013.01)

(58) Field of Classification Search
CPC ...... G02F 1/15165; G02F 1/155; G02F 1/157; G02F 1/133354; G02F 2202/28; G02F 2203/02; G02F 2001/164; G02F 1/1524; G02F 1/1533; C09K 9/02; C09K 2211/1458

See application file for complete search history.

(56) References Cited

U.S. PATENT DOCUMENTS

| | | | |
|---|---|---|---|
| 5,523,180 A | 6/1996 | Armand et al. | |
| 5,883,220 A | 3/1999 | Armand et al. | |
| 6,201,071 B1 * | 3/2001 | Miura | C08G 65/22 |
| | | | 525/410 |
| 2002/0160271 A1 | 10/2002 | Frech et al. | |
| 2006/0203322 A1 | 9/2006 | Radmard et al. | |
| 2010/0238534 A1 | 9/2010 | Radmard et al. | |
| 2013/0118556 A1 | 5/2013 | Kim et al. | |
| 2014/0226201 A1 | 8/2014 | Posset et al. | |
| 2016/0266460 A1 | 9/2016 | Kloeppner et al. | |
| 2017/0018801 A1 | 1/2017 | Grubbs et al. | |
| 2018/0088426 A1 | 3/2018 | Posset et al. | |
| 2018/0100056 A1 | 4/2018 | Wang et al. | |
| 2019/0235342 A1 * | 8/2019 | Wang | E06B 9/24 |
| 2023/0140089 A1 * | 5/2023 | Lynam | G02F 1/161 |
| | | | 359/265 |

FOREIGN PATENT DOCUMENTS

| | | |
|---|---|---|
| JP | S60-48023 A | 3/1985 |
| JP | H02-105855 A | 4/1990 |
| JP | H03-196408 A | 8/1991 |
| JP | H03-238704 A | 10/1991 |
| JP | H04-507006 A | 12/1992 |
| JP | H05-047210 A | 2/1993 |
| JP | H09-324114 A | 12/1997 |
| JP | 2007-298713 A | 11/2007 |
| JP | 2014-526717 A | 10/2014 |
| JP | 2016-507082 A | 3/2016 |
| KR | 10-2017-0111939 A | 10/2017 |
| KR | 10-2018-0082213 A | 7/2018 |
| TW | 201012292 A | 3/2010 |
| WO | 2014121263 A1 | 8/2014 |

OTHER PUBLICATIONS

Koh Sing Ngai & S. Ramesh & K. Ramesh & Joon Ching Juan. A review of polymer electrolytes: fundamental, approaches and applications. Ionics (2016) 22:1259-1279 DOI 10.1007/s11581-016-1756-4. (Year: 2016).*

E.H. Cha, D.R. Macfarlane, M. Forsyth, C.W. Lee. Ionic conductivity studies of polymeric electrolytes containing lithium salt with plasticizer. Electrochimica Acta 50 (2004) 335-338. (Year: 2004).*

Liliana Hechavarría & Narcizo Mendoza & Patricia Altuzar & Hailin Hu. In situ formation of polyethylene glycol-titanium complexes as solvent-free electrolytes for electrochromic device application. J Solid State Electrochem (2010) 14:323-330 DOI 10.1007/s10008-009-0850-1 (Year: 2010).*

PCT International Search Report and the Written Opinion mailed Jan. 29, 2020, issued in related International Application No. PCT/US2019/051112 (12 pages).

Polymer Properties Database, "Glass Transition Temperatures" Database [online]. Jun. 20, 2016. [retrieved from the internet on Jul. 14, 2020]. <URL: http://polymerdatabase.com/polymer%20physics/Polymer%20Tg%20C.html>. (8 pages).

Search Report for CN Application 2019800403183, mailed Sep. 26, 2021, 2 pages.

Office Action for JP Application 2021-513409, mailed Oct. 4, 2021, 10 pages.

Search Report for EP Application 19859854.2, mailed Sep. 29, 2021, 14 pages.

Notification of Reason for Refusal for Korean Application No. 10-2021-7006507, mailed on Jul. 26, 2021, 11 pages.

* cited by examiner

1300

METHOD FOR FABRICATING SOLID STATE ELECTROCHROMIC DEVICE, SOLID STATE ELECTROCHROMIC DEVICE AND ITS APPLICATIONS

REFERENCE TO RELATED APPLICATIONS

The present application is a continuation-in-part application of U.S. patent application Ser. No. 16/942,070 filed Jul. 29, 2020, which is a continuation of International Application No. PCT/US2019/051112 filed on Sep. 13, 2019, which claims priority to U.S. Provisional Application No. 62/730,977 filed on Sep. 13, 2018, U.S. Provisional Application No. 62/839,419 filed on Apr. 26, 2019, U.S. Provisional Application No. 62/839,431 filed on Apr. 26, 2019, U.S. Provisional Application No. 62/849,808 filed on May 17, 2019, U.S. Provisional Application No. 62/849,810 filed on May 17, 2019, U.S. Provisional Application No. 62/852,050 filed on May 23, 2019, and U.S. Provisional Application No. 62/861,399 filed on Jun. 14, 2019. The entire contents of all of the above-referenced applications are incorporated herein by reference.

TECHNICAL FIELD

The present disclosure is related to methods for fabricating solid state electrochromic devices, solid state electrochromic devices, and applications of the solid state electrochromic devices.

BACKGROUND

Electrochromic devices (ECDs) has drawn a lot of interest due to its potential applications to improve functionality of homes and vehicles. Based on the use of electrolytes, ECDs can be categorized into different types, including gel, liquid, and solid-state ECDs. During the assembling of ECDs using liquid or gel electrolytes, the working electrode (WE) and counter electrode (CE) need to be separated by a spacer with the electrolyte filled into a gap between them. The cavity is then sealed by epoxy. To prevent leakage of the electrolytes from the liquid or gel-based ECDs, complicated sealing and edge designs are required. Although adding polymeric thickening agents (such as, PVA, PMMA, PVDF-HFP, etc.) to form gel electrolytes can minimize leakage issues, generally the total amount of the polymer matrix is below 20 wt. % to maintain the appropriate ionic conductivity. The majority of the electrolyte layer still contains liquid or gel, and the mechanic robustness remains a concern.

Solid state ECDs are desirable for many applications because they provide many advantages over liquid/gel-based ECDs including better safety, long lifetime, the possibility for roll to roll processing, etc.

SUMMARY

Described herein are solid state electrochromic devices, methods for fabricating solid state electrochromic devices, and applications for the solid state electrochromic devices.

In one aspect, the disclosure describes an electrochromic device. The electrochromic device includes a first flexible substrate, a first transparent electrode disposed on the first flexible substrate, an electrochromic layer disposed on the first transparent electrode, and a solid electrolyte layer disposed on the electrochromic layer. The solid electrolyte layer contains less than 20 wt % of neutral small organic molecules having a molecular weight of 3000 or less. The electrochromic device further includes an ion storage layer disposed on the solid electrolyte layer, a second transparent electrode disposed on the ion storage layer, and a second flexible substrate disposed on the second transparent electrode. In some embodiments, the solid electrolyte layer contains less than 10%, 5%, or 3% in weight of neutral small organic molecules. In some embodiments, the solid electrolyte layer is free of small organic molecules which cannot be detected by the known instruments.

In some embodiments, the first flexible substrate and the second flexible substrate include one of polyethylene terephthalate, cyclic olefin copolymer, triacetate cellulose or among others now known or later developed.

In some embodiments, the first transparent electrode and the second transparent electrode include indium-tin oxide (ITO), aluminum zinc oxide (AZO), fluorine doped tin oxide (FTO), silver nanowires, graphene, carbon nanotube, metal mesh based transparent conductive electrodes, silver-nanoparticle ink or among others now known or later developed.

In some embodiments, the ion storage layer includes one or more oxides of metal elements in Group 4-12 that are capable to store cations during the reduction reaction. Examples include, but are not limited to, oxides of Ti, V, Nb, Ta, Cr, Mo, W, Mn, Fe, Co, Ir, Ni, Cu, Zn, or any mixture of these oxides or any one of these metal oxides doped by any other metal oxides, e.g., $Nb_2O_5$ doped with 5 wt. % of $TiO_2$, among others now known or later developed. In some embodiments, the ion storage layer includes a transition-metal complex. The transition-metal complex includes, but is not limited to, one of Prussian green, Prussian white, Prussian brown or Tenshi blue $Fe4[Fe(CN)_6]_3$, ferrous oxide, ferric oxide, ferroferric oxide, $KFeFe(CN)_6$, FeNiHCF, FeHCF, NiHCF, Prussian blue nanoparticles, or $NxMy\{Fe(CN)_6\}$ where M is a metal element including Fe, Co, Ni, Mn, Zn, or Cu, among others now known or later developed, and N is an alkali metal ion. In some embodiments, the ion storage layer includes one or more of redox-active polymers including, but not limited to, redox active nitroxyl or galvinoxyl radical polymers, or conjugated polymers. In some embodiments, the ion storage layer includes composites of any of the transition-metal complexes and metal oxides, transition-metal complexes and redox active polymers, metal oxides or redox active polymers.

In some embodiments, the electrochromic layer includes one or more of $WO_3$, poly(decylviologen) and its derivatives, polyaniline and its derivatives, all kinds of electrochromic conjugated polymers such as polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and their copolymers, or their copolymers containing a certain ratio of acceptor units, such as benzothiadiazole, benzoselenadiazole, benzooxazole, benzotriazole, benzoimidazole, quinoxalines, and diketopyrrolopyrroles, and others now known or later developed.

In some embodiments, the solid electrolyte layer includes ion conducting polymers copolymerized with monomers or oligomers, wherein the monomers or oligomers have plasticizing moieties as a side chain. In some embodiments, the solid electrolyte layer includes ion conducting polymers chemically linked with plasticizing linear polymers that have a glass transition temperature less than −20° C. In some embodiments, the solid electrolyte layer includes ion conducting polymers chemically linked with plasticizing polymer blocks that have plasticizing groups as side chains. In some embodiments, the solid electrolyte layer includes brush copolymers having a main chain of soft polymers and side chains of ion-conducting species and one or more non-miscible groups. In some embodiments, additives with cross-linking functional groups can be added to enhance the mechanical modulus of the solid electrolyte layer.

In another aspect, the disclosure describes a method for forming an electrochromic device. The method includes coating a first flexible substrate with a first transparent electrode; coating, on the first flexible substrate, an electrochromic layer on the first transparent electrode; coating a second flexible substrate with a second transparent electrode; coating, on the second flexible substrate, an ion storage layer on the second transparent electrode; providing a polymer electrolyte solution or electrolyte precursor solution to a surface of the electrochromic layer, or to a surface of the ion storage layer, or to a surface of the electrochromic layer and a surface of the ion storage layer, or to the gap between a surface of the electrochromic layer and a surface of the ion storage layer; laminating the first flexible substrate with the second flexible substrate such that an area of one of the substrates is not covered by another one of the substrates; and curing the polymer electrolyte solution or the electrolyte precursor solution interposed between the electrochromic layer and the ion storage layer to form the electrochromic device.

In some embodiments, the method further includes removing materials from the first transparent electrode or the second transparent electrode at the area. In some embodiments, the method further includes attaching a circuit to the area.

In some embodiments, the polymer electrolyte solution or the electrolyte precursor solution is cured to generate an electrolyte layer having less than 20 wt % of neutral small organic molecules having a molecular weight of 3000 or less. In some embodiments, the polymer electrolyte solution or the electrolyte precursor solution is cured by pressing the coated substrates to each other at a temperature higher than 90° C. at a pressure of 30 MP-500 MP. In some embodiments, the polymer electrolyte solution or the electrolyte precursor solution may be cured at room (e.g., 1 atmosphere of pressure) temperature.

In some embodiments, the electrochromic layer is coated on the first substrate or the ion storage layer is coated on the second substrate by any one of a variety of solution-compatible coating strategies, including spray coating, spin coating, slot-die coating, slit coating, roll-to-roll coating, micro-concave coating, screen printing, transfer coating, or wire bar coating, among others now known or later developed. Some of the inorganic materials can also be fabricated via sputtering method.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

Figure 1:
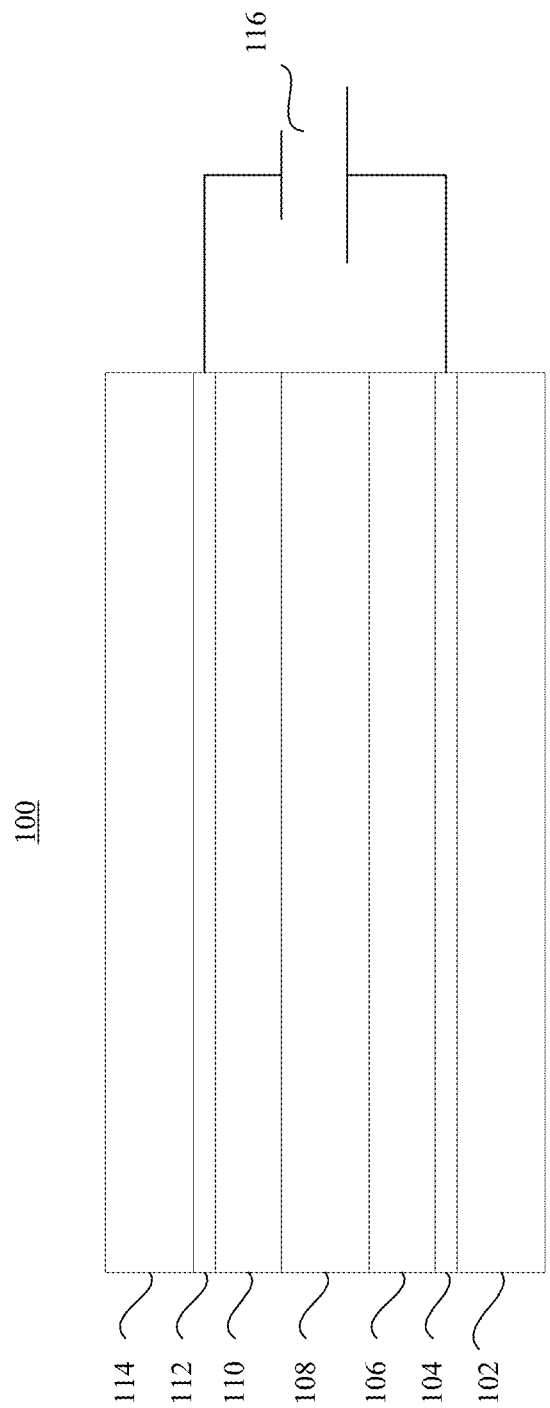
FIG. 1 is a block diagram of an electrochromic device, according to one example embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to all solid-state ECDs that use solid-state thin films for each of the working electrode and counter electrode, which are then bonded together with a high-performance transparent solid-state electrolyte formed via in-situ photo- or thermal-cross-linking process. The all-solid-state thin-film ECDs of the present disclosure display great flexibility and can be adapted to virtually any curvature or shape. In some embodiments, a thin layer (e.g., 5 μm which can be achieved using manufacturing-friendly and cost-efficient processes) of solid-state electrolyte can function as both the ionic conductor and separator of the electrodes. Due to reduced neutral small organic molecules (for example, solvent, plasticizer, ionic liquid), ECDs of the present disclosure have more stable electrolytes and electrode interfaces, resulting in a long-life cycle compared to the liquid- or gel-based ECDs. In some embodiments, a small voltage (e.g., 1.5 V) may be able to drive the ECDs consistent with the present disclosure, which is beneficial for battery-powered applications.

Embodiments will now be explained with accompanying figures. Reference is first made to FIG. 1. FIG. 1 is a block diagram of an electrochromic device 100, according to one example embodiment. The electrochromic device 100 includes a first flexible substrate 102, a first transparent electrode 104 disposed on the first flexible substrate 102, an electrochromic layer 106 disposed on the first transparent electrode 104, a solid electrolyte layer 108 disposed on the electrochromic layer 106, an ion storage layer 110 disposed on the solid electrolyte layer 108, a second transparent electrode 112 disposed on the ion storage layer 110, a second flexible substrate 114 disposed on the second transparent electrode 112, and a power supply 116 connected to the first transparent electrode 104 and the second transparent electrode 112. In some embodiments, the solid electrolyte layer 108 contains less than 20%, 10%, 5%, or 3% in weight of neutral small organic molecules having a molecular weight of 3000 or less. In some embodiments, the solid electrolyte layer 108 is free of the small organic molecules that can be detected or measured by the known instruments. In some embodiments, the solid electrolyte layer 108 may contain some organic counter ions of non-monomers/non-oligomers ingredients, such as lithium salts.

For convenience, in some instance in this disclosure, the combination of the first flexible substrate 102, the first transparent electrode 104, and the electrochromic layer 106 may be referred to as a working electrode (WE), and the combination of the second flexible substrate 114, the second transparent electrode 112, and the ion storage layer 110 may be referred to as a counter electrode (CE).

In some embodiments, the first flexible substrate 102 and the second flexible substrate 114 may be transparent substrates. Example materials for the substrates 102 and 114 include polyethylene terephthalate, cyclic olefin copolymer, triacetate cellulose, or other suitable materials now-known or later-developed. The flexible substrates 102 and 114 allow the final ECDs to be bent to fit in various cases for different applications, such as rear mirrors, windows, and sunroofs for vehicles or vessels. A thickness of the first flexible substrate 102 or the second flexible substrate 114 may be 10 to 1000 μm.

In some embodiments, the first transparent electrode 104 and the second transparent electrode 112 may be thin film materials. Example materials for the transparent electrodes 104 and 112 may include indium-tin oxide (ITO), aluminum zinc oxide (AZO), fluorine doped tin oxide (FTO), silver nanowires, graphene, carbon nanotube, metal mesh based transparent conductive electrodes, silver-nanoparticle ink for reflective device, or other suitable materials now-known or later-developed. A thickness of the first transparent electrode 104 or the second transparent electrode 112 may be 1 to 800 nm.

In some embodiments, the ion storage layer 110 may include oxides of the metal elements in Group 4-12 that are capable to store cations during the reduction reaction. Examples include oxides of Ti, V, Nb, Ta, Cr, Mo, W, Mn, Fe, Co, Jr, Ni, Cu, Zn, or any mixture of these oxides or any one of these metal oxides doped by any other metal oxides, e.g., $Nb_2O_5$ doped with 5 wt. % of $TiO_2$, or other suitable materials now-known or later-developed.

In some embodiments, the ion storage layer 110 may include transition-metal complexes that can undergo reduction reactions. The example metal complexes includes, but is not limited to, Prussian green, Prussian white, Prussian brown, Tenshi blue $Fe4[Fe(CN)_6]_3$, ferrous oxide, ferric oxide, ferroferric oxide, $KFeFe(CN)_6$, FeNiHCF, FeHCF, NiHCF, Prussian blue nanoparticles, or inorganic compound of iron $NxMy\{Fe(CN)_6\}$ where M is a metal element including Fe, Co, Ni, Mn, Zn, and Cu, among others now known or later developed and N is alkali metal ion, such as Na, K, among others now known or later developed.

In some embodiments, the ion storage layer 110 may include redox-active polymers that can store cations during the reversible reduction reaction. Example redox-active polymers may include, but not limited to, redox active nitroxyl or galvinoxyl radical polymers (e.g., poly(nitronylnitroxylstyrene) and poly(galvinoxylstyrene)), and conjugated polymers (including polyaniline, PEDOT: PSS, polypyrrole, among the others now known or later developed).

In some embodiments, the ion storage layer 110 may include composites of any combinations of the transition-metal complexes, metal oxides, and redox active polymers. A thickness of the ion storage layer 110 may be 1 nm to 10 μm.

In some embodiments, the electrochromic layer 106 may include one or more materials that can be reduced/oxidized and store counterions. The electrochromic layer 106 can be composed of one or more of the following materials including $WO_3$, poly(decylviologen) and its derivatives, polyaniline and its derivatives, all kinds of electrochromic conjugated polymers such as polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and their copolymers, or their copolymers containing a certain ratio of acceptor units, such as benzothiadiazole, benzoselenadiazole, benzooxazole, benzotriazole, benzoimidazole, quinoxalines, and diketopyrrolopyrroles, and others now known or later developed. A thickness of the electrochromic layer 106 may be 1 nm to 10 μm.

In some embodiments, the solid electrolyte layer 108 has a thickness of 0.1 um to 1000 μm. In some embodiments, the solid electrolyte layer 108 can be formed from liquid materials cured by ultraviolet (UV) light or thermal exposure, changing from liquid to solid state in the curing process. The solid electrolyte layer 108 has good ionic conductivity and stability at a high temperature over 90° C. (e.g., for the defoam process and applications). Utilizing the solid electrolyte layer 108 in the ECD 100 overcomes a series of problems that liquid or gel electrolytes have such as being easy to leak, unstable, and difficult to process, and has advantages in production and process as well as safety performance.

For ECDs, the solid electrolyte is required to be transparent. Also, suitable solid electrolytes for ECDs need to be highly conductive to transfer ions between the ion storage layer and electrochromic layer. The present disclosure proposes a solid electrolyte with high transparency, decent ion conductivity (e.g., $>10^{-6}$ S/cm), and high stability.

Conventionally, solid electrolytes have been mostly developed for lithium ion batteries. These electrolytes are generally not suitable for electrochromic devices because electrochromic devices require the electrolytes to be highly transparent, which is not the case for most solid electrolytes. Over the few available examples of transparent solid electrolytes for electrochromic devices, there are generally two types. The first type is inorganic solid electrolytes, such as lithium phosphorus oxynitride (LiPON). However, the ion conductivity of LiPON is too low (e.g., $10^{-7}$ S/cm) and LiPON can only be processed by high vacuum sputtering. The second type of solid electrolytes is composed of polymers blended with plasticizers. For examples, by blending polyethylene oxide (PEO) with succinonitrile and lithium salt, a solid electrolyte with ion conductivity as high as $10^{-4}$ S/cm can be achieved. However, during the operation process, plasticizers in the convention solid electrolyte materials can easily penetrate into the electrochromic layers and damage the device.

The present disclosure provides, among other things, a new solution in the design of solid electrolytes in which the plasticizing moieties are covalently linked onto ion-conducting polymers to form suitable solid electrolytes for electrochromic devices. The typical ion-conducting polymers such as PEO tend to crystallize, leading to the decrease of transparency and ion conductivities. By introducing plasticizing moieties into the ion-conducting polymers, the ordered packing of the polymer chains are disturbed to suppress crystallization. Therefore, the transparency and ion conductivities of the polymers can be greatly enhanced, resulting in suitable electrolytes for ECDs. The plasticizing moieties can be small molecular groups or soft polymer chains. Since these moieties are covalently linked to the polymer chains, they do not penetrate into other layers of ECDs. The proposed polymer electrolyte can have high ion conductivity, high transparency, and good stability.

In some embodiments, the solid electrolyte layer 108 may include ion conducting polymers copolymerized with monomers or oligomers, where the monomers or oligomers have plasticizing moieties as a side chain. In some embodiments, plasticizing moieties are small molecular groups linked to the side chain of a monomer or oligomer, which can further copolymerize with ion conducting polymers into solid electrolytes. Example polymer electrolytes may include, but be not limited to:

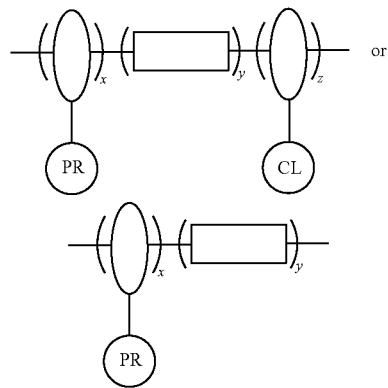 or wherein each of x, y, and z is an integer greater than 0, and

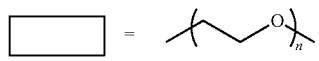

$n = 3-4000$

In some embodiments, the connection between different parts of main chain, the connection between main chain and plasticizing groups (PR), the connection between main chain and cross-linking groups (CL) may be any type of one or several organic bonds.

Example PR groups may include, but is not limited to:
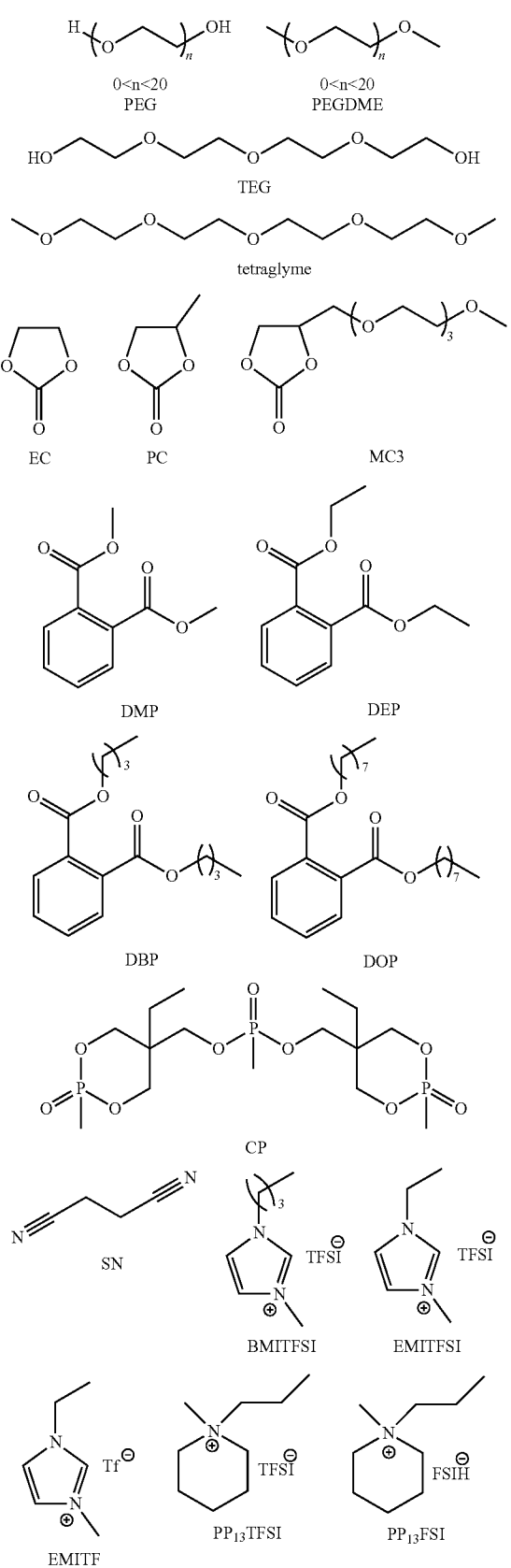
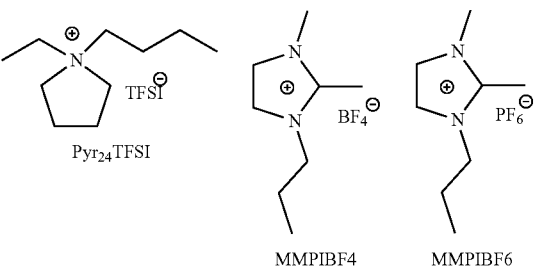
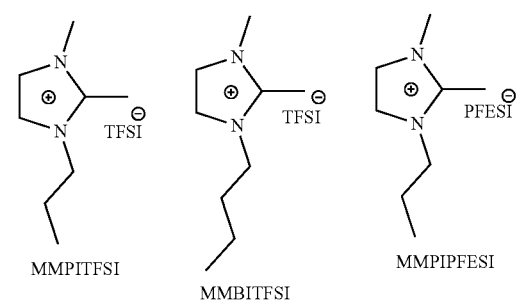
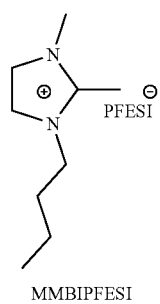
Generally, any function chemicals that can connect with two or more monomers can be used as CL groups, including, but not limited to:
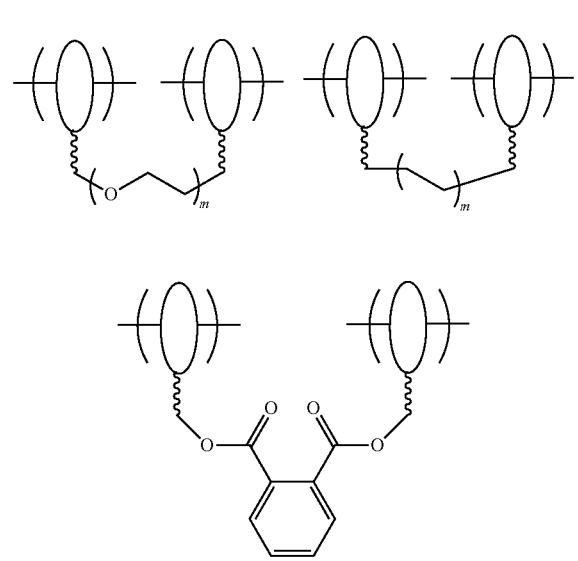

-continued

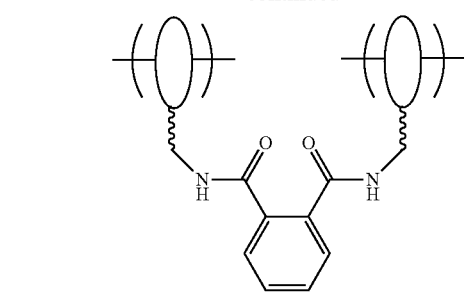

m = 1-100

-continued

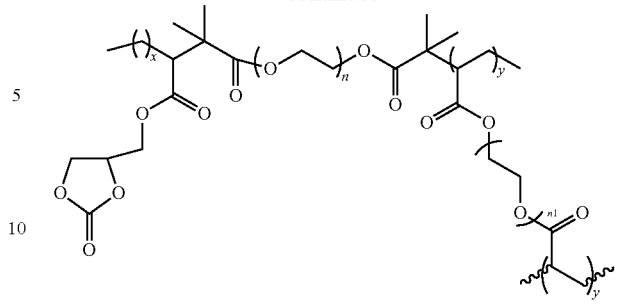

In some embodiments, to form these polymers, monomers or oligomers with the plasticizing groups as side groups are first synthesized. These monomers or oligomers are further linked with ion-conducting polymers through chain-end reactions. These plasticizing groups can reduce the crystallinity of the ion conducting polymers, enhance the ion conductivity, and improve the transparency of the polymer electrolyte. Since the addition of the plasticizing groups may also decrease the mechanical modulus of the polymers electrolytes, cross-linking parts might also be added to maintain their mechanical properties. The polymer may contain one or more types of plasticizing groups in the polymer chains.

Example synthesis processes are shown below. In some embodiments, Atom Transfer Radical Polymerization (ATRP) is employed to form the desired polymers:

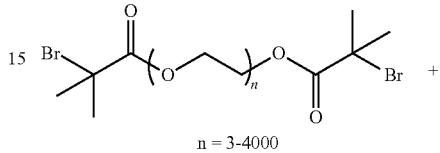

n = 3-4000

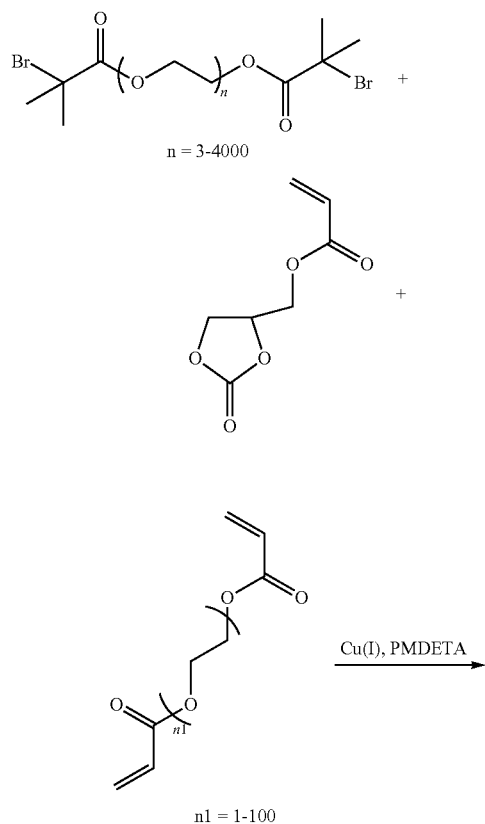

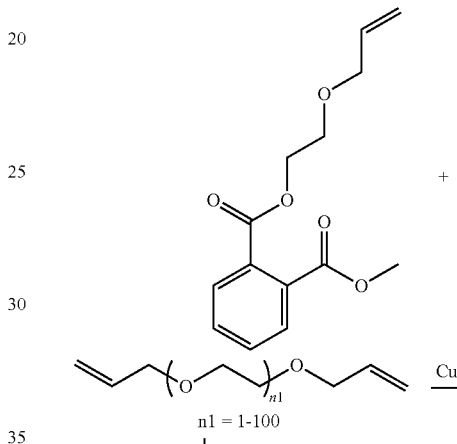

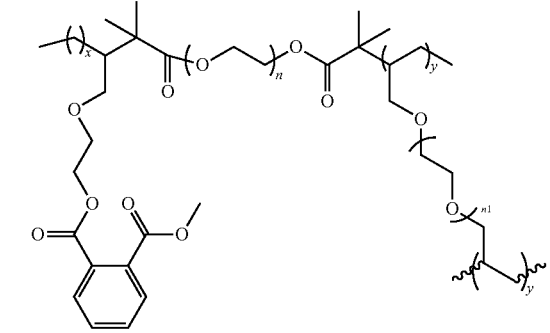

In a suitable organic solvent, solution of the mixture of end-caped PEG, carbon-carbon double bond substituted monomers with plasticizing groups, and carbon-carbon double bond substituted monomers with crosslinking groups are bubbled with nitrogen for 15 minutes. Cu(I) salt and PMDETA(N,N,N',N'',N''-Pentamethyldiethylenetriamine) are then added. This solution before polymerization is referred to as electrolyte precursor solution. The reaction is protected with nitrogen and heated to 50° C.-130° C. After a 1 hour to 48 hour reaction, the reaction mixture appears sticky. An organic phase is filtered with celite and then the solvent is removed by a rotary evaporator to obtain the product (polymer electrolyte solution). The yield is 60-95%.

In some embodiments, the mixture of all the starting materials (called precursors for electrolyte or electrolyte precursor solution) before heating can also be used for device fabrication using in-situ polymerization under heating.

In some embodiments, esterification is employed to form the desired polymers:
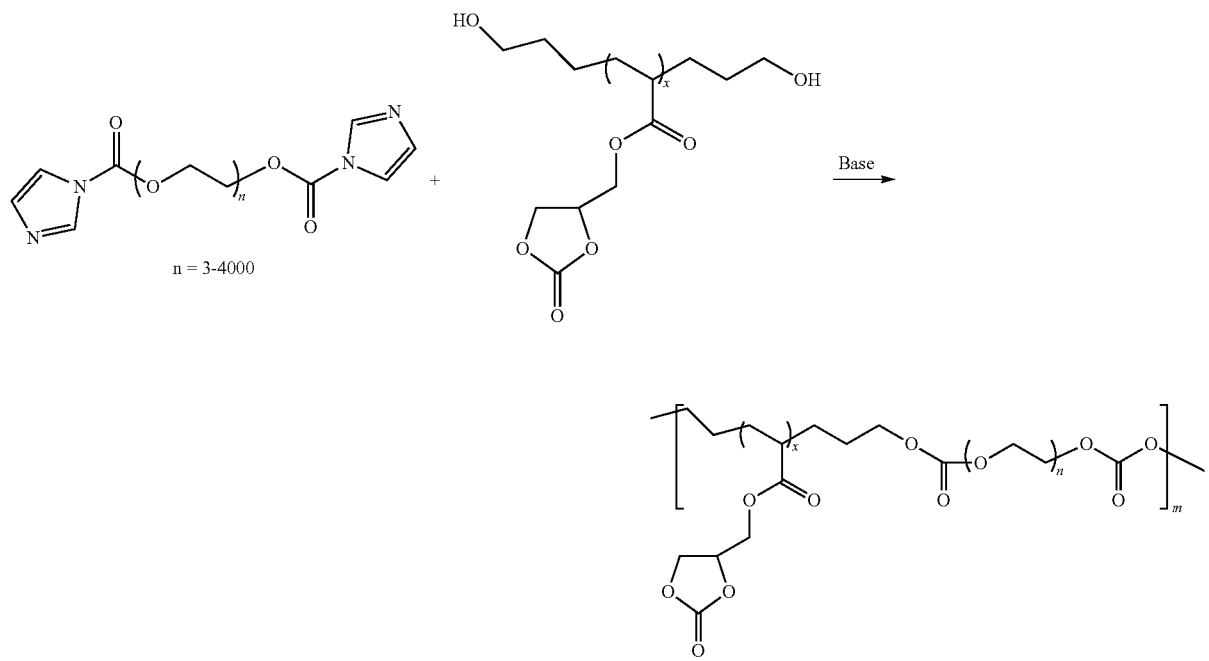
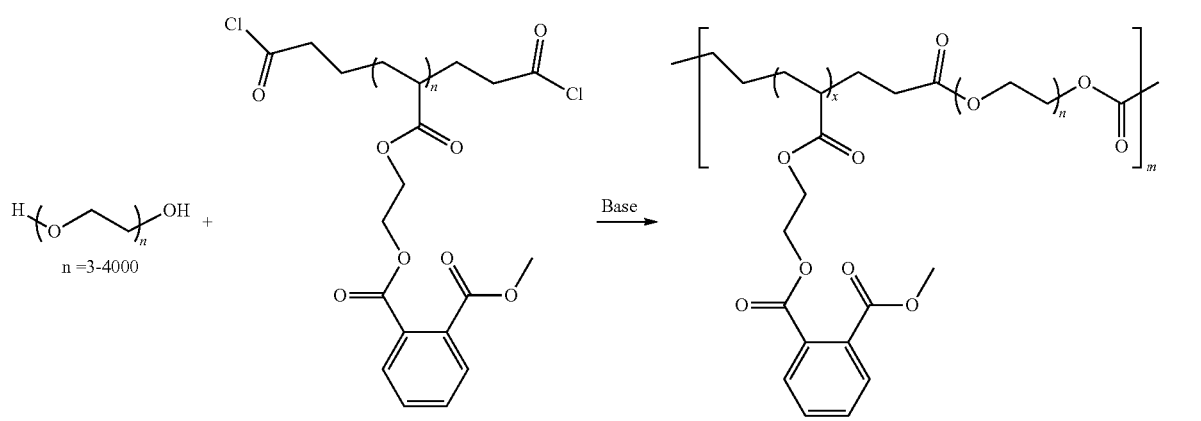
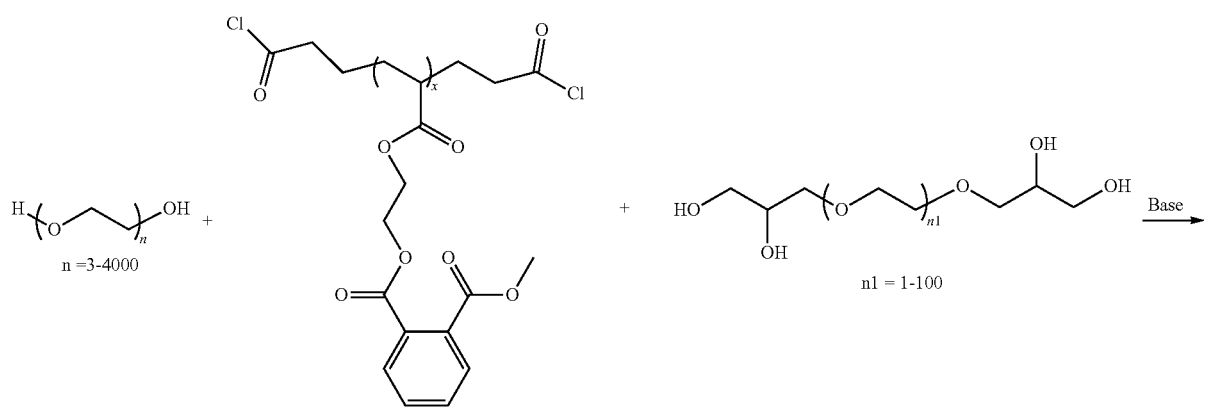

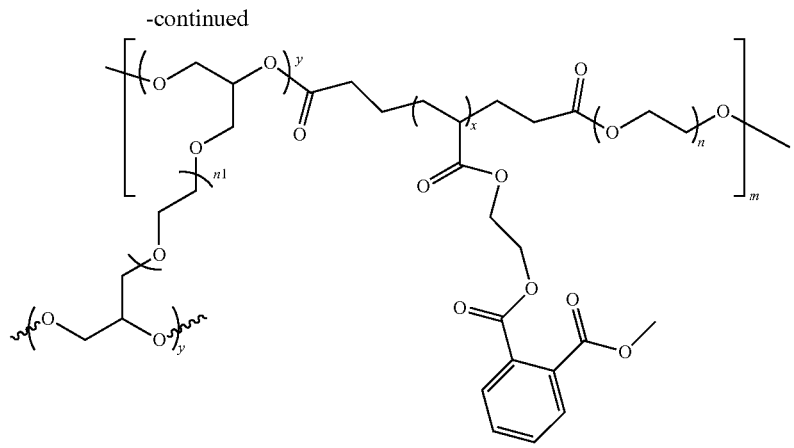

In a suitable organic solvent, solution of alcohol is added with acid chloride or active eater at −10° C. to 10° C. Base is added slowly into the mixture and the mixture is heated to 50° C. to 130° C. for the reaction. After reacting for 1 hour to 48 hours, water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, random copolymer is employed to form the desired polymers:

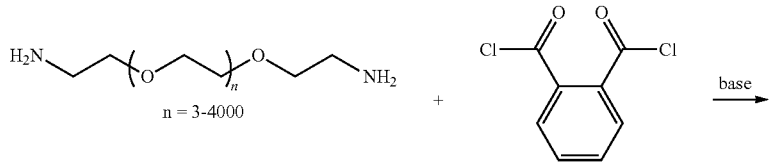

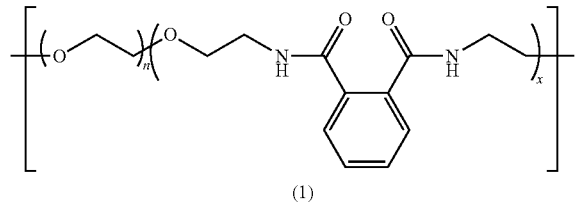

(1)

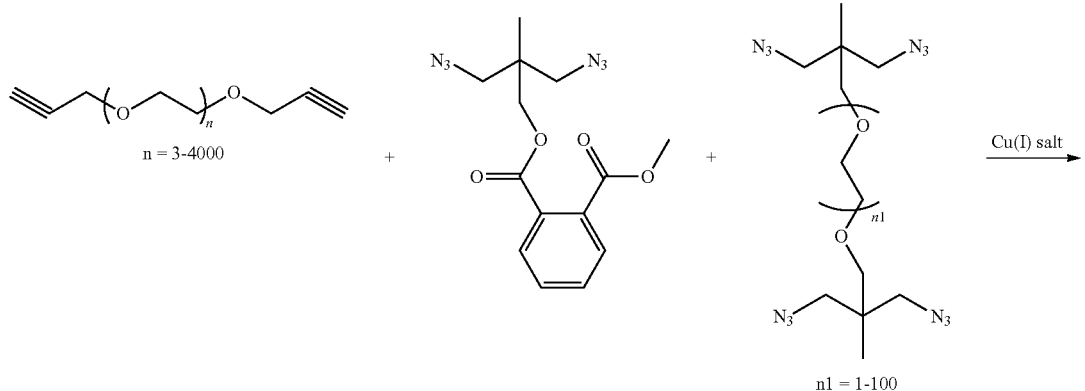

-continued

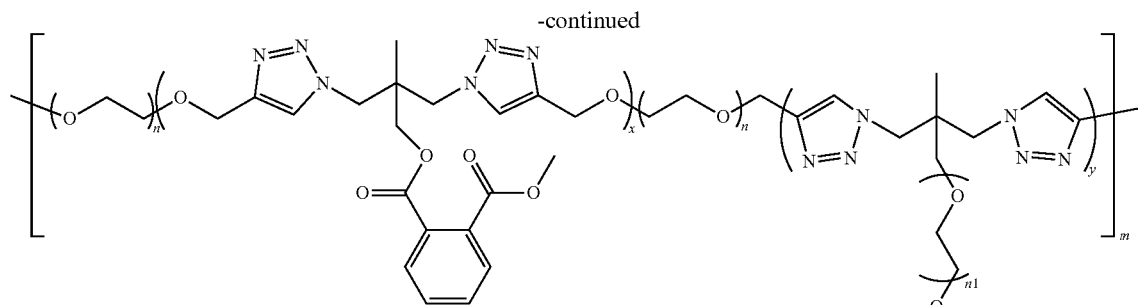

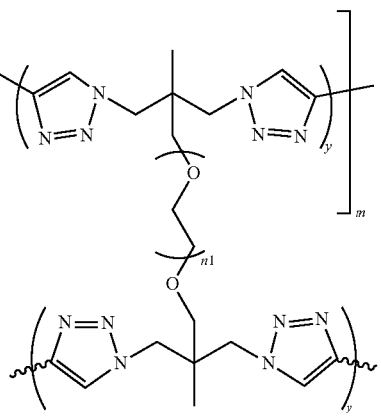

(2)

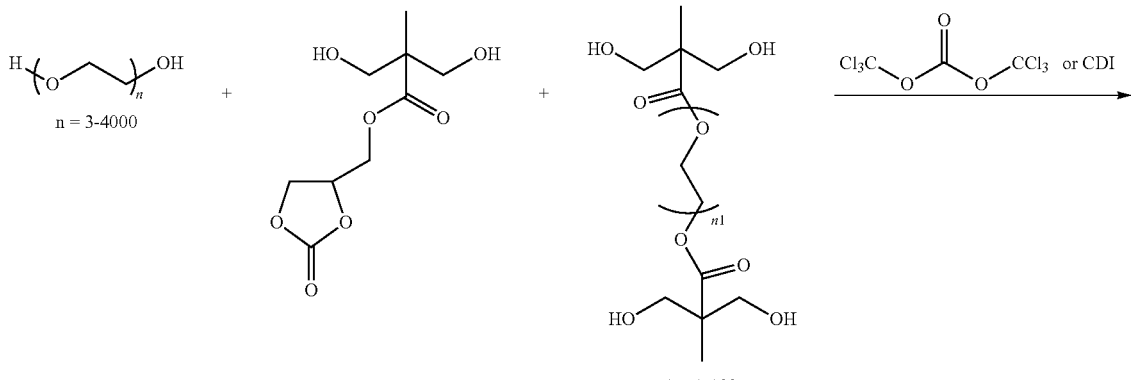

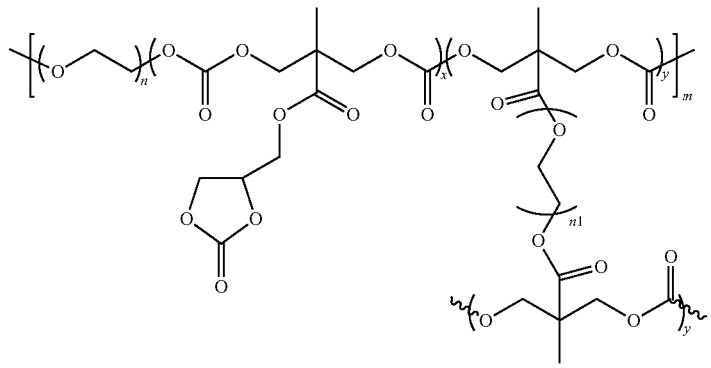

(3)

In reaction (1), in a suitable organic solvent, solution of amine is added with acid chloride at −10° C. to 10° C. Base is added slowly into the mixture, and the mixture is heated to 50° C. to 130° C. for the reaction. After reacting for 1 hour to 48 hours, water is added into the mixture. The organic phase is distilled to remove solvent and obtain the polymers. The yield is 60-95%.

In reaction (2), alkyne and azide monomer are added to a suitable organic solvent under nitrogen. Copper(I) salt is then added as catalyst. The solution is reacted at 10° C. to 130° C. for 1 hour to 48 hours. Water is added into the mixture. The organic phase is distilled to remove solvent and obtain the polymers. The yield is 60-95%.

For reaction (3), in a suitable organic solvent, solution of the alcohol monomer is added with triphosgene and base or N,N'-Carbonyldiimidazole(CDI) at −10° C. to 10° C. The mixture is stirred at 10° C. to 130° C. for 1 hour to 48 hours. Water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, the solid electrolyte layer 108 may include ion conducting polymers chemically linked with plasticizing linear polymers that have a glass transition temperature less than −20° C. Example linear polymers include, but are not limited to, polyethylene, polybutylene, polyisodibutylene, siloxane, etc. By linking these plasticizing linear polymers with ion conducting polymers, the ion conductivity and transparency of the polymers can also be enhanced.

Example polymer electrolytes may include, but be not limited to:

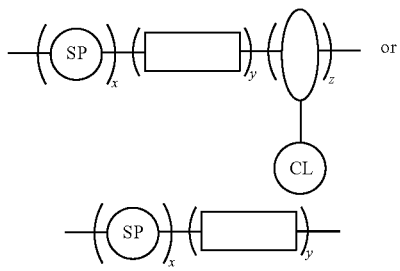

wherein each of x, y, and z is an integer greater than 0, and $$\square = -\!\!\left(\!\!\begin{array}{c}\diagdown\diagup\!\!\diagdown\!\!\mathrm{O}\end{array}\!\!\right)_{\!\!n}\!\!-$$

$n = 3\text{-}4000$

SP means soft polymers with low glass transition temperature ($<-20°$ C.). The connection between different parts of main chain and the connection between main chain and CL can be any type of one or several organic bonds.

Cross-linking (CL) groups may include any function chemicals which can connect with two or more monomers. Example CL groups may include, but are not limited to:

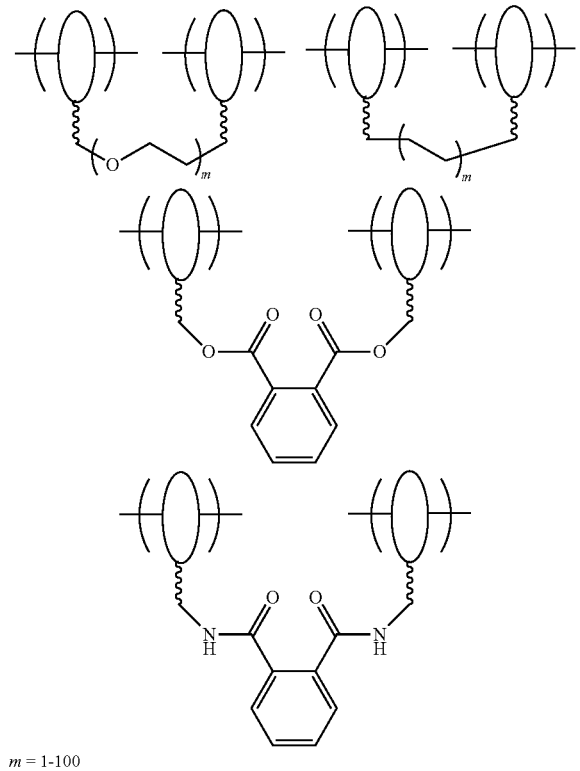

$m = 1\text{-}100$

In some embodiments, suitable polymers for ECD electrolytes may be form with polyethylene, PEO, and cross-linking groups. Example reactions include, but are not limited to:

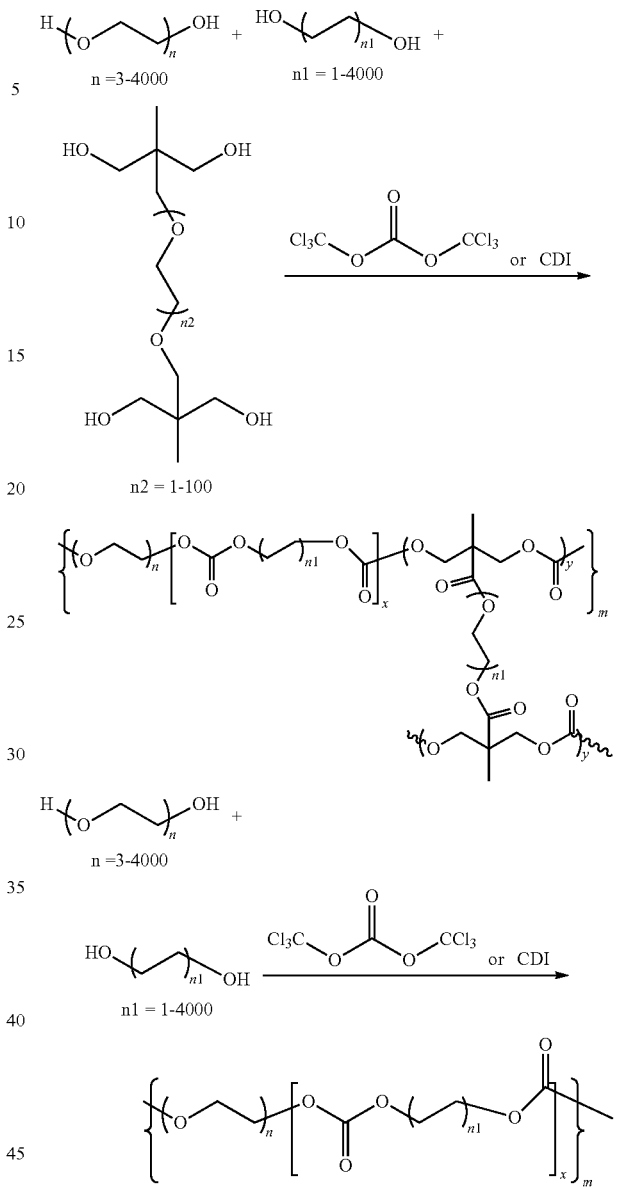

In the above reactions, in a suitable organic solvent, a solution of alcohol monomers and functionalized polyethylene is added with triphosgene and base or N,N'-Carbonyldiimidazole(CDI) at $-10°$ C. to $10°$ C. The mixture is stirred at $10°$ C. to $130°$ C. for 1 hour to 48 hours. Water is added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, suitable polymers for ECD electrolytes may be form with polyisobutylene, PEO, and cross-linking groups. Example reactions include, but are not limited to:

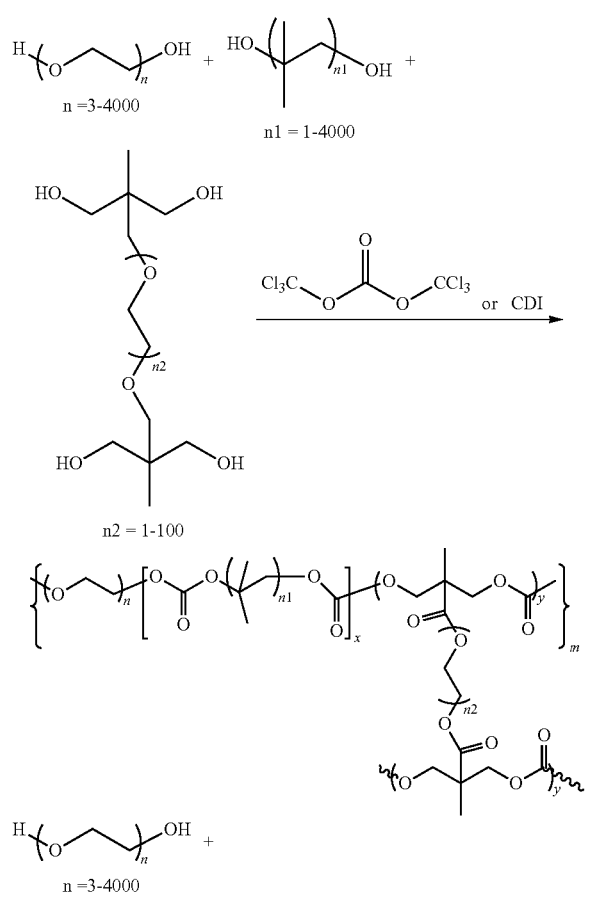

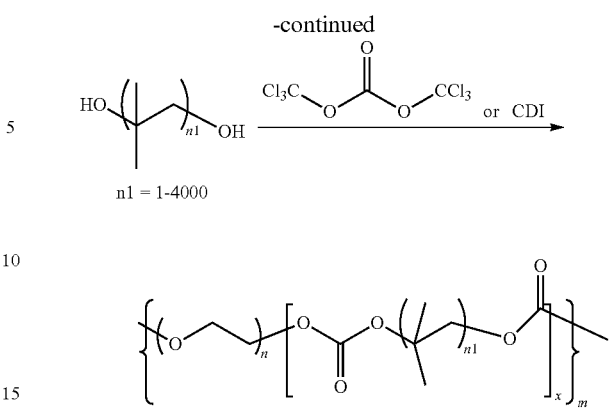

In the above reactions, in a suitable organic solvent, a solution of alcohol monomers and functionalized polyisobutylene is added with triphosgene and base or N,N'-Carbonyldiimidazole(CDI) at −10° C. to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, suitable polymers for ECD electrolytes may be formed with siloxane, PEO, and cross-linking groups. Example reactions include, but are not limited to:

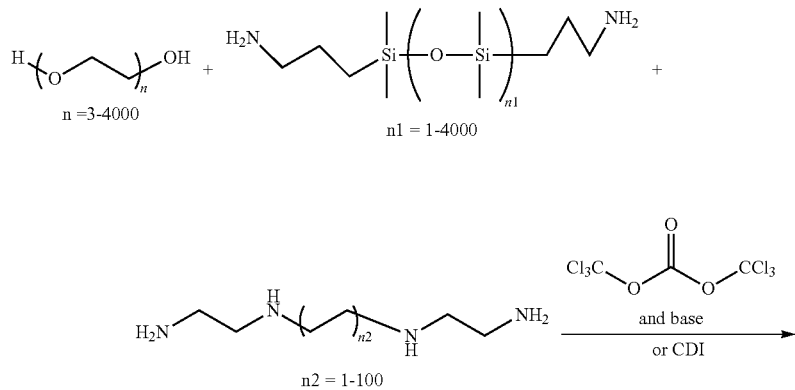

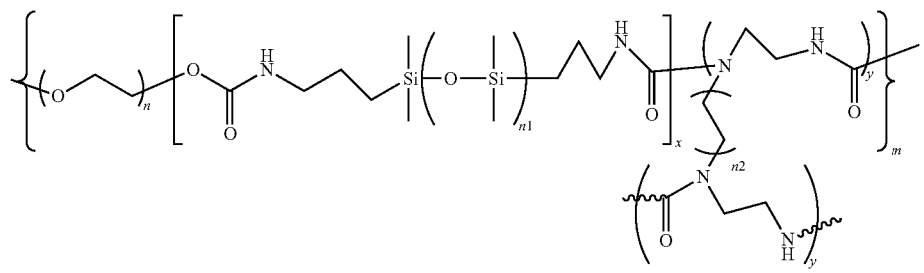

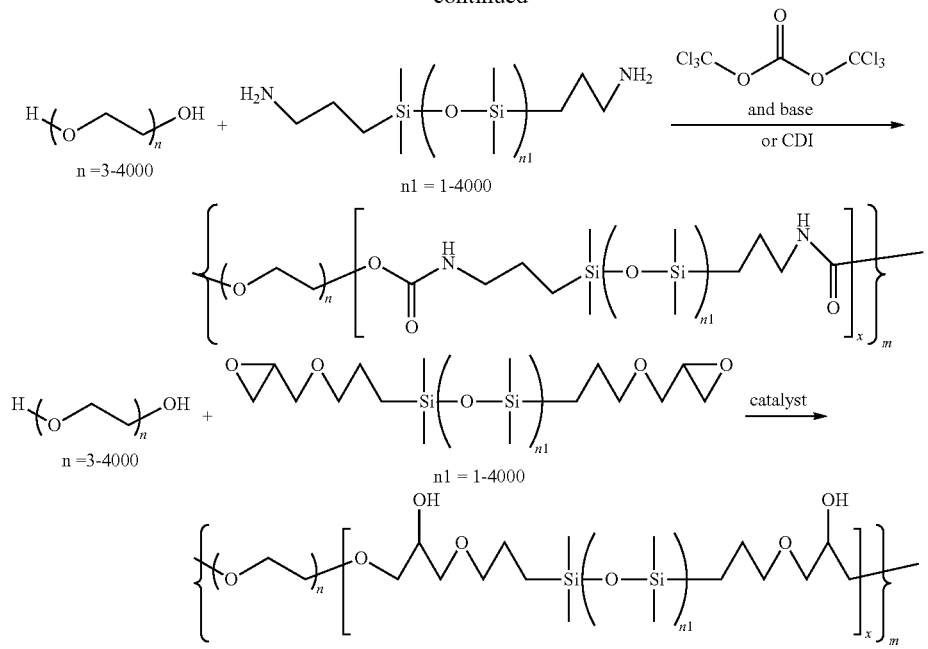

In the above reactions, in a suitable organic solvent, a solution of all starting materials and siloxane is added with triphosgene and base or N,N'-Carbonyldiimidazole(CDI) or catalyst at −10° C. to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, a suitable polymer for ECD electrolytes may be formed as follows:

In this reaction, 3 g (10 mmol) of Polyethylene glycol (Mn~300), 3.0 g (1 mmol) of Poly(dimethylsiloxane) bis(3-aminopropyl) terminated(Mn~3000), triethylenetetramine 0.015 g (0.1 mmol) are added to 100 mL dichloromethane (DCM). The solution is cooled to 0° C. before triphosgene 1.13 g (3.8 mmol) is added into the solution slowly. Triethylamine 2.5 g (24.7 mmol) is added dropwisely. After stirring at 0° C. for 2 hours, the solution is warmed back to room temperature and stirred for 18 hours. DI water 100 ml is added into the mixture to wash the organic solution. The organic phase is collected and dried with $MgSO_4$ and then distilled under vacuum to remove the solvent and obtain the product (polymer A). The yield is 80-100%.

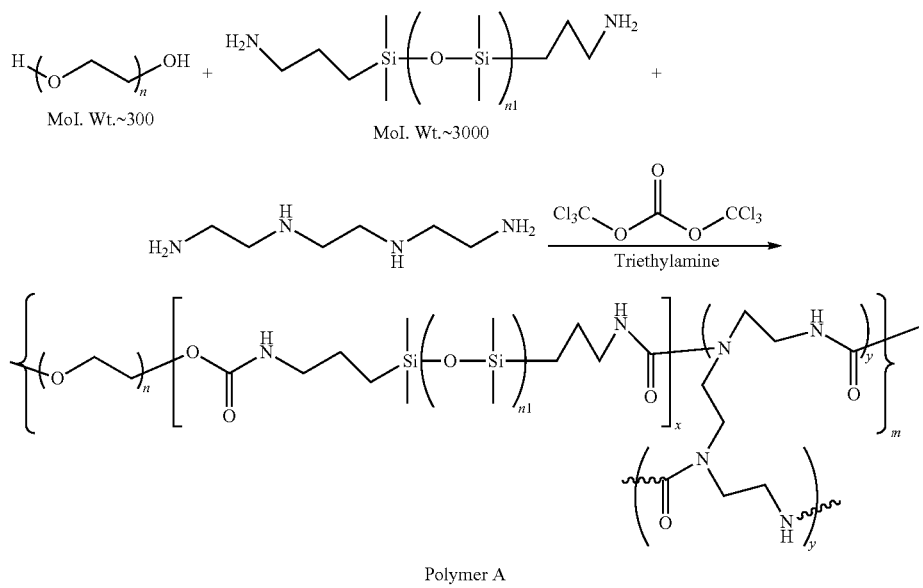

Polymer A

In some embodiments, a suitable polymer for ECD electrolytes may be formed as follows:

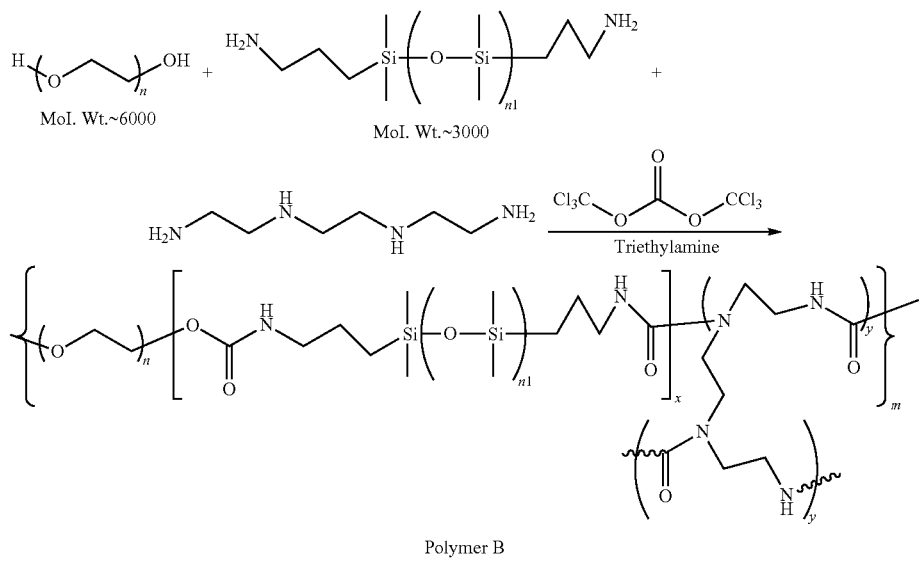

Polymer B

In this reaction, 6 g (1 mmol) of Polyethylene glycol (Mn-6000), 3.0 g (1 mmol) of Poly(dimethylsiloxane) bis (3-aminopropyl) terminated(Mn-3000), triethylenetetramine 0.015 g (0.1 mmol) are added to 100 mL dichloromethane (DCM). The solution is cooled to 0° C. before triphosgene 0.21 g (0.71 mmol) is added into the solution slowly. Triethylamine 0.47 g (4.6 mmol) is added dropwisely. After stirring at 0° C. for 2 hours, the solution is warmed back to room temperature and stirred for 18 hours. DI water 100 ml is added into the mixture to wash the organic solution. The organic phase is collected and dried with MgSO$_4$ and then distilled under vacuum to remove the solvent and obtain the product (polymer B). The yield is 80-100%.

In some embodiments, a suitable polymer for ECD electrolytes may be formed as follows:

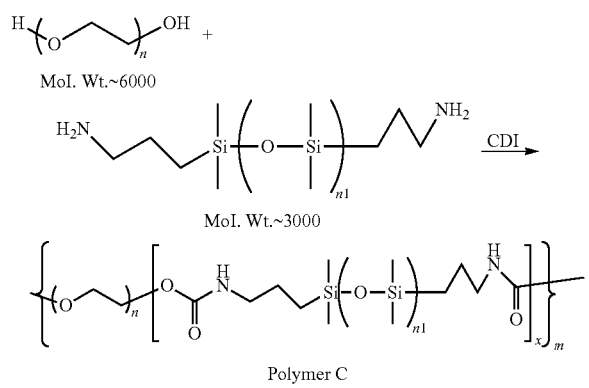

Polymer C

In this reaction, 6 g (1 mmol) of Polyethylene glycol (Mn-6000), 3.0 g (1 mmol) of Poly(dimethylsiloxane) bis (3-aminopropyl) terminated(Mn-3000) are added to 100 mL toluene. The solution is cooled to 0° C. before 0.324 g (2 mmol) N,N'-Carbonyldiimidazole(CDI) is added into the solution slowly. After stirring at 0° C. for 2 hours, the solution is heated to 60° C. and stirred for 18 hours. DI water 100 ml is added into the mixture to wash the organic solution. The organic phase is collected and dried with MgSO$_4$ and then distilled under vacuum to remove the solvent and obtain the product (polymer C). The yield is 80-100%.

In some embodiments, a suitable polymer for ECD electrolytes may be formed as follows:

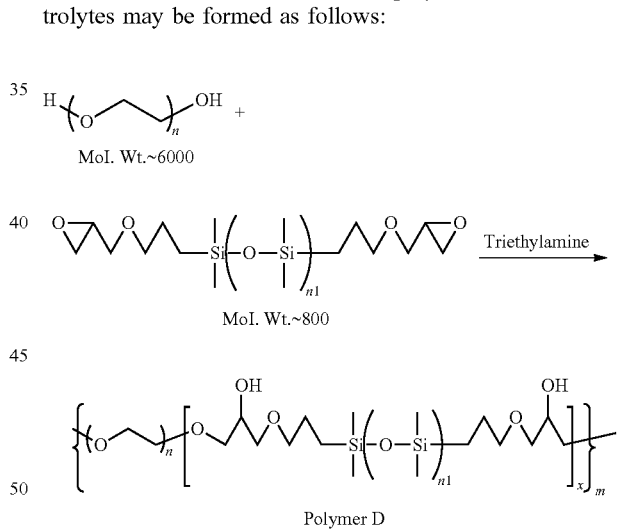

Polymer D

In this reaction, 6 g (1 mmol) of Polyethylene glycol (Mn-6000), 0.8 g (1 mmol) of Poly(dimethylsiloxane) diglycidyl ether terminated and triethylamine 0.1 g (1 mmol) are added to 100 mL toluene. The solution is heated to 110° C. for 24 hours. DI water 100 ml is added into the mixture to wash the organic solution. The organic phase is collected and dried with MgSO$_4$ and then distilled under vacuum to remove the solvent and obtain the product (polymer D). The yield is 80-100%.

In some embodiments, the solid electrolyte layer 108 may include ion conducting polymers chemically linked with plasticizing polymer blocks that have plasticizing groups as side chains.

Example polymer electrolytes may include, but are not limited to:

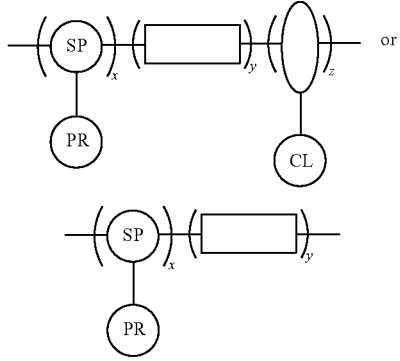

wherein each of x, y, and z is an integer greater than 0, and

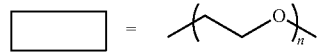

$n$ = 3-4000

The connections between different parts of main chain, the connection between main chain SP and PR, the connection between main chain and CL can be any type of one or several organic bonds. SP are soft polymers with low glass transition temperature (<−20° C.).

Example PR groups may include, but be not limited to:

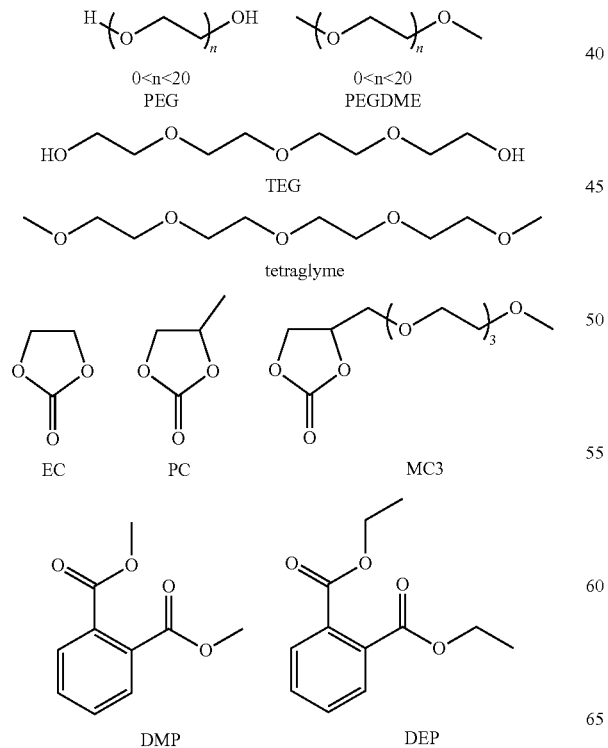

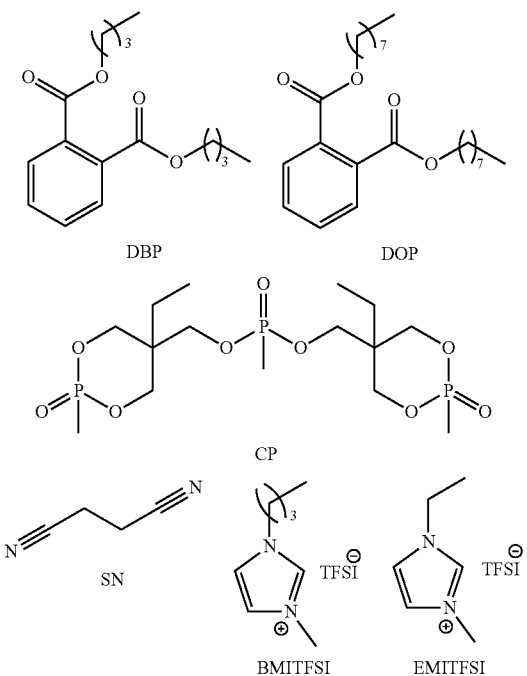

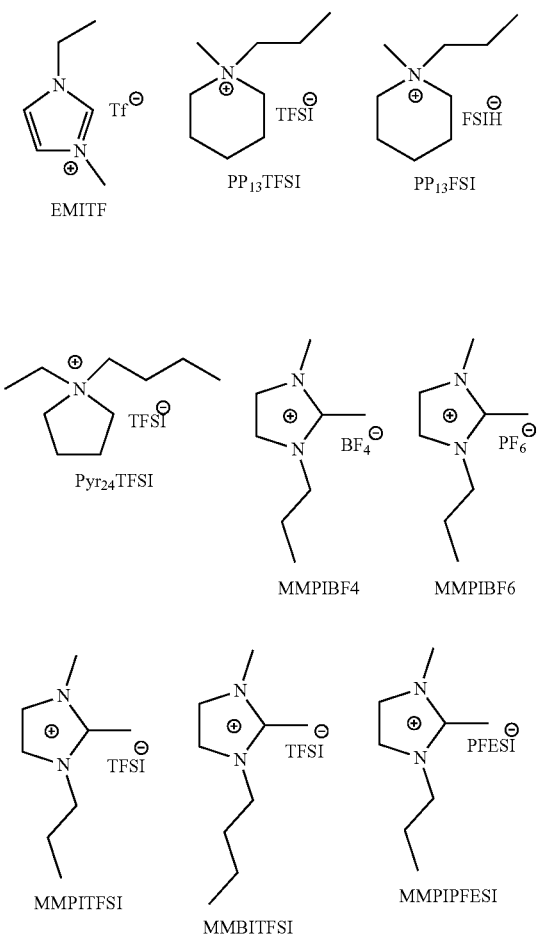

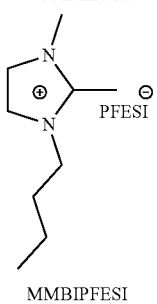
MMBIPFESI
Example CL groups may include, but be not limited to:
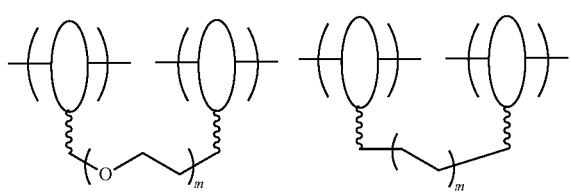
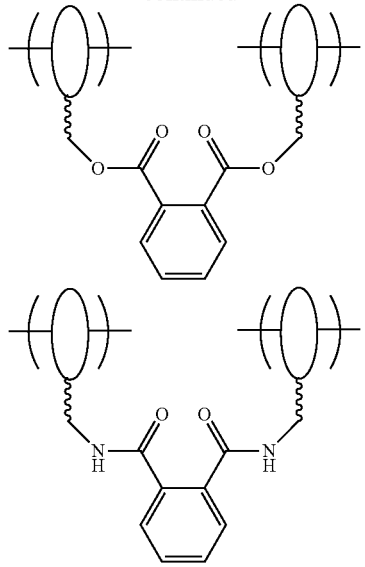
$m = 1\text{-}100$
In some embodiments, suitable polymers for ECD electrolytes may be form with plasticizing groups on siloxane polymers, PEO, and cross-linking groups. Example reactions include, but are not limited to:
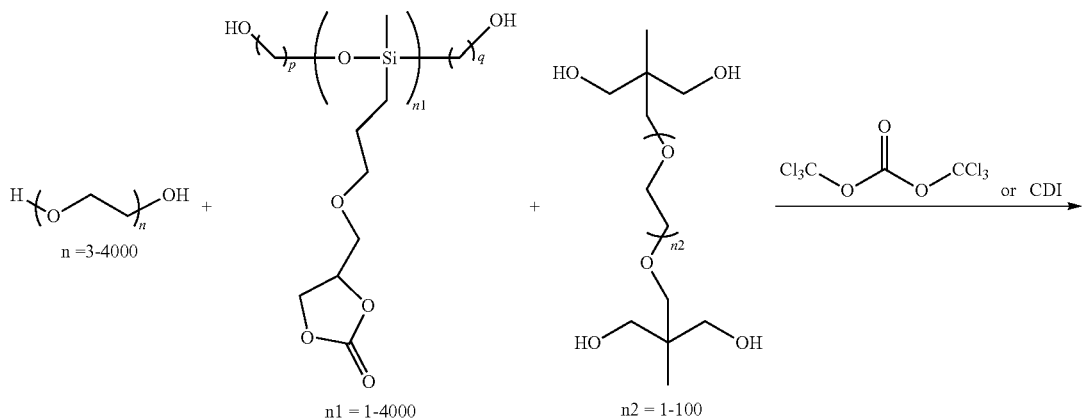
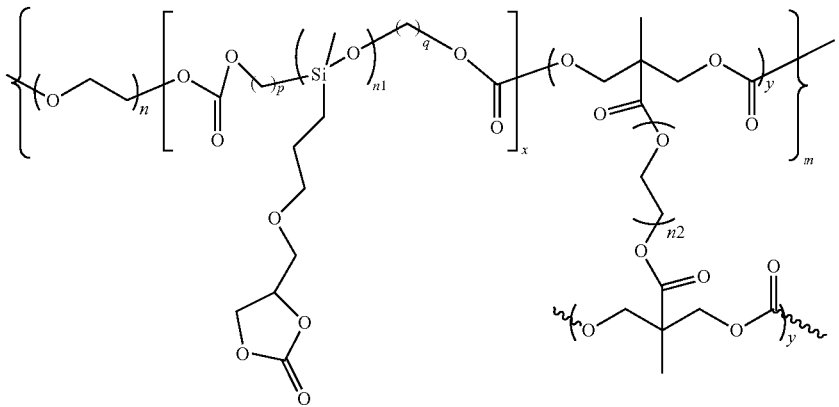

In the above reactions, in a suitable organic solvent, a solution of alcohol monomers and siloxane is added with triphosgene and base or N,N'-Carbonyldiimidazole(CDI) at −10 to 10° C. The mixture is stirred at 10° C. to 130° C. for 1 hour to 48 hours. Water is then added into the mixture. The organic phase is distilled to remove solvent and obtain the polymers. The yield is 60-95%.

In some embodiments, the mixture of all the starting materials (called precursors for electrolyte or electrolyte precursor solution) before heating can also be used for device fabrication using in-situ polymerization under heating.

In some embodiments, the solid electrolyte layer 108 may include brush copolymers having a main chain of soft polymers and side chains of ion-conducting species and one or more non-miscible groups. Different from linear type polymers, brush-type polymers are very hard to form dense packing because of the bulky sidechains. Therefore, new designs of brush-type polymers are proposed to avoid crystalline regions and form amorphous structure to achieve fully transparent solid electrolytes.

In some embodiments, to ensure the amorphous structures for brush-type polymers, the polymer main chains are consisted of relatively soft polymer chains that can freely rotate. Examples of soft polymer chains include siloxane chains, ethylene chains, acrylate chains, methyl acrylate chains, and combinations of two or more types of the above materials. In some embodiments, in addition to ion-conducting species, one or more non-miscible groups can be additionally introduced into the polymer side chains to disrupt the packing of the polymer chains. The non-miscible groups may be, for example, alkyl chains, aromatic groups, or any groups that are not miscible with the ion conducting groups. If the brush polymer is in a liquid state or has a low mechanical modulus, cross-linking groups can be added to ensure the solid state or enhance the mechanical modulus.

Example brush-type polymers having differing side chains to disturb the packing of polymer include, but are not limited to:

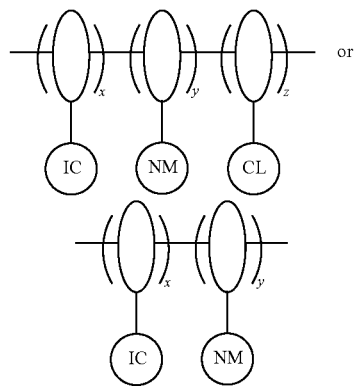

wherein each of x, y, and z is an integer greater than 0, and the main chain include, but is not limited to:

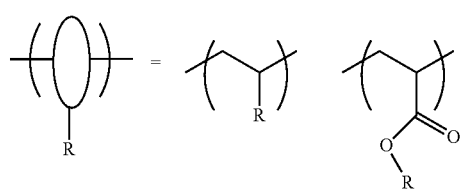

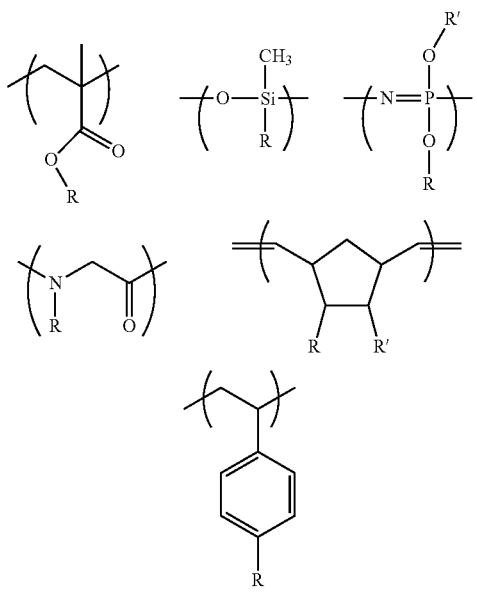

NM means non-miscible groups having structures including alkyl chains, aromatic groups, combination of alkyl and aromatic groups or any groups that are not miscible with the ion conducting groups.

IC means ionic conductivity groups that may include, but are not limited to:

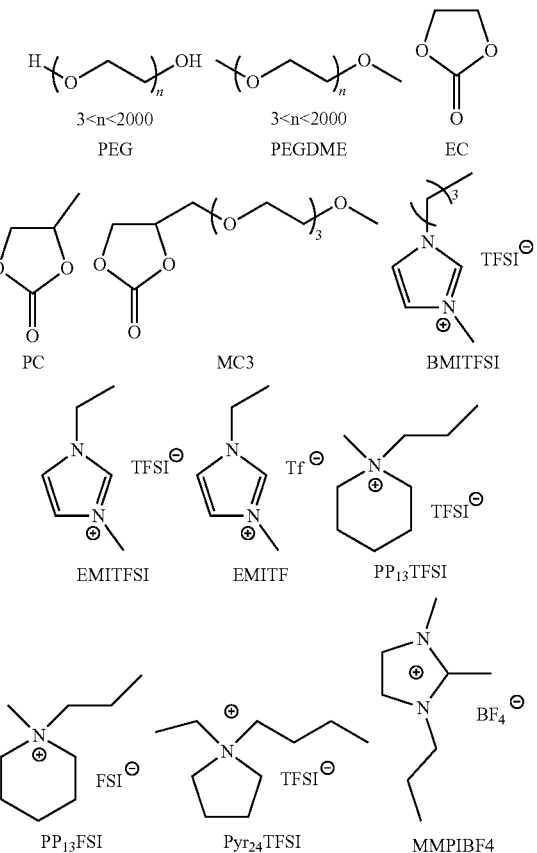

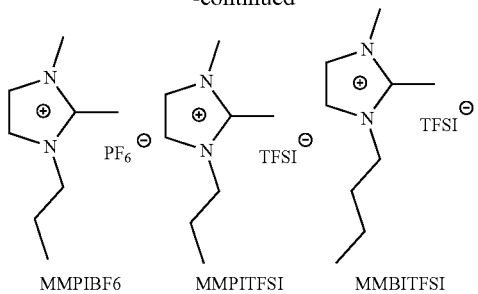

MMPIBF6    MMPITFSI    MMBITFSI

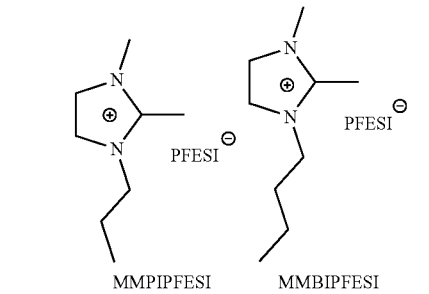

MMPIPFESI    MMBIPFESI

CL means Cross-linking groups including any function chemicals which can connect two or more monomers. Example CL groups may include, but be not limited to:

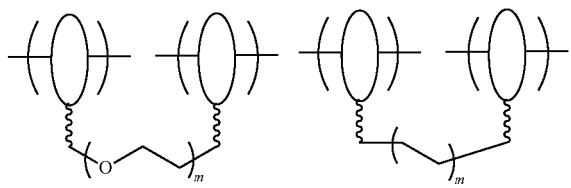

$m = 1\text{-}100$

In some embodiments, the connection between different parts of main chain, the connection between main chain and IC, the connection between main chain and NM, the connection between main chain and CL can be any type of one or several organic bonds.

Two methods may be employed to form the above polymers for ECD electrolytes. The first method includes forming the main chain polymer first and then grafting the different side chains onto the main chain to obtain the desired polymers. The second method includes forming monomers or oligomers with different types of side chains and then polymerizing to obtain the desired polymers.

In an example first method, siloxane is employed as the main chain. For example, a desired polymer may be formed by the reactions including, but are not limited to:

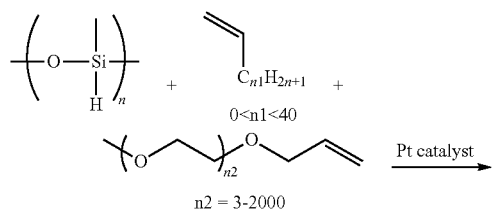

$0 < n1 < 40$ $n2 = 3\text{-}2000$ → Pt catalyst

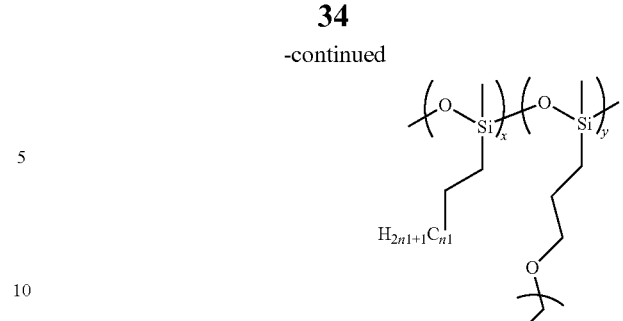

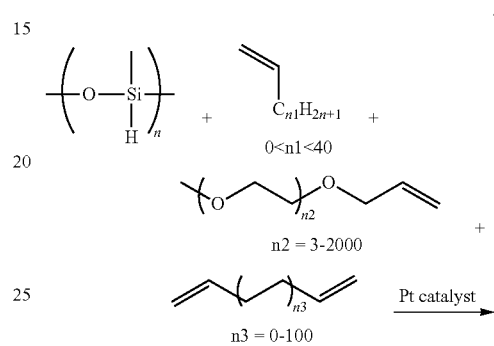

$0 < n1 < 40$ $n2 = 3\text{-}2000$ $n3 = 0\text{-}100$ → Pt catalyst

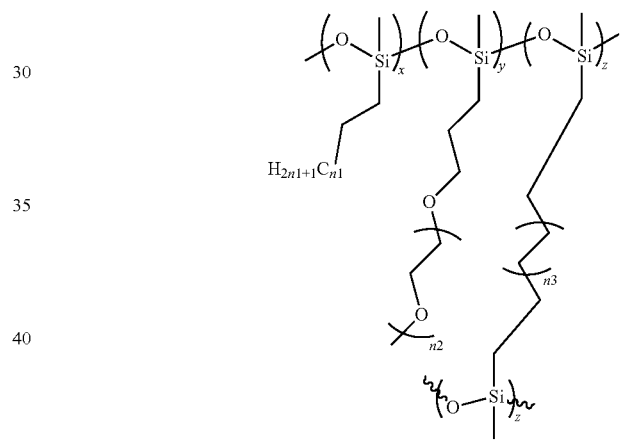

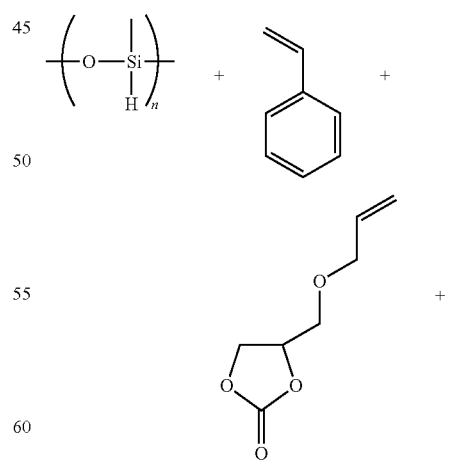

$n3 = 0\text{-}100$ → Pt catalyst

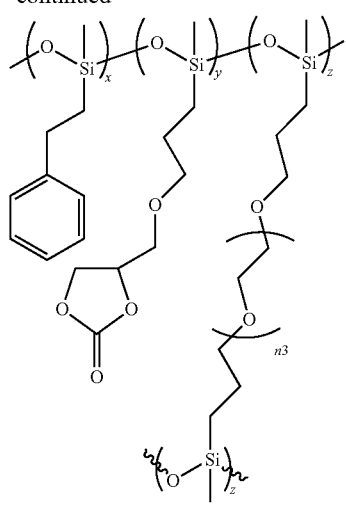

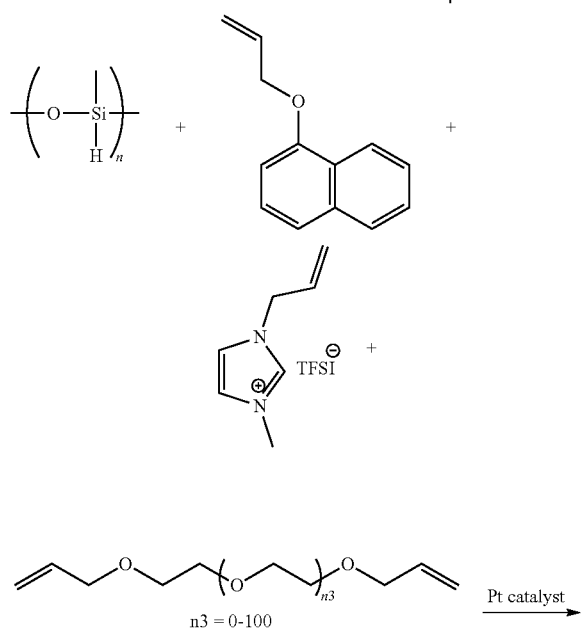

In the above reactions, in a suitable organic solvent, solution of polymethylhydrosiloxane, vinyl substituted non-miscible groups, vinyl substituted ionic conductive group, and vinyl substituted crosslink groups is bubbled with nitrogen for about 15 min. Pt as a catalyst is then added. The reaction is protected with nitrogen and heated to 40° C. to 110° C. After 1 hour to 24 hours, the reaction mixture appears sticky. The solvent of the mixture is removed with a rotary evaporator to obtain the product. The yield of the process is 60-97%.

In some embodiment, the mixture of all the starting materials (called precursors for electrolyte or electrolyte precursor solution) before heating can also be used for device fabrication using in-situ polymerization under heating.

Another example polymer for ECD electrolytes may be formed according to the following reaction:

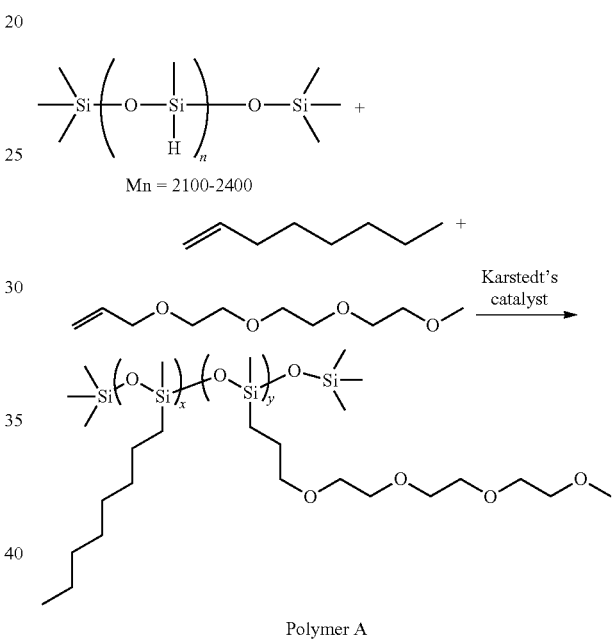

Polymer A

In this reaction, 2.3 g (~1 mmol) Poly(methylhydrosiloxane) (Mn=2100-2400), 0.56 g (5 mmol) 1-Octene, 7.14 g (35 mmol) Allyloxy(triethylene oxide) methyl ether are added to 100 ml toluene. The solution is bubbled with nitrogen for about 15 min followed by adding Karstedt's catalyst 0.4 g (0.4 mmol) under nitrogen. The reaction is protected with nitrogen and heated to 50° C. After 24 hours, the reaction mixture appears sticky. The solvent of the mixture is removed with a rotary evaporator to obtain the product (polymer A). The yield of the process is 80-100%.

Yet another example polymer for ECD electrolytes may be formed according to the following reaction:

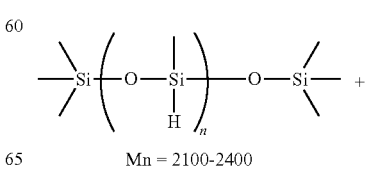

Mn = 2100-2400

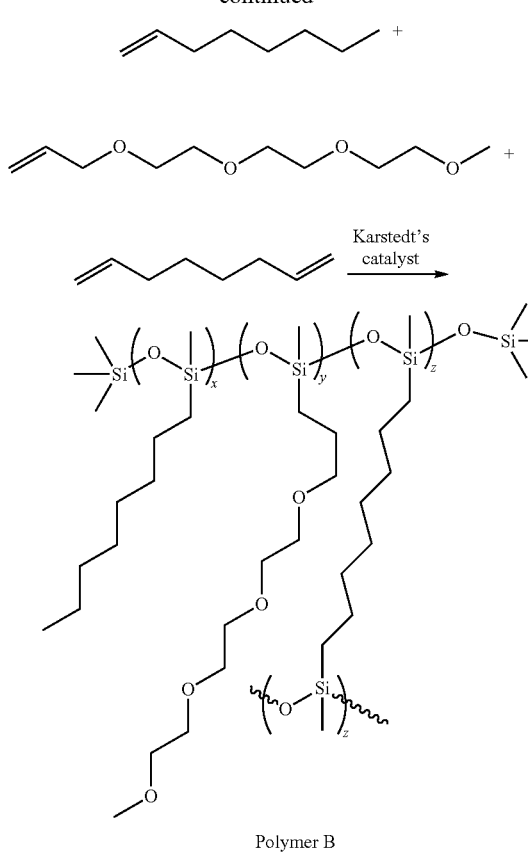

Polymer B

In this reaction, 2.3 g (~1 mmol) Poly(methylhydrosiloxane) (Mn=2100-2400), 0.56 g (5 mmol) 1-Octene, 6.73 g (33 mmol) Allyloxy(triethylene oxide) methyl ether, 0.22 g (2 mmol) 1,7-Octadiene are added to 100 ml toluene. The solution is bubbled with nitrogen for about 15 min followed by adding Karstedt's catalyst 0.4 g (0.4 mmol) therein under nitrogen. The reaction is protected with nitrogen and heated to 50° C. After 24 hours, the reaction mixture appears sticky. The solvent of the mixture is removed with a rotary evaporator to obtain the product (polymer B). The yield of the process is 80-100%.

Another example polymer for ECD electrolytes may be formed according to the following reaction:

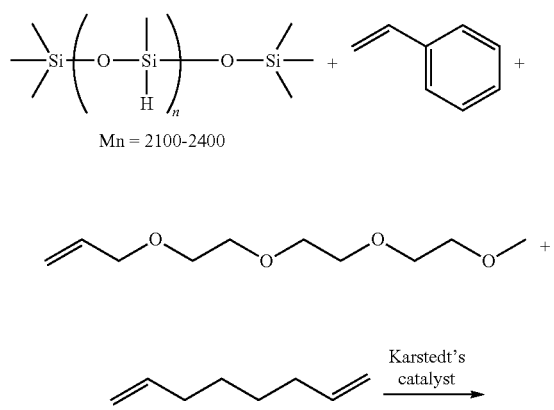

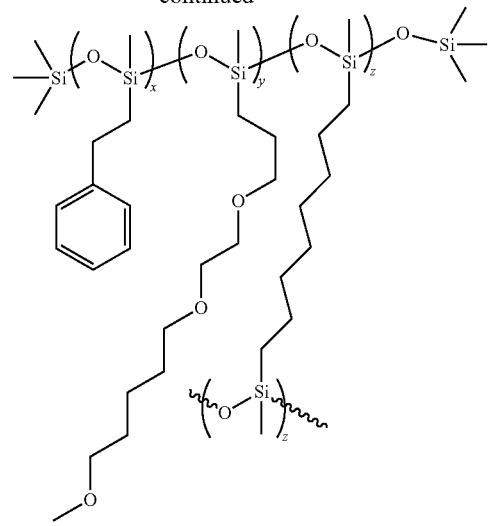

Polymer C

In this reaction, 2.3 g (~1 mmol) Poly(methylhydrosiloxane) (Mn=2100-2400), 0.52 g (5 mmol) Styrene, 6.73 g (33 mmol) Allyloxy(triethylene oxide) methyl ether, 0.22 g (2 mmol) 1,7-Octadiene are added to 100 ml toluene. The solution is bubbled with nitrogen for about 15 min. before Karstedt's catalyst 0.4 g (0.4 mmol) is added therein under nitrogen. The reaction is protected with nitrogen and heated to 50° C. After 24 hours, the reaction mixture appears sticky. The solvent of the mixture is removed with a rotary evaporator to obtain the product (polymer C). The yield of the process is 80-100%.

In another example first method, 1,2-polybutadiene is employed as the main chain. For example, a desired polymer may be formed by the reactions including, but not limited to:

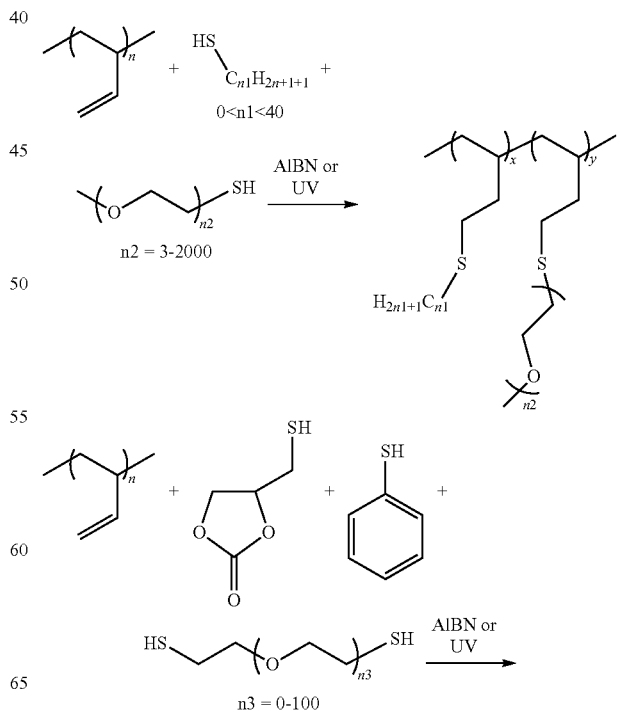

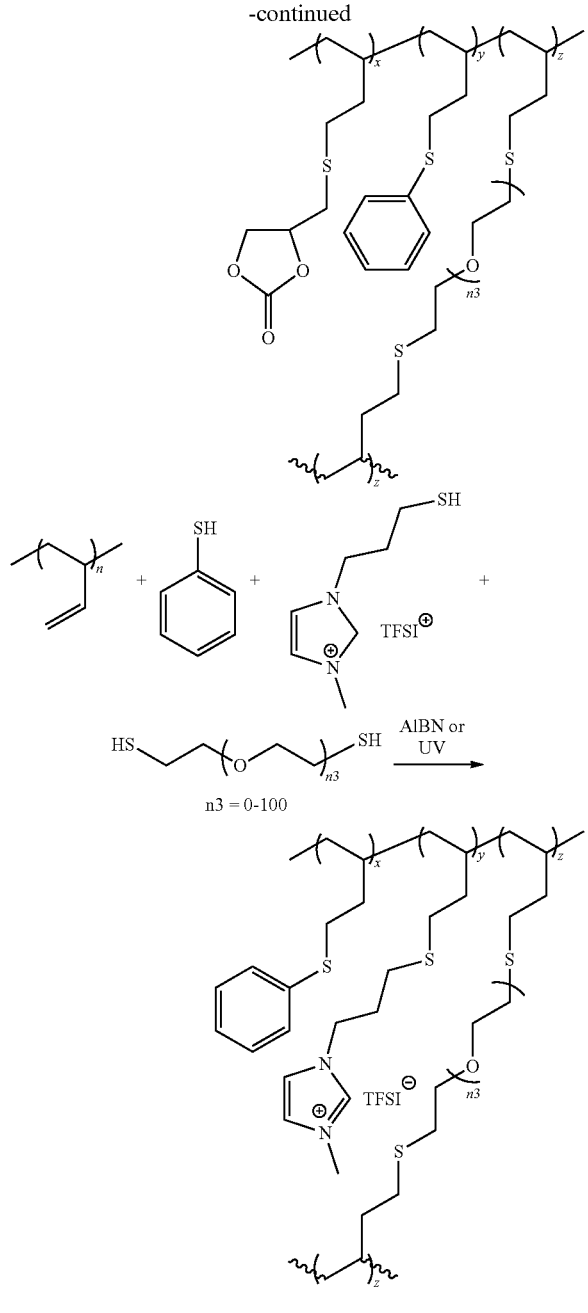

Condition 1: Polymerization by heating. 1,2-polybutadiene, with or without a radical initiator, thiol substituted non-miscible groups, a thiol substituted ionic conductive group, and a thiol substituted crosslink group are mixed in a suitable organic solvent solution or a no-solvent condition. The mixture is heated at 40° C. to 110° C. for 10 minutes to 24 hours, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be used for device fabrication using in-situ polymerization under heating.

Condition 2: Polymerization by UV light. 1,2-Polybutadiene, with or without a radical initiator, thiol substitute non-miscible groups, a thiol substituted ionic conductive group, and a thiol substituted crosslink group are mixed in a suitable organic solvent solution or a no-solvent condition. The mixture is exposed to UV light for 2 minutes to 150 minutes, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be directly used for device fabrication using in-situ polymerization under UV light.

Example radical initiators include, but are not limited to: tert-Amyl peroxybenzoate, 4,4-Azobis(4-cyanovaleric acid), 1,1'-Azobis(cyclohexanecarbonitrile), 2,2'-Azobisisobutyronitrile, Benzoyl peroxide2, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclo-hexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

In an example second method, monomers with different type of side chains are formed and then polymerized to obtain the desired polymer. For example, a desired polymer may be formed by the reactions including:

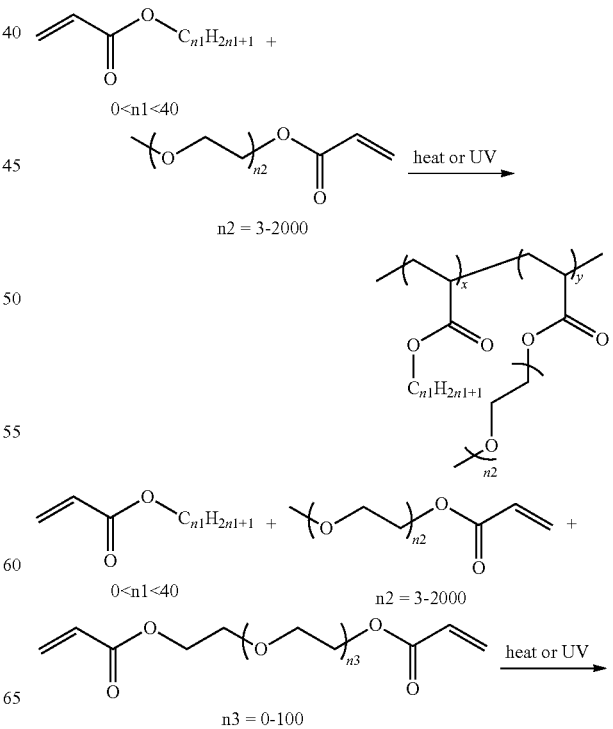

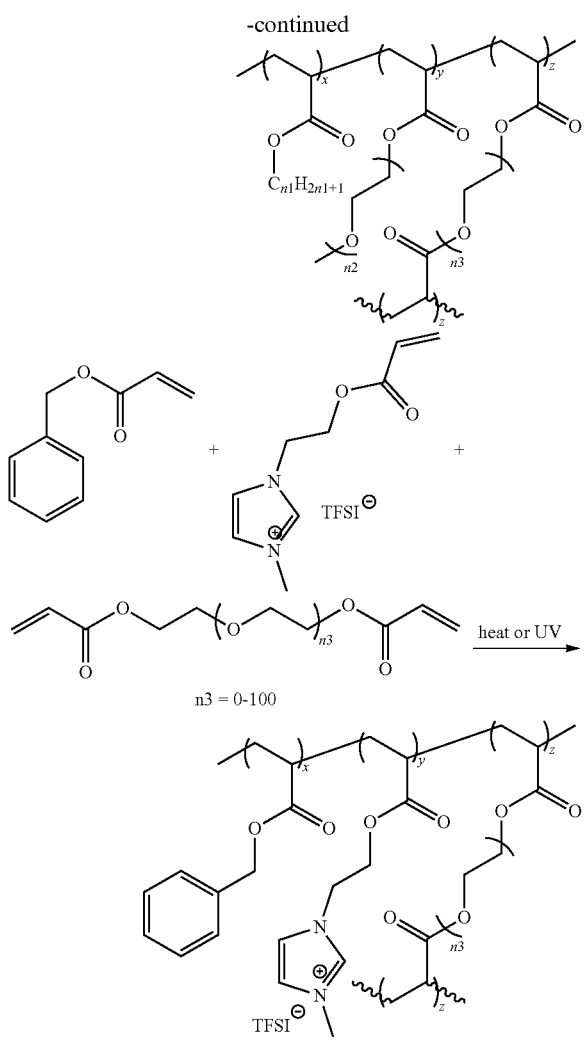

n3 = 0-100

Condition 1: Polymerization by heating. a monomer with non-miscible groups, a monomer with ionic conductive group, and a monomer with crosslinking group, with or without a radical initiator are mixed in a suitable organic solvent solution or a no-solvent condition. The mixture is heated to 40° C. to 110° C. for 10 minutes to 24 hours, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be directly used for device fabrication using in-situ polymerization under heating.

Condition 2: Polymerization by UV light. a monomer with non-miscible groups, a monomer with ionic conductive group, and a monomer with crosslinking group, with or without a radical initiator are mixed in a suitable organic solvent solution or a no-solution condition. The mixture is exposed to UV light for 2 minutes to 150 minutes, resulting in a sticky solution or solid. The synthesized sticky solution or solid can be used as the target polymer electrolyte, which can be coated on a working electrode or a counter electrode to form a solid electrolyte film.

In some embodiments, the mixture of all the starting materials (called "precursors" for the electrolyte or electrolyte precursor solution) before polymerization can also be used for device fabrication using in-situ polymerization under UV light.

Example radical initiators include, but are not limited to: tert-Amyl peroxybenzoate, 4,4-Azobis(4-cyanovaleric acid), 1,1'-Azobis(cyclohexanecarbonitrile), 2,2'-Azobisisobutyro-nitrile, Benzoyl peroxide2, 2,2-Bis(tert-butylperoxy)butane, 1,1-Bis(tert-butylperoxy)cyclo-hexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methyl-ethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and Potassium persulfate.

In some embodiments, a desired polymer may be formed by the reactions including, but not limited to:

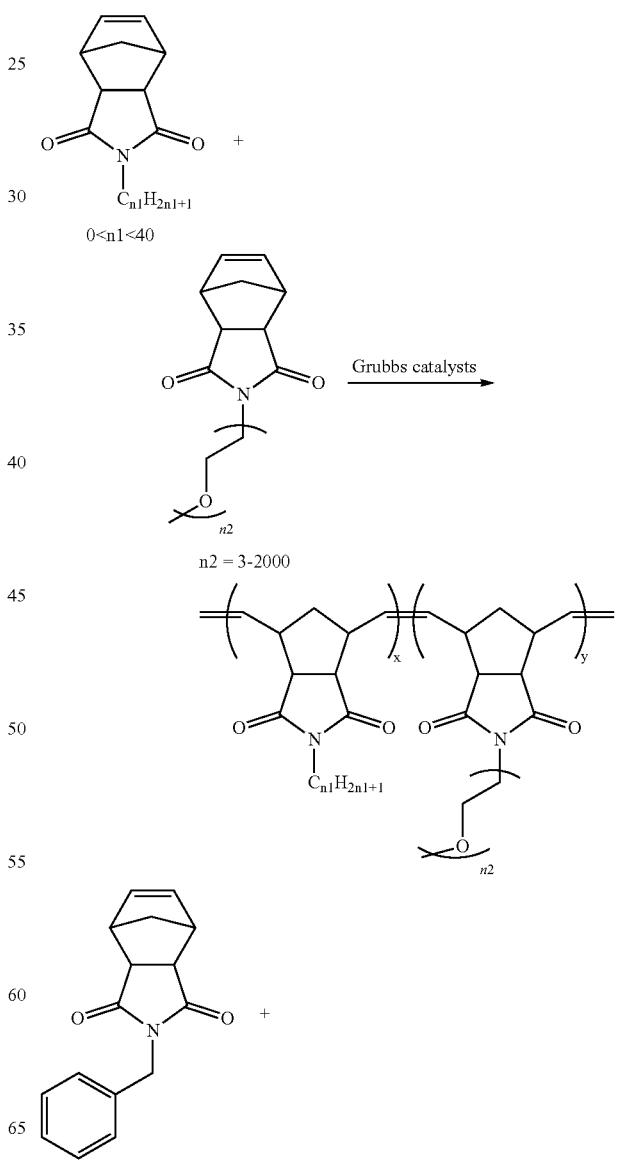

43
-continued
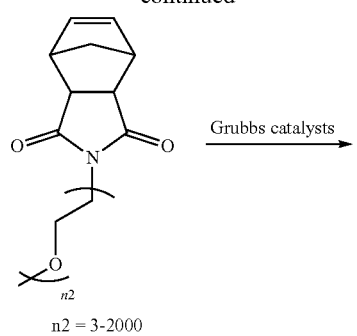
n2 = 3-2000
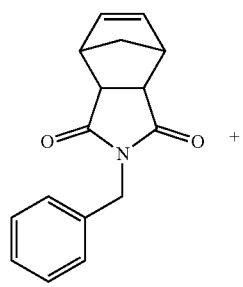
n2 = 3-2000
44
-continued
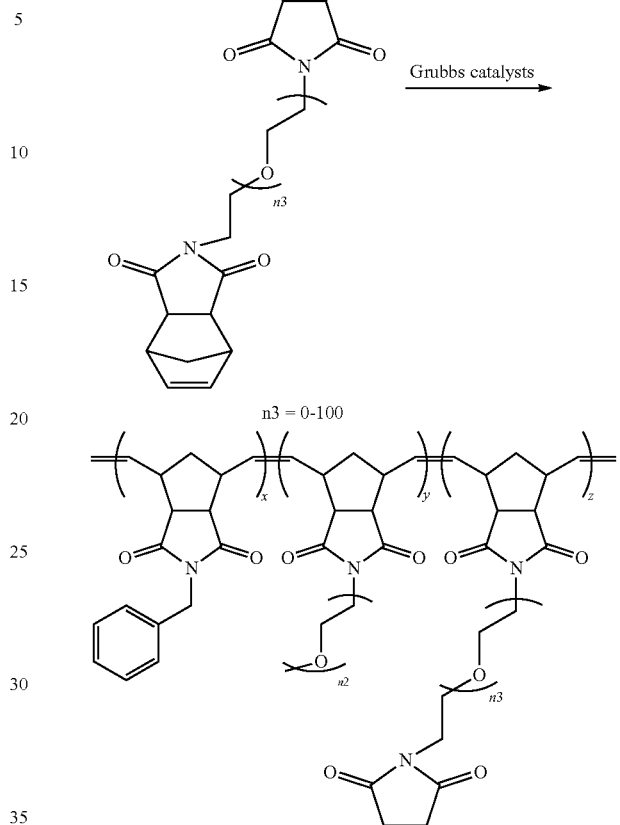
n3 = 0-100
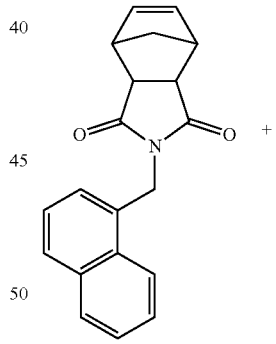
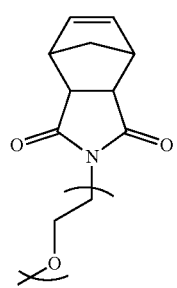
+
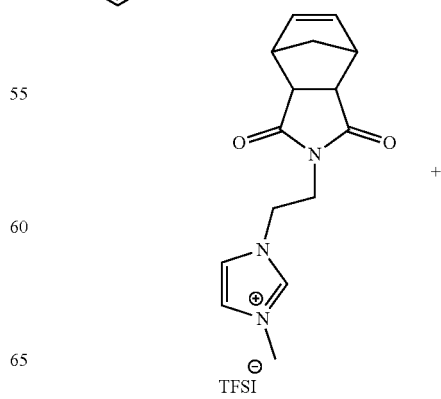
TFSI

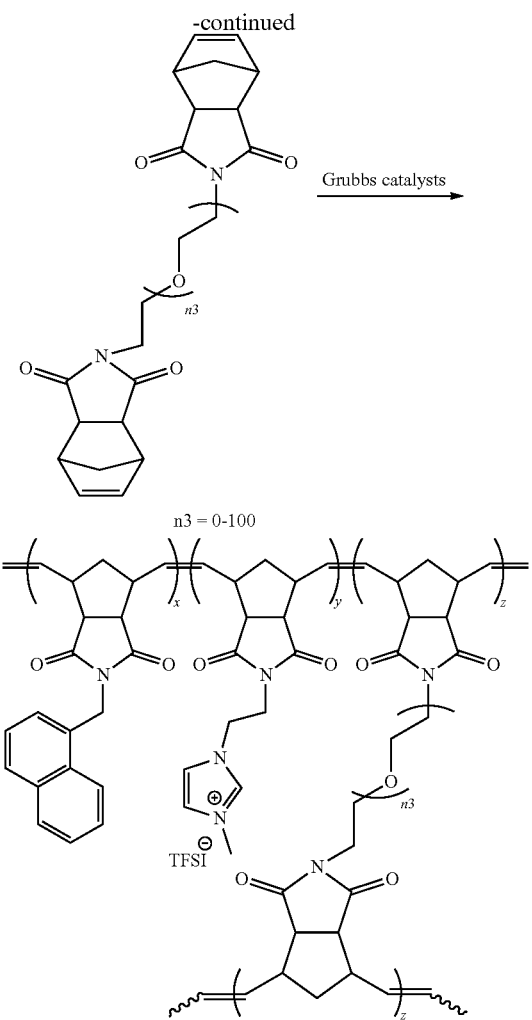

In these reactions, in a suitable organic solvent, a solution of norbornene monomer with non-miscible groups, a norbornene monomer with ionic conductive group, and a norbornene monomer with crosslinking groups is bubbled with nitrogen for 15 min. Grubbs catalyst is then added therein. The reaction is protected with nitrogen and heated to 40° C. to 110° C. After 10 minutes to 24 hours, the reaction mixture appears sticky. The solvent of the mixture is removed with a rotary evaporator to obtain the product. The yield of the process is 60-97%.

In some embodiments, the mixture of all the starting materials (called precursors for electrolyte or electrolyte precursor solution) before heating can also be used for device fabrication using in-situ polymerization under heating.

In some embodiments, before being processed into a solid electrolyte thin film for an electrochromic device, any one or more of the above polymer electrolytes or electrolyte precursors (e.g., the mixture of all of the monomers or oligomers with or without one or more radical initiators, with or without catalyst before polymerization) may be blended with one or more types of organic or inorganic salts. Example inorganic salts include $Li^+$, $Na^+$, $K^+$, $Mg^{2+}$, $Ca^{2+}$, $Al^{3+}$ based salts, and others now known or later developed. Example organic salts include ionic liquids such as EMITFSI, EMIOTF, and others now known or later developed.

In some embodiments, before blending with any one or more of the example salts, any one or more of the polymer electrolytes disclosed herein may be dissolved in one or more appropriate solvents. The solvent(s) can help blend the polymers and salt(s) well, and can be removed by evaporation after being coated into films. The polymer electrolyte solution can be coated into films using any one of a variety of conventional solution-compatible coating strategies, including, but not limited to, spray coating, spin coating, slot-die coating, slit coating, roll-to-roll coating, transfer coating, and wire bar coating.

Figure 2:
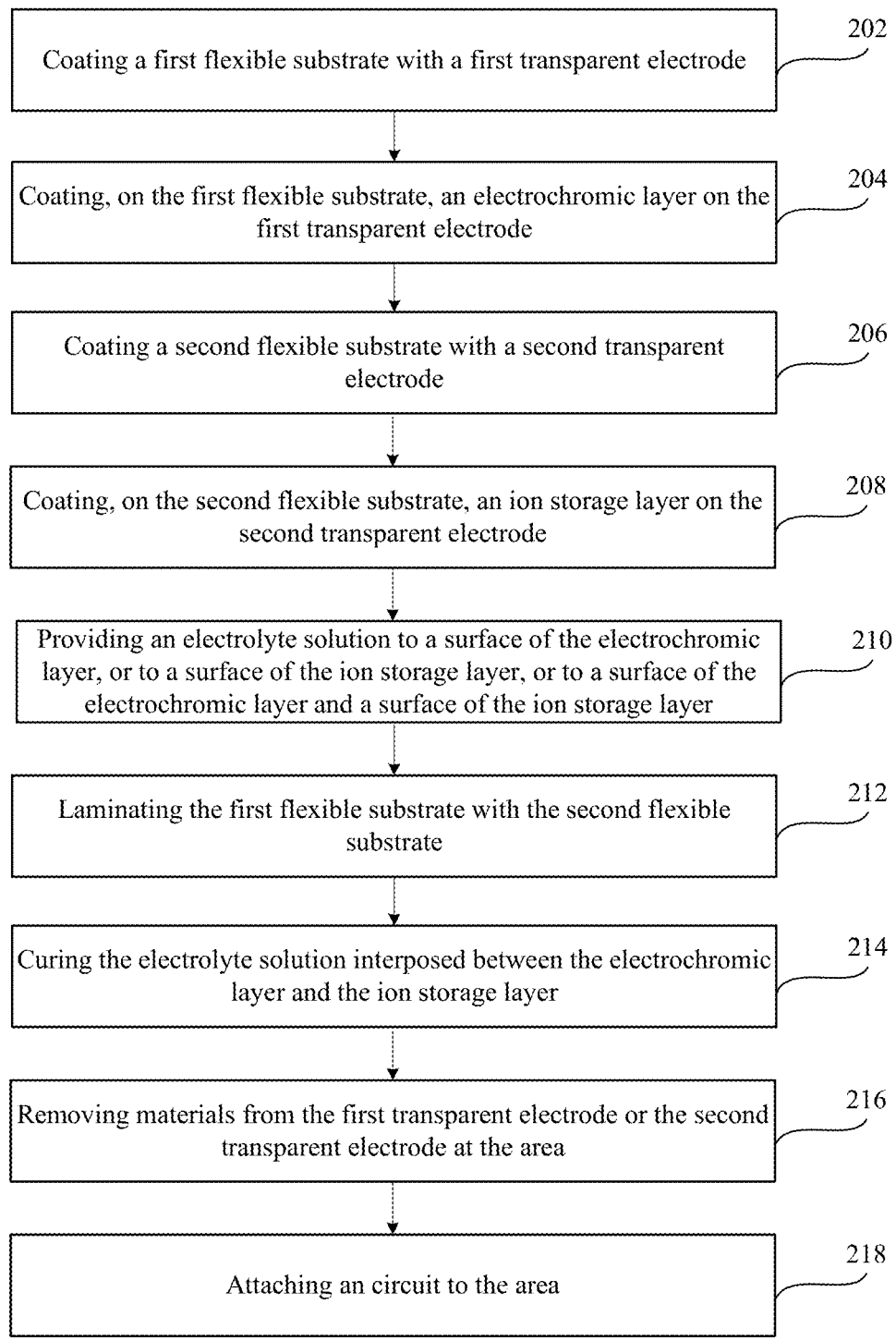
FIG. 2 is a flow chart illustrating a method for forming an electrochromic device, according to one example embodiment.

Reference is now made to FIG. 2. FIG. 2 is a flow chart illustrating a method 200 for forming an electrochromic device, according to one example embodiment. At 202, a first flexible substrate is coated with a first transparent electrode. The first transparent electrode may include, but is not limited to, indium-tin oxide (ITO), aluminum zinc oxide (AZO), fluorine doped tin oxide (FTO), silver nanowires, graphene, carbon nanotube, metal mesh based transparent conductive electrodes, or silver-nanoparticle ink. The first transparent electrode may be coated/deposited using physical or chemical vapor deposition methods, such as sputtering. At 204, on the first flexible substrate, an electrochromic layer is coated on the first transparent electrode. At 206, a second flexible substrate is coated with a second transparent electrode. The second transparent electrode may include, but is not limited to, indium-tin oxide (ITO), aluminum zinc oxide (AZO), fluorine doped tin oxide (FTO), silver nanowires, graphene, carbon nanotube, metal mesh based transparent conductive electrodes, or silver-nanoparticle ink. The second transparent electrode may be coated/deposited using physical or chemical vapor deposition methods, such as sputtering. At 208, on the second flexible substrate, an ion storage layer is coated on the second transparent electrode.

At 210, a polymer electrolyte solution or an electrolyte precursor solution is provided onto a surface of the electrochromic layer, or onto a surface of the ion storage layer, or onto a surface of the electrochromic layer and a surface of the ion storage layer, or onto the gap between a surface of the electrochromic layer and a surface of the ion storage layer. At 212, the first flexible substrate is laminated with the second flexible substrate such that an area of one of the substrates is not covered by another one of the substrates and such that the electrolyte solution is interposed between the electrochromic layer and the ion storage layer.

Figure 3A:
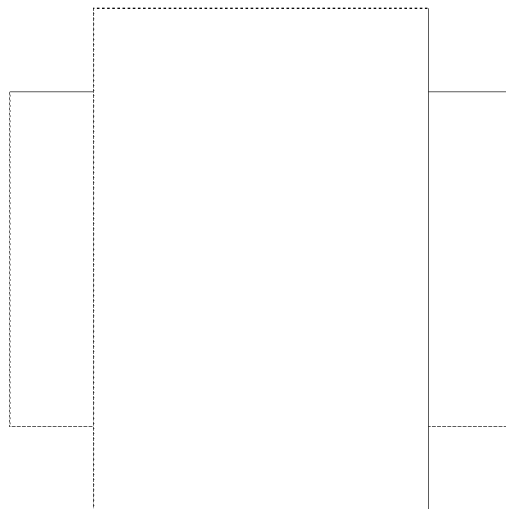
FIGS. 3A and 3B illustrate two lamination configurations in which an area of one of the substrates is not covered by another one of the substrates, according to example embodiments.
Figure 3B:

For example, one or both of the first flexible substrate (WE) and the second flexible substrate (CE) as prepared by the above operations is/are laid flat on a flat surface such as a marble plate, glass or the like. The polymer electrolyte solution or electrolyte monomer/oligomer solution (the precursor for a solid electrolyte) is applied to the first flexible substrate and/or the second flexible substrate by any one of a variety of solution-compatible coating strategies, including spray coating, spin coating, slot-die coating, slit coating, roll-to-roll coating, micro concave coating, screen printing, transfer coating, wire bar coating, etc. After the electrolyte solution is uniformly spread on one or both of the substrates, the substrates are laminated with each other. Suitable film lamination methods that may be used include, but are not limited to, cross cover, misalignment cover, and complete cover. FIGS. 3A and 3B illustrate two lamination configurations in which an area of one of the substrates is not covered by another one of the substrates.

In some embodiments, after the polymer electrolyte solution is uniformly spread on one or both of the substrates, part of the solvent of the polymer electrolyte solution is either dried in a room temperature or in an oven at a temperature ranging from 60-140° C. with or without vacuum. Then, the substrates are laminated with each other. Suitable film lamination methods that may be used include, but are not limited to, cross cover, misalignment cover, and complete cover.

After the lamination, a roller press machine, a flat plate pressing device, a vacuum pressing device, or other apparatus now known or later developed may be used for defoaming the precursor. For example, and more specifically, the multilayer thin film assembly consisting of the WE, the CE, and the precursor therebetween may be placed in a flat plate pressing apparatus and pressed at room (e.g., 1 atmosphere of pressure) temperature or a pressure of 30 MP-500 MP under heating (e.g., higher than 90° C.) for a predetermined time, such as between 1 min and 30 min. The pressing process may be terminated after the bubbles in the electrolyte layer are removed. Alternatively, the multilayer thin film assembly may be placed in a rolling press machine and defoamed, for example, at a speed of 0.5 m/s to 30 m/s at room temperature or under heating (e.g., higher than 90° C.) until the bubbles are removed from the electrolyte layer.

In some embodiments, the polymer electrolyte solution or electrolyte precursor may be dripped, for example, by a dispenser, evenly between the CE and the WE. The WE and CE are pressed together by a roller press, with the electrolyte precursor interposed therebetween. In some embodiments, the pressure of the roller press is in the range of 1 MP-200 MP, and speed can range, for example, from about 0.1 m/s to about 30 m/s. The speed of precursor drip can be estimated, for example, using X*Y*Z ml/s, wherein X (cm) is the thickness of electrolyte, Y (cm/s) is the speed of roller press, Z (cm) is the width of coincident part of WE and CE. This technique can be applied in a cost-effective, large-scale on-line assembling of the ECDs.

At 214, the electrolyte solution is cured to form the electrochromic device. In some embodiments, the electrolyte solution may be cured by a thermal process. For example, the electrolyte solution may be cured at 80-120° C. at a pressure of 30 MP to 500 MP for 1 to 30 min. For example, the multilayer thin film assembly may be placed in an oven with uniform heat radiation and baked at a temperature of 90° C. for a time between 1 min and 30 min to form a fully crosslinked solid-state electrolyte thin film, that further bond the WE and CE thin films together.

In some embodiments, the laminated device with polymer electrolyte solution interposed between two electrolyte was dried in an oven at a temperature ranging from 60-140° C. with or without vacuum to form a solid-state electrolyte thin film, that further bond the WE and CE thin films together.

In some embodiments, the electrolyte solution may be cured by UV irradiation. In some embodiments, the electrolyte solution is cured to generate an electrolyte layer having less than 20 wt % of neutral small organic molecules having a molecular weight of 3000 or less. In some embodiments, the electrolyte solution is cured to generate an electrolyte layer having less than 3 wt % of neutral small organic molecules having a molecular weight of 3000 or less. When too many neutral small organic molecules are present in the electrolyte layer, they may inhibit the ion conductivities between the ion storage layer and the electrochromic layer. In some embodiments, the electrolyte solution may be cured to generate an electrolyte layer free of neutral small organic molecules that can be detected or measured by available instruments.

In some embodiments, the multilayer thin film assembly may be placed in an oven with uniform heat radiation and baked at a temperature of 90° C. for a time between 1 min and 30 min to form a fully crosslinked solid-state electrolyte thin film, that further bond the WE and CE together.

In some embodiments, the method 200 further includes 216 in which materials on the first transparent electrode or the second transparent electrode at the area of one of the substrates not covered by another one of the substrates is removed. This operation removes the material(s) above the transparent electrode and exposes the surface of the transparent electrode. Techniques to remove the electrochromic layer, the ion storage layer, and the ion transfer (electrolyte) layer on the surface of the substrate(s) include, but are not limited to, wiping, laser etching, and plasma etching. When wiping with a dust-free paper, a dust-free cloth, or the like, an appropriate solvent may be employed that can dissolve the materials from those layers. For example, the wiping solvent may include, but not be limited to, acetone, ethanol, o-xylene, among others known in the art. Before wiping, a mold of silica gel or other material with the same shape may be used as a protector to avoid film peeling and contamination of the area. When laser etching is used, the apparatus's parameters can be determined according to the thickness and material characteristics of the WE, CE, and ion transport layer. For example, the laser etching may be conducted at a speed of 10 mm/s-600 mm/s, using an energy of 10 w-200 w and a frequency at 10 Hz-20000 Hz.

At 218, a circuit is attached to the area. For example, a circuit to control the electrochromic device is connected to the exposed transparent electrode. The circuit can be attached to the area, for example, by adhering a double-sided conductive tape or dispensing the conductive paste/ink to the area to form the conductive wires with a certain width in the exposed conducting areas. A flexible printed circuit board, silver paste, or copper wire can be adhered onto the circuit and extended to make connection with a power source.

The all solid-state thin film electrochromic device formed using the above operations can then be encapsulated into various products for various applications, such as in automobiles, airplanes, buildings, sunglasses, medical treatment, and education, among many others.

Embodiment 1

Figure 4:
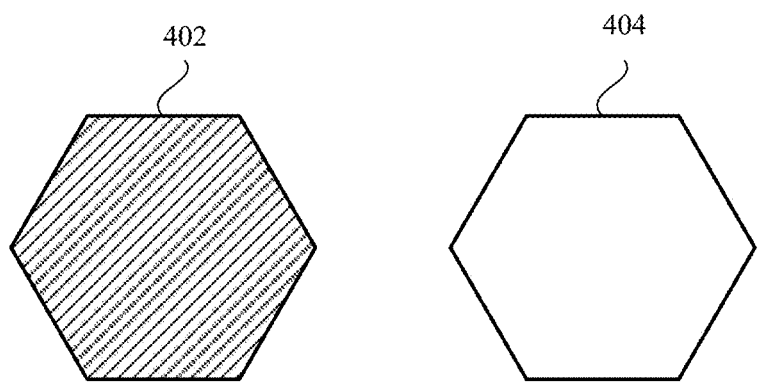
FIG. 4 illustrates hexagonal electrochromic layer film and ion storage layer film, according to one example embodiment.

1. Preparation of WE Thin Film 800 mg of the poly(ethylhexanepropylenedioxythiophene) is dissolved in 10 ml of o-xylene, magnetically stirred for ten hours to form a solution. The solution is uniformly applied to the surface of the nano-silver transparent conductive film (a substrate coated with a nano-silver conductive layer) by a sheet slit coating apparatus. The coated electrochromic layer film is baked at a high temperature of 120° C. for 30 min to form a film with a good adhesion on the surface of the flexible conductive substrate to obtain a WE. Thereafter, the as-fabricated electrochromic layer film is cut into a shape 402 as shown in FIG. 4 by a die cutting machine.

2. Preparation of Ion Storage Layer Film (CE)

A magnetron sputtering technique is used to deposit a tungsten trioxide film with a thickness of several tens of micrometers on the surface of the nano-silver transparent flexible conductive film at room temperature to obtain an ion storage layer film. The ion storage layer film is then cut into the same shape (404) as the electrochromic layer film by a die cutter as shown in FIG. 4.

3. Preparation of Ion Transfer Layer

A brush-type polymer is employed as the ion transfer layer (electrolyte). The polymer is mixed with a lithium salt and an ultraviolet curing initiator in a mass ratio of 45/45/10.

Figure 5:
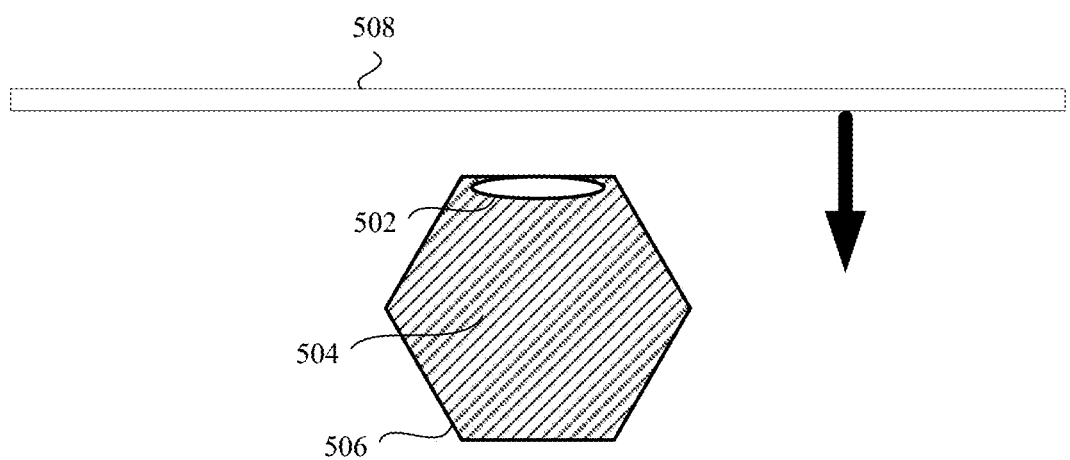
FIG. 5 is a schematic diagram showing a method for dispensing a precursor for electrolyte on an electrochromic layer using a wire bar coater, according to one example embodiment.

After magnetic stirring for 30 minutes, ultrasonic vibration is used to defoam the mixture for 30 minutes to obtain a precursor solution that is ready to use. The precursor 502 is dispensed on the edge of the electrochromic layer 504 and is uniformly distributed to the surface of the WE 506 by a wire bar coater 508, as shown in FIG. 5.

4. Fitting and Curing

Figure 6:
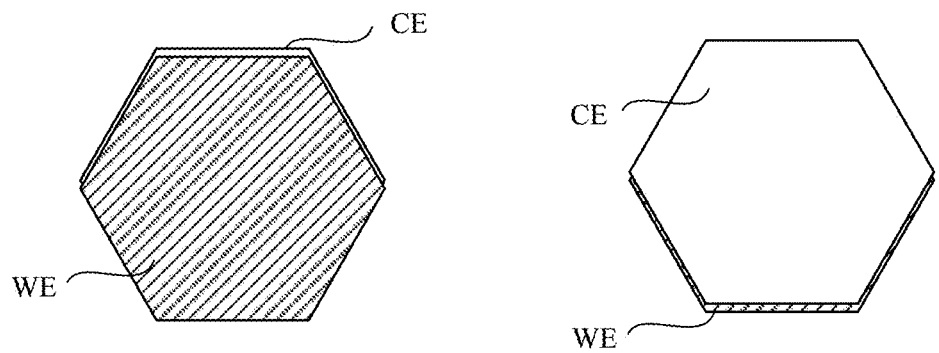
FIG. 6 is a schematic diagram showing that an ion storage layer is overlaid on an electrolyte-coated electrochromic layer in a staggered manner, according to one example embodiment.

The ion storage layer is overlaid on the electrolyte-coated electrochromic layer in a staggered manner, as shown in FIG. 6 with the WE and CE facing each other. The laminated composite film is then fed into a roller press to remove air bubbles in the composite film layer. After defoaming, the laminated ECDs is placed under UV light, and the electrolyte precursor is thereby thoroughly crosslinked to form a solid composite and to bond WE and CE together to form an ECD.

5. Exposure of the Conductive Areas and Circuit Layout

Figure 7:
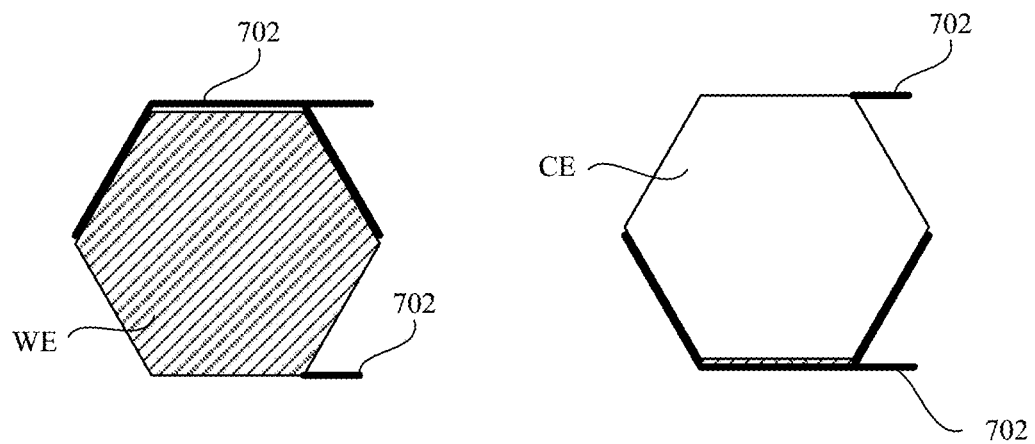
FIG. 7 is a schematic diagram showing a circuit for an electrochromic device, according to one example embodiment.

The electrolyte and WE left on the reserved circuit area (in a strip shape) are wiped off with acetone. The ion storage layer is etched away with a laser to expose the conductive layer. A copper conductive tape 702 is adhered on the exposed area of the conductive layer and extended out to be the positive and negative electrodes, wherein the lead connected to the WE is a positive electrode, and the lead connected to the CE is a negative electrode. The circuit layout and wiring are shown in FIG. 7.

Embodiment 2

1. Preparation of Electrochromic Layer Thin Film (WE)

800 mg of ECP (a copolymer of the 2,5-dibromo- and 2,5-tributylstannyl-2-ethyl-hexyloxy-substituted ethylhexane-3,4-propylenedioxythiophene (ProDOT-$(CH_2OEtHx)_2$) and 4,7-dibromo-2,1,3-benzothiadiazole (BTD)) is dissolved in 10 ml of o-xylene, magnetically stirred for ten hours to form a solution. The solution is uniformly applied to the surface of the ITO transparent conductive film by spin-coating. Then, the coated electrochromic layer film is baked at a temperature of 120° C. for 30 min to form a film that adheres well to the surface of the flexible conductive film to obtain an electrochromic layer film. Thereafter, the electrochromic layer film is cut into a desired shape by a die cutting machine.

2. Preparation of Ion Storage Layer Film (CE)

An ink of $Nb_2O_5$, with or without doping of $TiO_2$, is coated via the slot-die coating with a thickness of several tens of nanometers on the surface of an ITO transparent flexible conductive film at room temperature to obtain an ion storage layer film.

3. Preparation of Ion Transfer Layer

A brush-type polymer is employed as the ion transfer layer (electrolyte). The polymer is mixed with a lithium salt and a thermal curing initiator in a mass ratio of 50/45/5. After magnetic stirring for 10 min, ultrasonic vibration is used to defoam the mixture for 10 min to obtain a precursor solution that is ready to use. The precursor is uniformly applied to the surface of the electrochromic layer by screen printing.

4. Fitting and Curing

The ion storage layer is overlaid on the electrolyte-coated electrochromic layer in a staggered manner. The laminated composite film is then flattened by a vacuum laminating machine and defoamed at a high pressure to remove bubbles in the composite film layer, and then the composite film is cured at a high temperature of 100° C. for 10 min to form a solid composite and to bond WE and CE together to form an ECD.

5. Exposure of the Conductive Areas and Circuit Layout

The electrolyte and WE left on the reserved circuit area (in a strip shape) are wiped off with acetone. The ion storage layer is etched away with a laser to expose the conductive layer. A silver wire or a silver paste cloth is used to form the circuit on the exposed area of the conductive layer, and the positive and negative electrodes are wired out by fixing the FPC using silver glue, wherein the lead connected to the WE is a positive electrode, and the lead connected to the CE is a negative electrode.

Embodiment 3

1. Preparation of Electrochromic Layer Thin Film (WE)

Thin film preparation steps are same as described in the embodiment 1, above. Other than that, the WE is cut into a square shape with a size of 2 cm×2 cm by a die cutting machine.

2. Preparation of Ion Storage Layer Film (CE)

Thin film preparation steps are same as described in embodiment 2, above. Other than that, the CE is cut into a square shape with a size of 2 cm×2 cm by a die cutting machine.

3. Preparation of Ion Transfer Layer

Same as described in embodiment 1, above.

4. Fitting and Curing

The ion storage layer is overlaid on the electrolyte-coated electrochromic layer in a staggered manner. The laminated thin film is then flattened by a vacuum laminating machine and defoamed at a high pressure to remove bubbles in the composite film layer, and then the electrolyte precursor is thoroughly crosslinked via UV irradiation to form a solid composite and to bond the WE and the CE together to form an ECD.

5. Exposure of the Conductive Areas and Circuit Layout

The electrolyte and WE left on the reserved circuit area (in a strip shape) are wiped off with acetone. The ion storage layer is etched away with a laser to expose the conductive layer. A copper tape is used to form the circuit on the exposed area of the conductive layer, and the positive and negative electrodes are wired out by capper tapes, wherein the lead connected to the WE is a positive electrode, and the lead connected to the CE is a negative electrode.

Embodiment 4

1. Preparation of Electrochromic Layer Thin Film (WE)

Figure 8A:
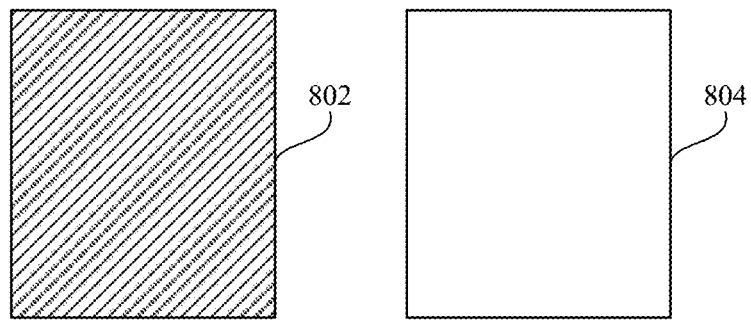
FIG. 8A illustrates rectangular electrochromic layer film and ion storage layer film, according to one example embodiment.

1000 mg of the poly(ethylhexane propylenedioxythiophene) is dissolved in 10 ml of o-xylene, magnetically stirred for ten hours, and the solution is uniformly applied to the surface of the nano-silver transparent conductive film by a sheet slit coating apparatus. The coated electrochromic layer film is baked at a high temperature of 120° C. for 30 min to form a film with good adhesion on the surface of the flexible conductive substrate to obtain a WE (802). Thereafter, the WE 802 is cut into a shape as shown in FIG. 8A by a die cutting machine.

2. Preparation of Ion Storage Layer Film (CE)

Prussian blue functionalized with ligands is suspended in alcohol and coated on the surface of the transparent FTO flexible conductive film by a slit coating technique to obtain an ion storage layer film. After coating, the film is baked at 100° C. for 20 min to obtain a CE (804) (FIG. 8A). The ion storage layer film is then cut into the same shape as the electrochromic layer film by a die cutting machine.

3. Preparation of Ion Transfer Layer

Same as described in embodiment 1, above.

4. Fitting and Curing

Figure 8B:
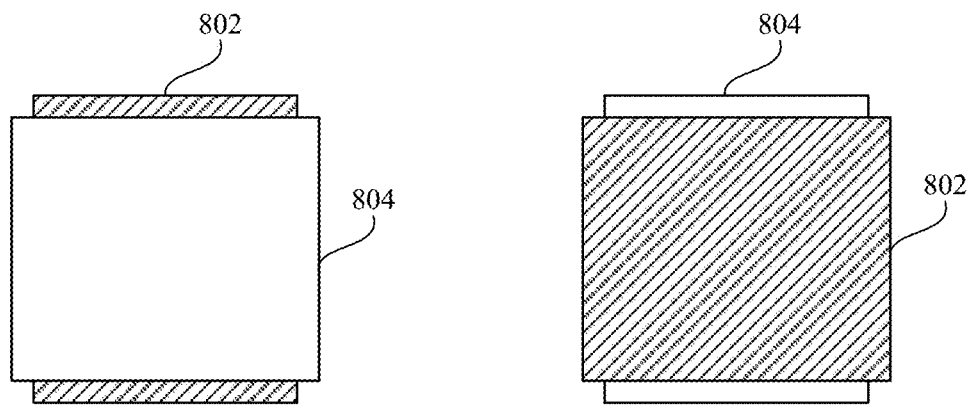
FIG. 8B is a schematic diagram showing that the ion storage layer shown in FIG. 8A is overlaid on the electrolyte-coated electrochromic layer shown in FIG. 8A in a staggered manner, according to one example embodiment.

The ion storage layer is overlaid on the electrolyte-coated electrochromic layer in a staggered manner, as shown in FIG. 8B. The laminated composite film is fed into a roller press to remove air bubbles in the composite film layer. After defoaming from the roll press, the composite film electrochromic layer is cured under UV irradiation to obtain the all solid state ECD.

5. Exposure of the Conductive Areas and Circuit Layout

Figure 8C:
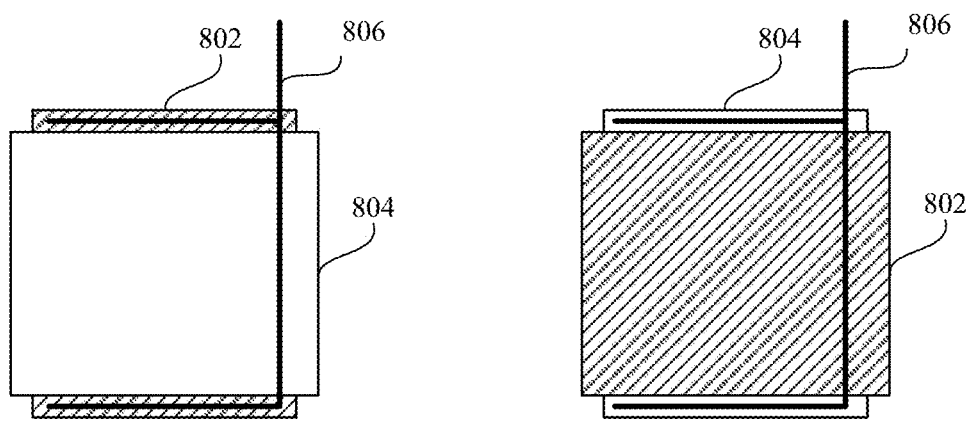
FIG. 8C is a schematic diagram showing a circuit for the electrochromic device shown in FIG. 8B, according to one example embodiment.

The electrolyte, WE 802 and CE 804 left on the reserved circuit area are wiped off with acetone. A silver wire or a silver paste cloth is used to form the circuit 806 on the exposed area of the conductive layer. The conductive cloth is placed on the exposed area of the conductive layer to directly wire out the positive and negative electrodes, wherein the lead-out end of the electrochromic layer is a positive electrode, and the lead portion of the ion storage layer is a negative electrode. The circuit layout is shown in FIG. 8C.

Embodiment 5

1. Preparation of Electrochromic Layer Thin Film (WE)

Thin film preparation steps are the same as described in embodiment 1, above. Other than that, the WE is cut into a rectangular shape with a size of 4 cm×20 cm by a die cutting machine.

2. Preparation of Ion Storage Layer Film (CE)

Thin film preparation steps are the same as described in embodiment 2, above. Other than that, CE is cut into a rectangular shape with a size of 4 cm×20 cm by a die cutting machine.

3. Preparation of Ion Transfer Layer

Same as described in embodiment 1, above.

4. Fitting and Curing

Same as described in embodiment 1, above. Other than that, the all-solid state ECD is a rectangular shape with a size of 4 cm×20 cm by a die cutting machine.

Embodiment 6

1. Preparation of Electrochromic Layer Thin Film (WE)

600 g of ECP (a copolymer of the 2,5-dibromo- and 2,5-tributylstannyl-2-ethyl-hexyloxy-substituted ethyl-hexane-3,4-propylenedioxythiophene (ProDOT-$(CH_2OEtHx)_2$) and 4,7-dibromo-2,1,3-benzothiadiazole (BTD)) is dissolved in 10 L of o-xylene and magnetically stirred for ten hours to form a solution. The solution is uniformly applied to the surface of full roll of PET substrate with ITO transparent conductive film by roll to roll coating. The width of the PET substrate is 50 cm. Then, the coated electrochromic layer film was baked at a high temperature of 140° C. for 3 min. The WE thin film is then winded into a roll.

2. Preparation of Ion Storage Layer Film (CE)

Prussian blue functionalized with ligands is suspended in alcohol and coated on the surface of a full roll of PET substrate with ITO transparent conductive film by roll to roll coating. The width of the PET substrate is 50 cm. After coating, the film is baked at 120° C. for 2 min. After that, a roll of CE thin film is obtained by winding.

3. Preparation of Ion Transfer Layer

Same as described in embodiment 1, above.

4. Fitting and Curing

Figure 9:
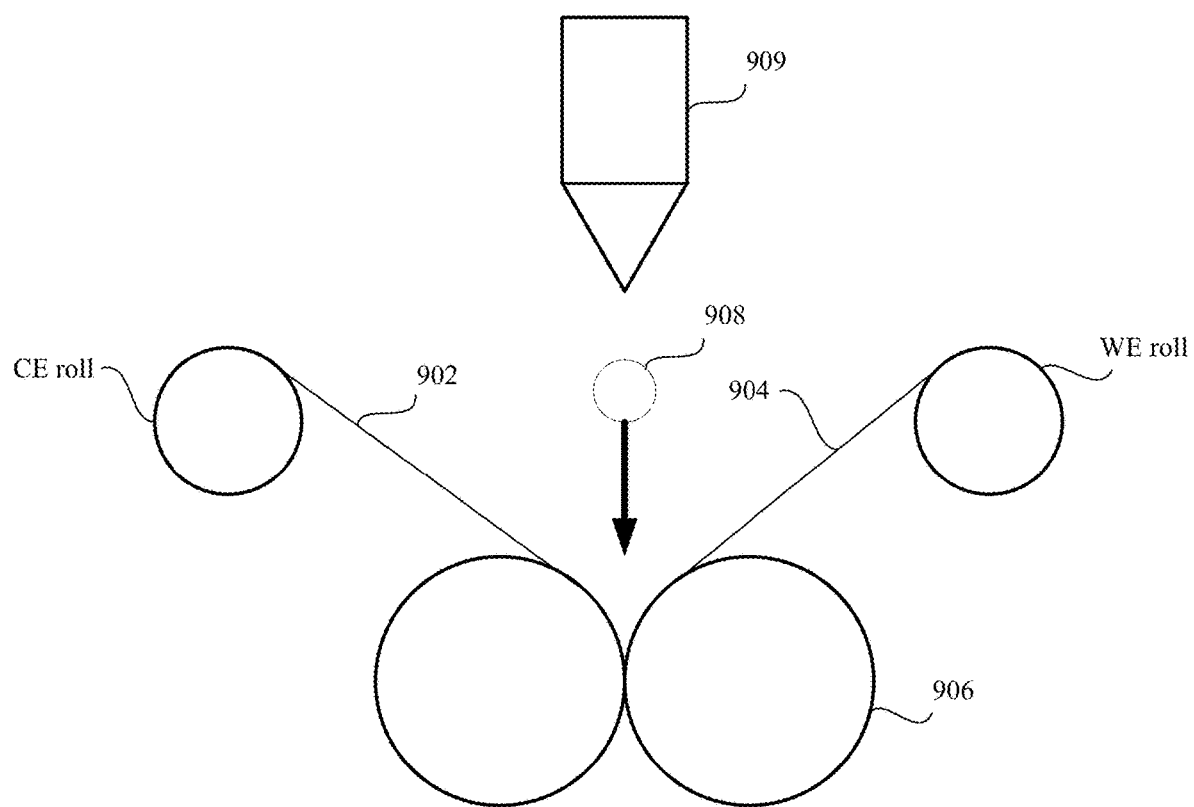
FIG. 9 is a schematic diagram showing a roller press technique to laminate an electrochromic layer film and an ion storage layer film with an electrolyte precursor dispensed therebetween, according to one example embodiment.

Reference is made to FIG. 9. The CE film 902 and the WE film 904 are pressed together in a roller press 906. And those two films are completely coincident. The speed of roller press 906 is 5 m/s. The rate of the precursor drip 908 is 25 ml/s. At the same time, the dispenser 909 dripped the electrolyte precursor evenly in the middle of the CE film 902 and the WE film 904 as shown in FIG. 9. The laminated ECD is exposed to UV radiation, and the electrolyte is thereby crosslinked to form a solid composite and to bond the WE 904 and the CE 902 together.

5. Exposure of the Conductive Areas and Circuit Layout

The large size all solid-state device is cut into a desired shape by laser semi-cutting technology. Then, the electrolyte, the CE, and the WE left on the reserved circuit area (in a strip shape) are wiped off with acetone. A copper conductive tape is adhered on the exposed area of the conductive layer and extended out to be the positive and negative electrodes, wherein the lead connected to the WE is a positive electrode, and the lead connected to the CE is a negative electrode.

Embodiment 7

1. Preparation of Electrochromic Layer Thin Film (WE)

600 mg of ECP (a copolymer of the 2,5-dibromo- and 2,5-tributylstannyl-2-ethyl-hexyloxy-substituted ethyl-hexane-3,4-propylenedioxythiophene (ProDOT-$(CH_2OEtHx)_2$) and 4,7-dibromo-2,1,3-benzothiadiazole (BTD)) is dissolved in 10 ml of toluene and magnetically stirred for ten hours to form a solution. The solution is uniformly applied to the surface of a flexible ITO transparent conductive substrate with a size of 10 cm×10 cm by slot-die coating. Then, the coated WE is baked at a high temperature of 80° C. for 30 min to form a film and to adhere well to the surface of the flexible conductive film to obtain the WE.

2. Preparation of Ion Storage Layer Film (CE)

400 mg of poly(nitronylnitroxylstyrene) is dissolved in 10 ml of N-Methyl-2-Pyrrolidone and magnetically stirred for ten hours to form a solution. The solution is uniformly applied to the surface of a flexible ITO transparent conductive substrate with a size of 10 cm×10 cm by slot-die coating. The coated CE film is dried at a temperature of 100° C. for 30 min to form the CE.

3. Preparation of Ion Transfer Layer

Ion conducting polymers chemically linked with plasticizing linear polymers are used in this embodiment. The polymers are mixed with a lithium salt in a mass ratio of 60/40. After magnetic stirring for 30 minutes, ultrasonic vibration is used to defoamed the mixture for 30 minutes to get a precursor solution that is ready to use. The precursor is dripped by a dispenser evenly between the CE film and the WE film. The as-fabricated WE or and CE are pressed together in a roller press with the electrolyte precursor disposed therebetween. The pressure of the roller press is 100 MP, and speed is 10 m/s. The rate of precursor drip is 10 ml/s. The composite film is cured at a high temperature of 100° C. for 10 min to form a solid composite and to bond the WE and CE together.

4. Fitting and Curing

The electrolyte and WE left on the reserved circuit area (in a strip shape) are wiped off with acetone. The ion storage layer is etched away with a laser to expose the conductive layer. A copper tape is used to form the circuit on the exposed area of the conductive layer, and the positive and negative electrodes are wired out by fixing the FPC using silver glue, wherein the lead connected to the WE is a positive electrode, and the lead connected to the CE is a negative electrode.

Figure 10:
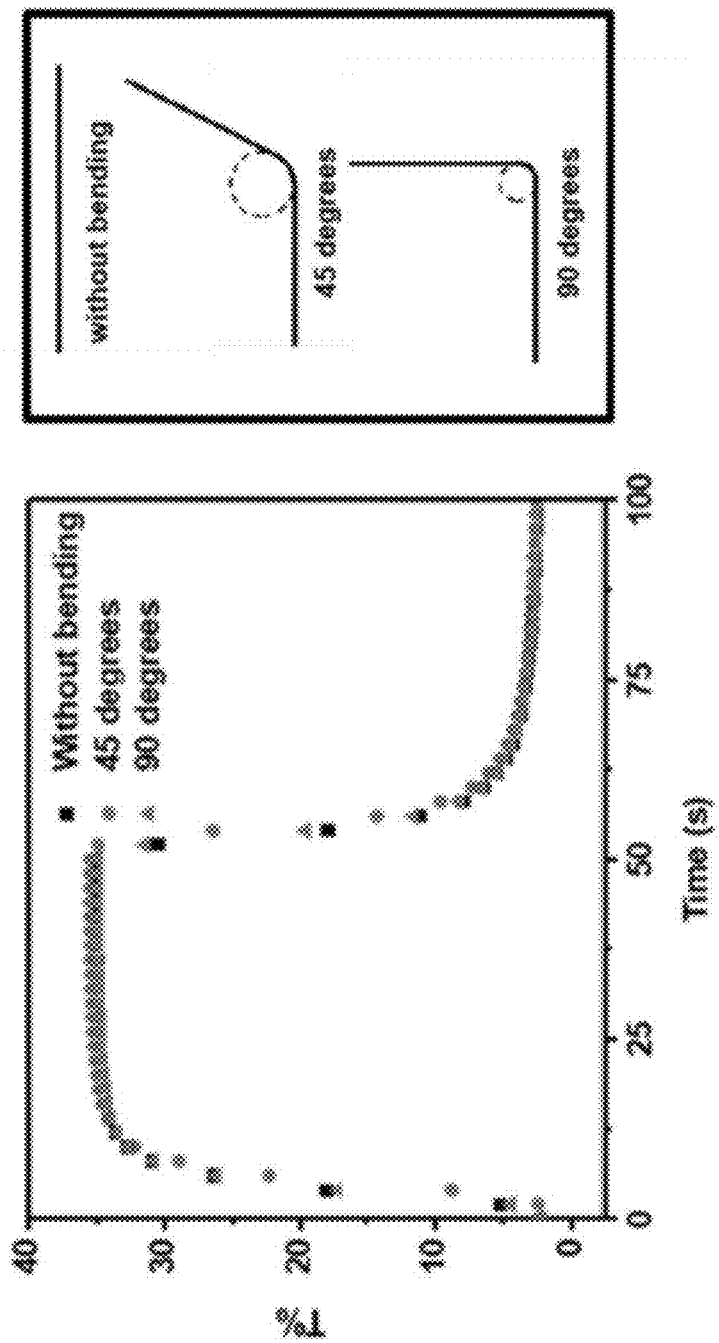
FIG. 10 is a diagram showing transmittance changes of the thin-film ECDs bent at different angles, according to one example embodiment.
Figure 11C:
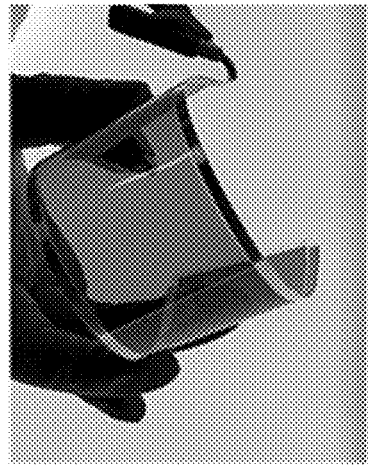
FIGS. 11(A)-(E) are pictures showing ECDs in various operations according to example embodiments.
Figure 11B:
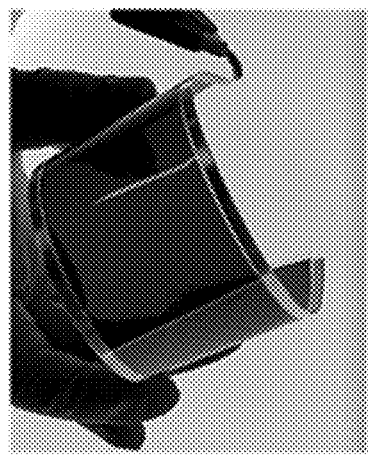
Figure 11A:
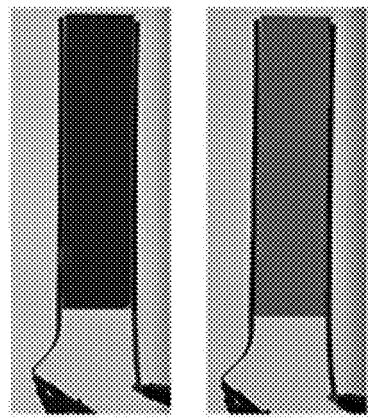
Figure 11E:
Figure 11D:
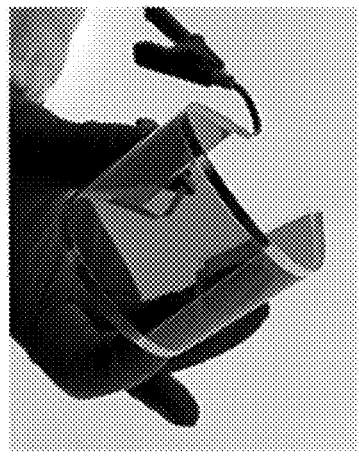

Due to the lack of physical support, the requirement of chambers for receiving the electrolytes, and the delicate sealing techniques needed, liquid or gel based ECDs are not robust and cannot be easily bent. The embodiments of this disclosure provide a solid electrolyte layer which completes solid-state ECDs. The ECDs of the present disclosure can be bent and fixed into 0 degrees to 360 degrees bended shapes, with small radii of curvature (e.g., as low as 2.5 cm), which demonstrates the capability to be adapted to any surface having virtually any shape(s) and curvature(s). For example, as shown in FIG. 10, thin-film all-solid-state ECDs made consistent with embodiments of the present disclosure are bent and fixed into certain degrees, and their transmittance changes have been measured in-situ when switching between −1.2 and 1.5 V. The radius of curvature of the ECD bent at 45 degree is 7.8 cm in this example. The most extreme bending in this example, wherein the radius of curvature was 4.2 cm, demonstrated by the disclosed all-solid-state ECDs was 90 degrees, which shows a great potential to be adapted onto most of the curved surfaces in many applications including sunroof, rearview mirror, building windows, and so on. In contrast, to achieve any significant degree of bending without causing the issues (like the damage of WE or CE, contact of WE and CE with one another, etc.), tremendous efforts are needed in the sealing and encapsulation of liquid or gel based ECDs known in the art. ECDs of the present disclosure that have all-solid electrolyte layers, however, do not require any such measures.

FIG. 11 are pictures showing ECDs in operations according to example embodiments. In FIG. 11(A), ECDs are in a colored/dimming state (up) and a bleached state (down) without bending. In FIG. 11(B), the ECD is in the colored/dimming state when curved into a near semi-circle. In FIG. 11(C), the ECD is in the bleached state when curved into a near semi-circle. In FIG. 11(D), the ECD is in the colored/dimming state when curved into a circle. FIG. 11(E), the ECD is in the bleached state when curved into a circle. These examples indicate that the ECDs formed according to the embodiments of this disclosure are very flexible and stable.

Figure 12:
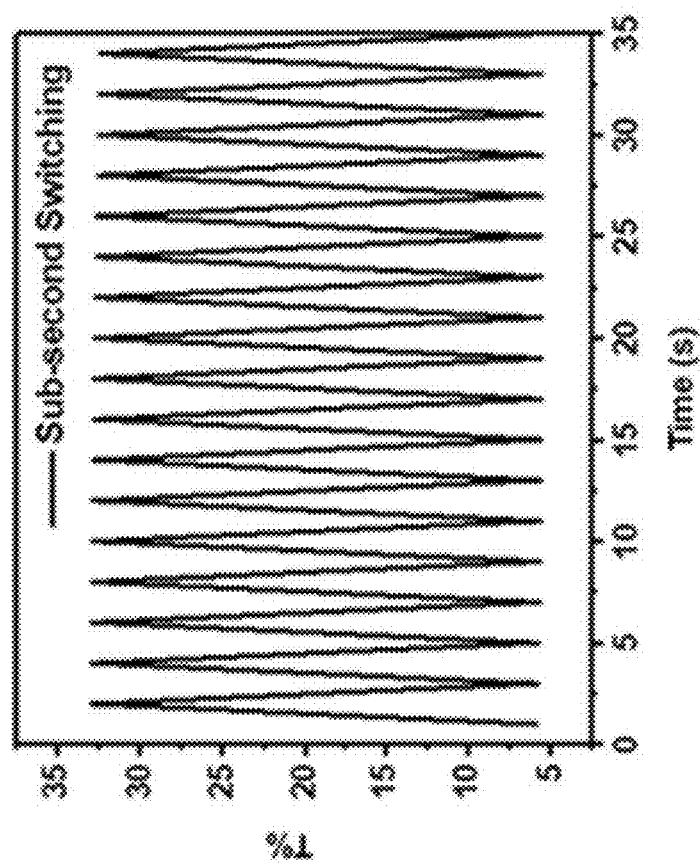
FIG. 12 is a diagram showing transmittance change of an ECD with one second switching time, according to one example embodiment.

The disclosed all-solid-state ECDs demonstrate rapid switching time for coloring and bleaching. For example, 0.1 s-1 s switching times can be achieved. A 2 cm×2 cm ECD is subjected to one second double-potential switching between −1.2 and 1.5 V, and the transmittance change is measured in-situ. As shown in FIG. 12, the ECD switched in one second can achieve ~90% of the optical contrast at a complete switch, which indicated that the tested all solid-state ECD has a fast switching kinetic.

Due to the solid-state form of the electrolyte layer, it is possible to fabricate the electrolyte film as thin as, for example, 0.1 μm. By manufacturing-friendly and cost-efficient processes, including roller, plate, or vacuum press processes, among others known in the arts, it can be easily fabricated down to, for example, 5 μm, thus the all-solid state ECDs can be as slim as, for example, 25 μm. The thickness of each layer and ECDs can be further reduced. The slim design for the disclosed all-solid-state ECDs can be a great advantage to be applied for small integrated systems.

Due to very low viscosity of a liquid or gel electrolyte, the roller, plate, or vacuum press processes cannot be used for liquid or gel electrolyte based ECDs. However, due to the robustness and high temperature tolerance, the disclosed all-solid-state ECDs allow continuous manufacturing friendly and cost-efficient processes, such as roll-to-roll coating and roller press processes for cheap large-scale on-line production and allow easy encapsulation into products for various applications.

Further, due to the use of the solid-state electrolyte, there will be no delamination, or many side reactions occurring at the WE, CE/electrolyte interfaces. Thus, the disclosed ECDs show a better cycling performance. Low voltage consumption of the disclosed solid-state ECDs (can be as low as 1.5 V) is beneficial for battery powered applications.

Figure 13A:
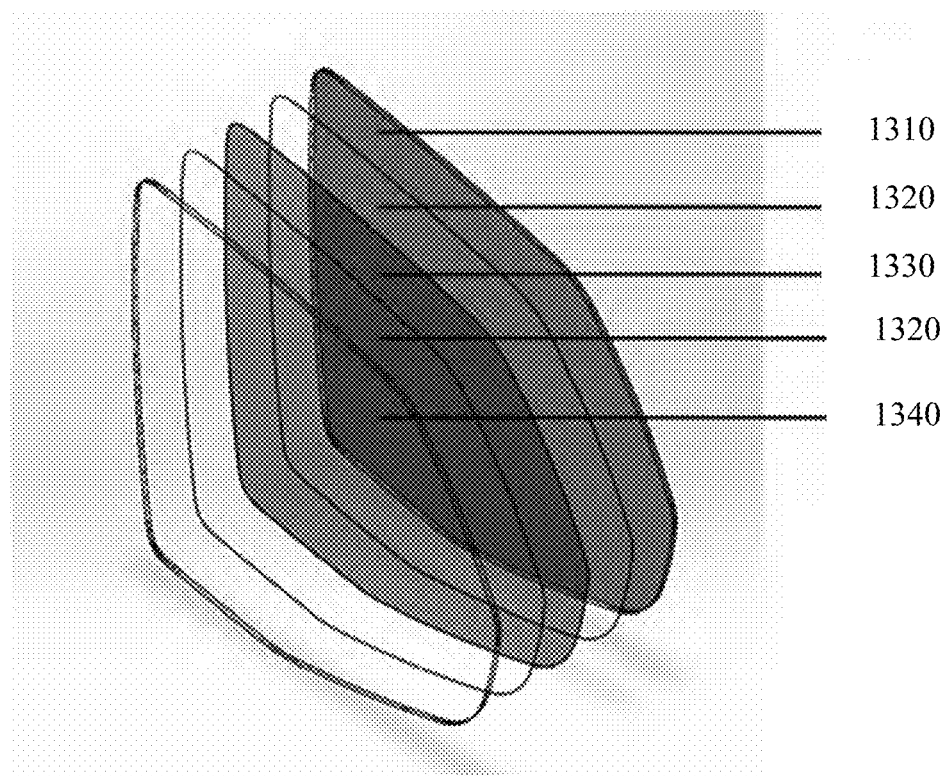
FIG. 13A is an explosive view of an anti-glare rearview mirror containing a solid-state ECD, according to one example embodiment.
Figure 13B:
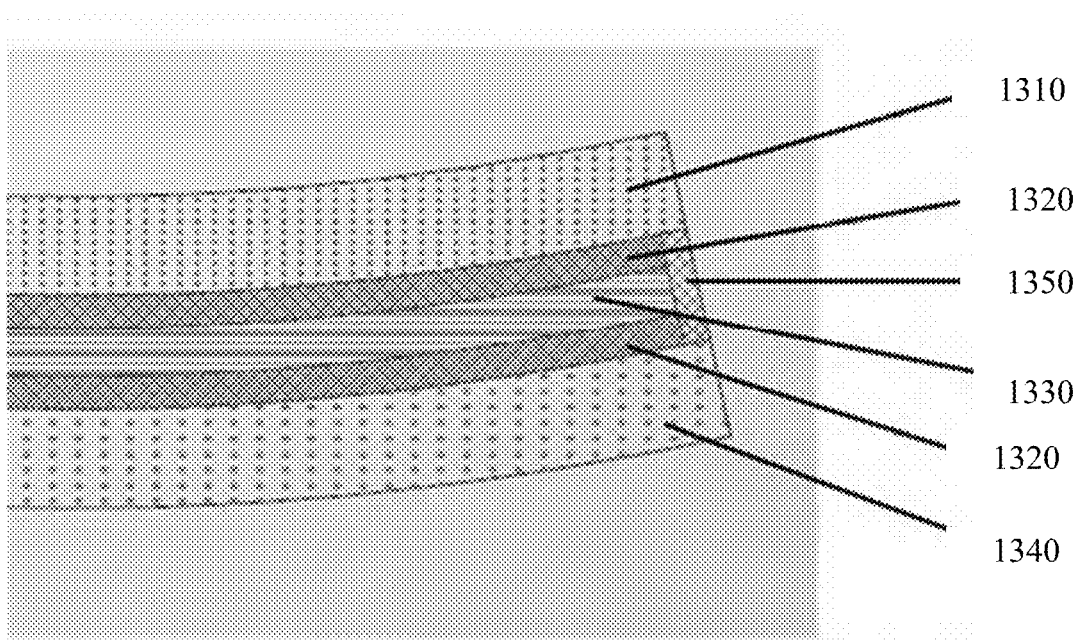
FIG. 13B is a schematic diagram illustrating a cross-section view of the anti-glare rearview mirror shown in FIG. 13A according to one embodiment.
Figure 13C:
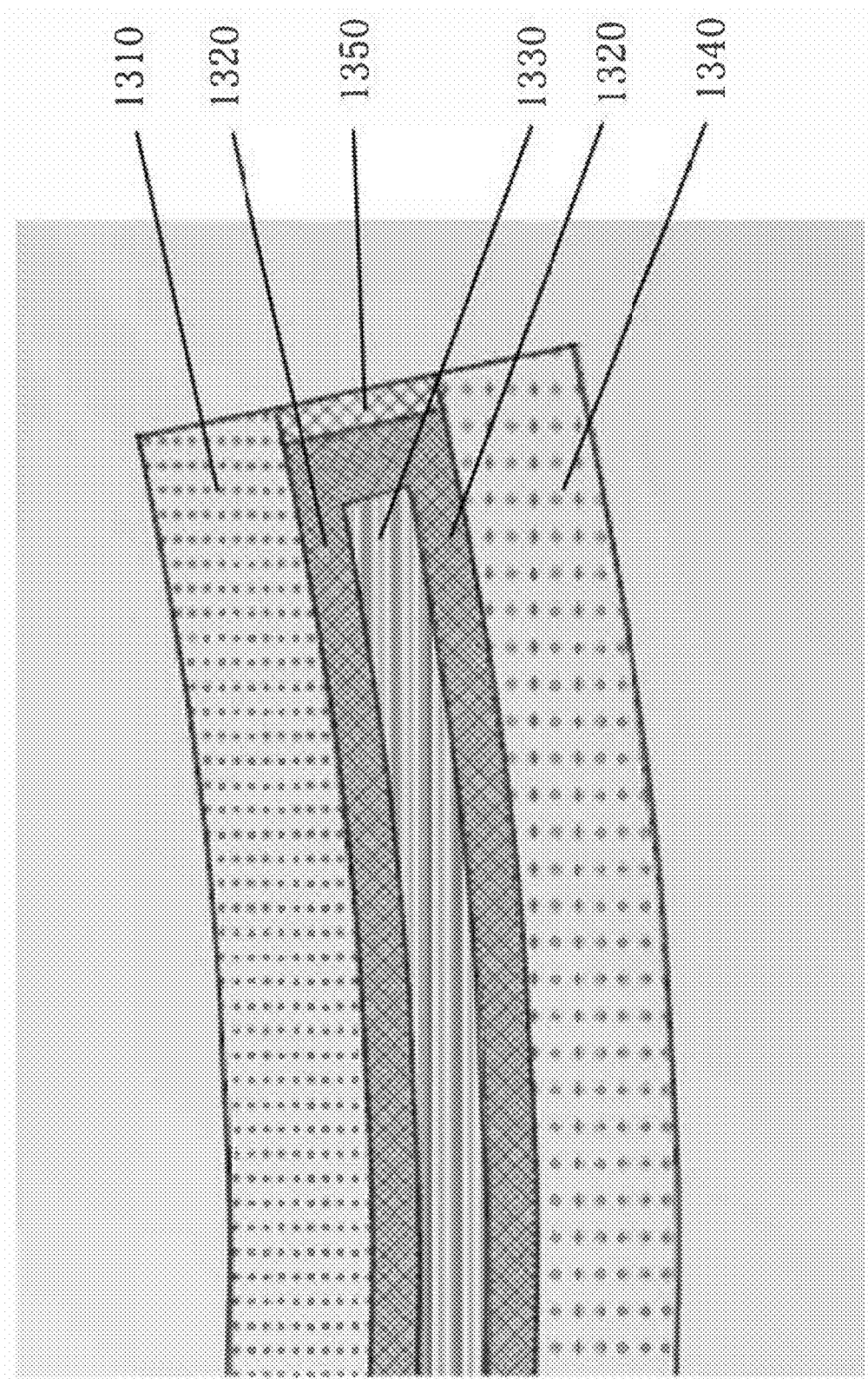
FIG. 13C is another schematic diagram illustrating a cross-section view of the anti-glare rearview mirror shown in FIG. 13A according to another embodiment.

The ECDs formed according to the above techniques can be used in anti-glare rearview mirrors for vehicles. FIG. 13A is an explosive diagram of an anti-glare rearview mirror 1300 containing an ECD according to one example embodiment. FIG. 13B is a schematic diagram illustrating a cross-section view of the anti-glare rearview mirror 1300. FIG. 13C is another schematic diagram illustrating a cross-section view of the anti-glare rearview mirror 1300. The edges of the adhesive layers can be flush with (FIG. 13B) or beyond edges of the ECD (FIG. 13C). The anti-glare rearview mirror 1300 includes a mirror 1310, an adhesive layer 1320, a solid-state ECD 1330, a glass plate 1340, and a sealant 1350.

The mirror 1310 has two surfaces. Normally, the surface facing to the adhesive 1320 is coated with a reflective layer, which may be made by a pure metal (such as cadmium, silver, aluminum, rhodium, iridium or the like), an alloy (such as bronze, silver alloy or the like), a non-metallic material (such as silicon dioxide, titanium dioxide with polymer matrix or the like), a hybrid material (such as metal with non-metal materials), or the combination thereof. In some cases, the surface facing to the air instead of the adhesive 1320 can also be coated with a reflective layer to perform as a mirror. The thickness of the reflective layer ranges, for example, from 0.01 mm to 0.5 mm. The thickness of the mirror ranges, for example, from 0.5 mm to 2.5 mm. The reflection rate of the mirror ranges, for example, from 50% to 100%. The mirror can be flat or with a certain or varied curvature. Regarding the non-flat mirrors, curvature radius ranges, for example, from 10 mm to 1500 mm.

The adhesive 1320 is a transparent adhesive. Example transparent adhesives include optical clear adhesive (OCA) (for example resin OCA, liquid OCA or solid OCA), hot melting adhesives (including but not limited to ethylene vinyl acetate membrane (EVA) and polyvinyl butyral membrane (PVB)), among others now known or later developed. Example curing methods include moisture curing, heat curing, UV curing, among others now known or later developed. When it comes to optical clear adhesive, UV curing, or moisture curing is commonly performed after the adhesive is applied to the surface or encapsulated in the EC mirror. When it comes to hot melting adhesive, heat curing is commonly performed during the incorporating process. The light transmittance of the selected adhesive may be between 80%-100%. Besides, the selected adhesive needs to have a similar refractive index with the one from the glass, which is normally between 1.1-1.6. The thickness of the adhesive ranges, for example, from 0.05 mm to 0.5 mm.

The all solid-state thin-film electrochromic device (ECD) 1330 is consistent with those disclosed above. The thickness of the ECD 1330 ranges, for example, from 0.02 mm to 3.0 mm.

The glass plate 1340 may have a high light transmission rate between 50%-100%. Typically, the surface facing the opposite of the EC mirror is modified to eliminate the reflective rate with a reflection rate less than 4%. The glass can be flat or with a certain or varied curvature. Regarding the non-flat glass plates, curvature radius ranges, for example, from 10 mm to 1500 mm.

The sealant 1350 has very good adhesion to the glass and is waterproof. Example sealant includes butyl rubber, epoxy rubber, polyurethane, acrylic, among the others now known or later developed. This sealant can have a volume shrinkage of 0.5%-2% during curing (including heat curing, UV curing, moisture curing, among others now known or later developed) to keep the glass plate 1340 and the mirror 1310 stuck together tightly after curing to obtain a better encapsulation. The curing method is selected depending on the characteristics of the sealant.

Depending on different types of adhesives used, at least two example preparation processes are presented hereinafter to encapsulate pre-assembled ECDs into a rearview mirror including both flat and curved ones.

Method A: Optical Transparent Adhesives.

1. Prepare the materials: Cut the adhesive and ECD into the desired shape and size with a die cutting machine or a laser machine or others known in the arts. Set the right instrument parameters to ensure that the cutting process is performed smoothly. The setting parameters for both a die cutting machine and a laser machine are determined based on the thickness and characteristics of the materials. For example, when using an optical clear adhesive with a thickness of 100 urn, the moving speed of the laser machine can range, for example, from 1 mm/s to 600 mm/s. The energy of the laser machine can range, for example, from 1 w to 500 w. The frequency of the laser machine can range, for example, from 1 Hz to 10000 Hz.

Figure 14A:
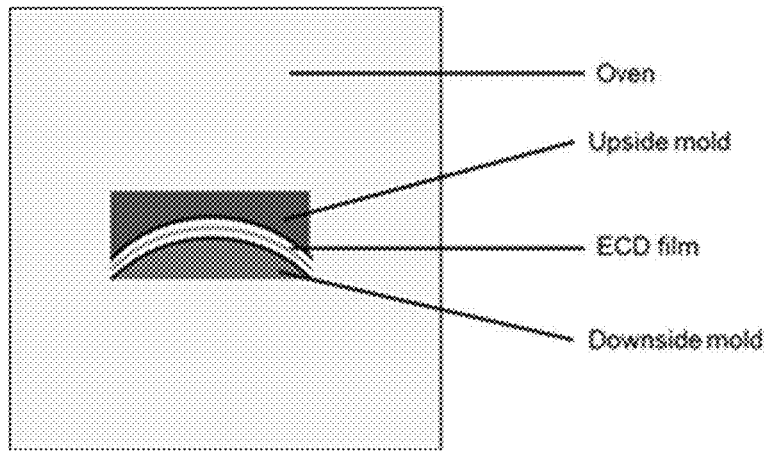
FIGS. 14A and 14B are schematic diagrams illustrating configurations to bend thin films for forming curved rearview mirrors, according to example embodiments.
Figure 14B:
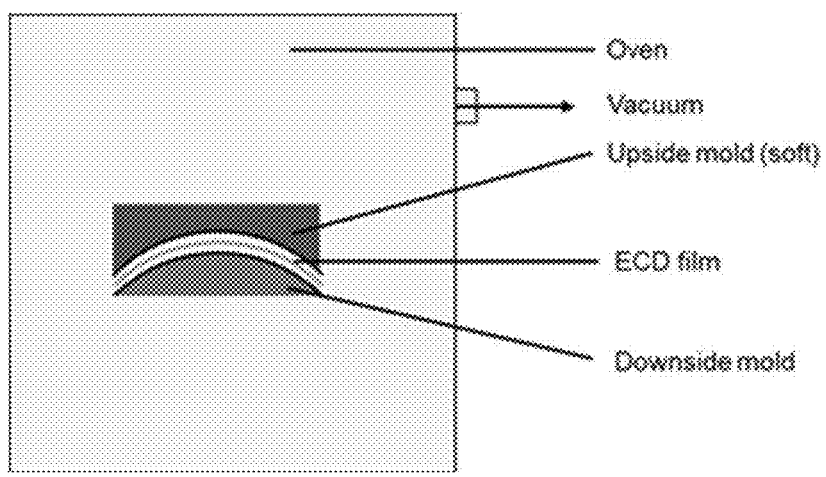

1.1 Thermoforming of the materials: To make a curved rearview mirror, the electrochromic thin film device can be first thermally bent into a curved shape with a certain curvature (curvature radius can range, for example, from 50 mm to infinity) in an oven at 50° C. to 200° C. for 5 min to 30 min using a mold conforming to the shape and curvature of the curved surface with or without vacuum depending on the hardness of the mold (as shown in FIGS. 14A and 14B). This step can help make step 2 below easier since the thermally bent ECD can remain the same curvature as the glass/mirror during the operation. However, because the ECD in this disclosure is flexible and can be bent easily to fit to the surface with any shape and curvature, this step is optional to make curved rearview mirrors with optical transparent adhesives. For a flat rearview mirror, this step can be omitted.

2. Stick the adhesives to the glass/mirror (half-cell): Depending on different states (liquid or solid) of the used adhesives, the procedure can vary. For solid or sticky adhesives, a rolling method (see section 2.1 below for details) or a vertical pressing method (see section 2.2 below for details) is used to apply the adhesives to the surface of glass or mirror. To prepare the flat rearview mirrors, it is easier to perform. To prepare the curved ones, customized tools may be used to assist the process, including but not limited to tools with the same curvature as the one from the glass/mirror. For liquid adhesives, the machines used to dispense the liquid adhesives onto the surface, for example, include dispenser, spraying gun, screen printing machine, coating machine, among others known in the arts. After dispensing the liquid adhesives, a vertical pressing method is normally adopted.

Figure 15:
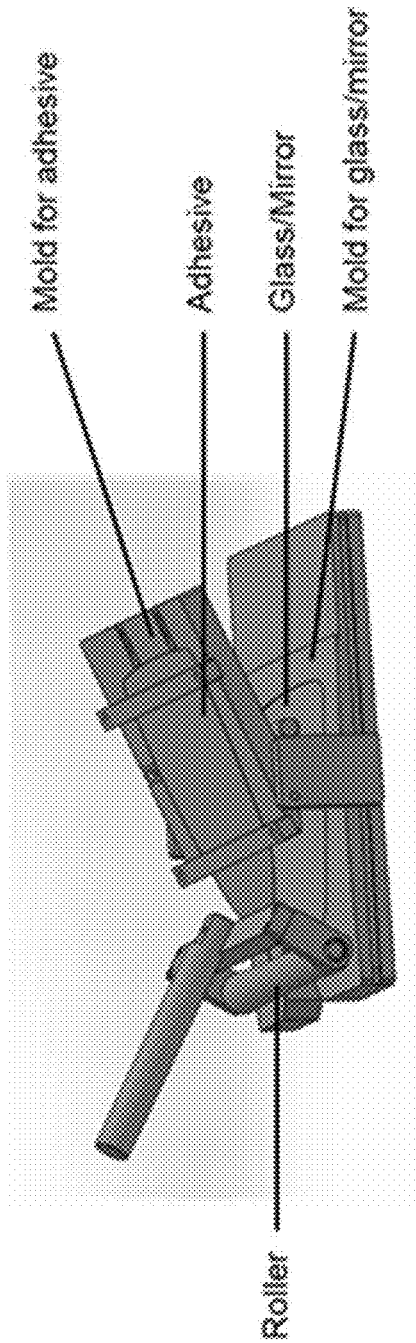
FIG. 15 is a diagram showing a process scheme for forming a rearview mirror, according to one example embodiment.
Figure 16A:
FIGS. 16A and 16B are schematic diagrams illustrating rollers for pressing thin films for forming rearview mirrors, according to example embodiments.
Figure 16B:
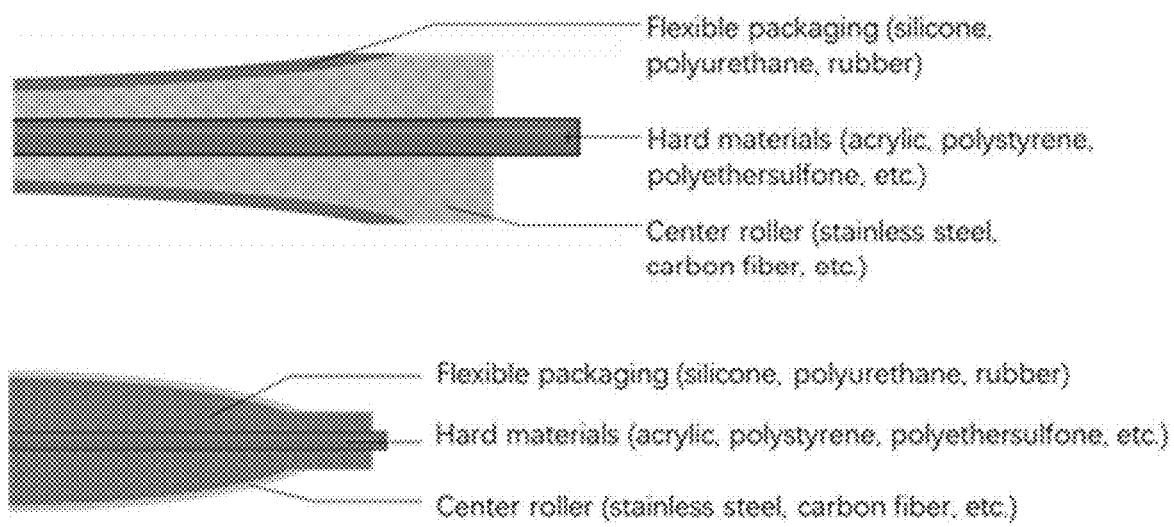

2.1 A rolling method: FIG. 15 is a diagram showing a process scheme for forming a rearview mirror according to one example embodiment. Fix the surface of the glass or mirror (including the flat, curved and spherical surfaces, among the others known in the arts) on the special fixture of the rolling platform with a mold made from materials which are not as hard as steel (example materials include, but not be limited to, rubber, silica gel, polyurethane, polyacrylate, polyester, epoxy, among others known in the arts). The mold is customized according to the curvature of the glass/mirror when it comes to curved samples. Generally, the Shore hardness of the mold is more than 50. The curvature deviation between the roller and the glass/mirror may be less than 10%. Attach the edge of the transparent adhesive to the edge of the glass. The edges of the adhesive layers can be flush with or beyond edges of the ECD according to FIG. 13B and FIG. 13C. The transparent adhesive includes, but not limited to, hot melt adhesive, optical transparent adhesive, among others known in the arts, and its thickness may range, for example, from 10 um to 500 um. The thickness of the glass may range, for example, from 0.5 mm to 1.8 mm. The adhesive and the surface of the glass or mirror are pressed by a roller as shown in FIGS. 16A and 16B, which is made by materials not as hard as steel, (including, but not limited to be rubber, silica gel, polyurethane, polyacrylate, polyester, epoxy, among others known in the arts.). The roller is customized according to the curvature of the glass/mirror. The Shore hardness of the roller is commonly less than 100. The curvature deviation between the roller and the glass/mirror may be less than 10%. During the rolling process, the pressure applied on both the adhesive layer and glass/mirror may range, for example from 100 Pa to 1000 kPa.

Figure 17:
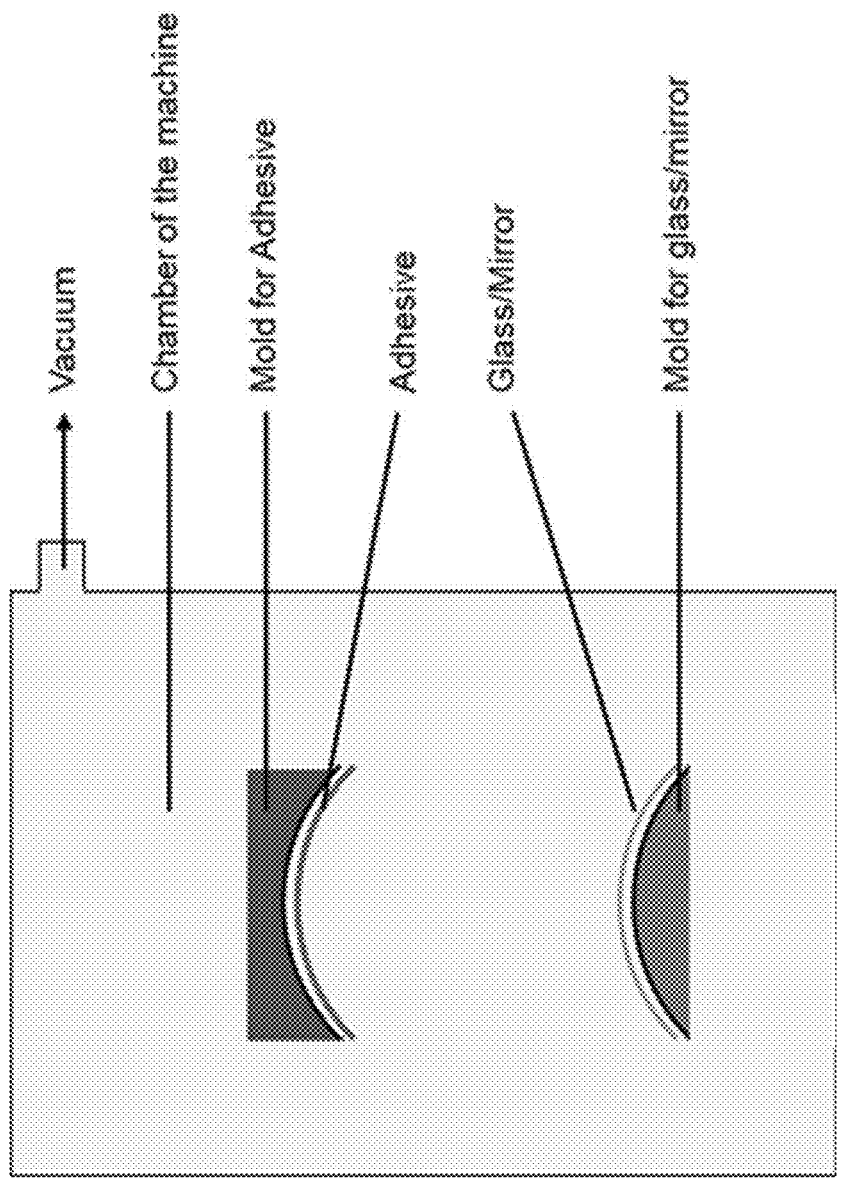
FIG. 17 is a diagram showing another process scheme for forming a rearview mirror, according to one example embodiment.

2.2 A vertical pressing method: FIG. 17 is a diagram showing another process scheme for forming a rearview mirror according to one example embodiment. Fix the glass or mirror (including the flat, curved and spherical ones) onto a mold with curvature determined based on the glass/mirror. The deviation between the curvature radius from the mold and the one from the glass/mirror may range, for example, from 0 mm to 100 mm. Fix the adhesive onto another special mold which curvature is designed based on the mirror/glass. The deviation between the curvature radius from the mold and the one from the glass/mirror may range, for example, from 0 mm to 500 mm. The mold with the adhesive and the one with the mirror/glass are separated and held by a machine to avoid any contact before the pressing process. After the vacuum reaches the set number, normally more than 95%, the mold with the adhesive is pressed onto the mold with the glass/mirror by the engine or gear of the pressing machine for 5 s-15 min. During the pressing process, the pressure applied may range, for example, from 1 kPa to 1000 kPa.

3. Stick the ECD to the glass/mirror (the other half-cell): ECD is adhered to the adhesive layer which is already adhered to the glass/mirror as described in step 2. Example methods used for this step may include, but not be limited to rolling, vertical pressing, among others known in the arts.

Figure 18:
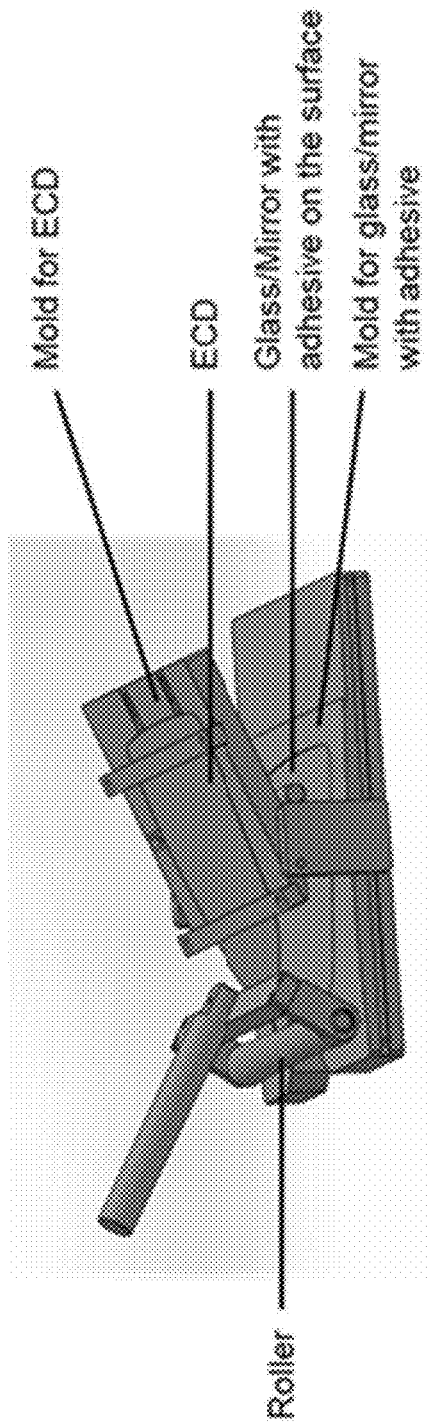
FIG. 18 is a diagram showing a process scheme for forming a rearview mirror, according to one example embodiment.

3.1 A rolling method: FIG. 18 is a diagram showing a process scheme for forming a rearview mirror according to one example embodiment. Fix the glass or mirror with adhesive on the surface (including the flat, curved and spherical surfaces) on the special fixture of the rolling platform with a mold made from materials which are not as hard as steel (Example materials include, but not limited to, rubber, silica gel, polyurethane, polyacrylate, polyester, epoxy, among others known in the arts.). The mold is customized according to the curvature of the glass/mirror. Commonly the Shore hardness of the mold is more than 50. Normally the curvature deviation between the roller and the glass/mirror may be less than 10%. Align the edge of the ECD with the edge of the adhesive on the surface of the glass or mirror. The ECD and the adhesive on the surface of the glass or mirror are pressed by a roller as shown in FIGS. 16A and 16B. The roller is made by materials not as hard as steel (including, but not limited to be rubber, silica gel, polyurethane, polyacrylate, polyester, epoxy, among others known in the arts.). The roller is customized according to the curvature of the glass/mirror. The Shore hardness of the roller is commonly less than 100. The curvature deviation between the roller and the glass/mirror may be less than 10%. During the rolling process, the pressure applied on both the adhesive layer and glass/mirror may range, for example from 100 Pa to 100 kPa).

Figure 19:
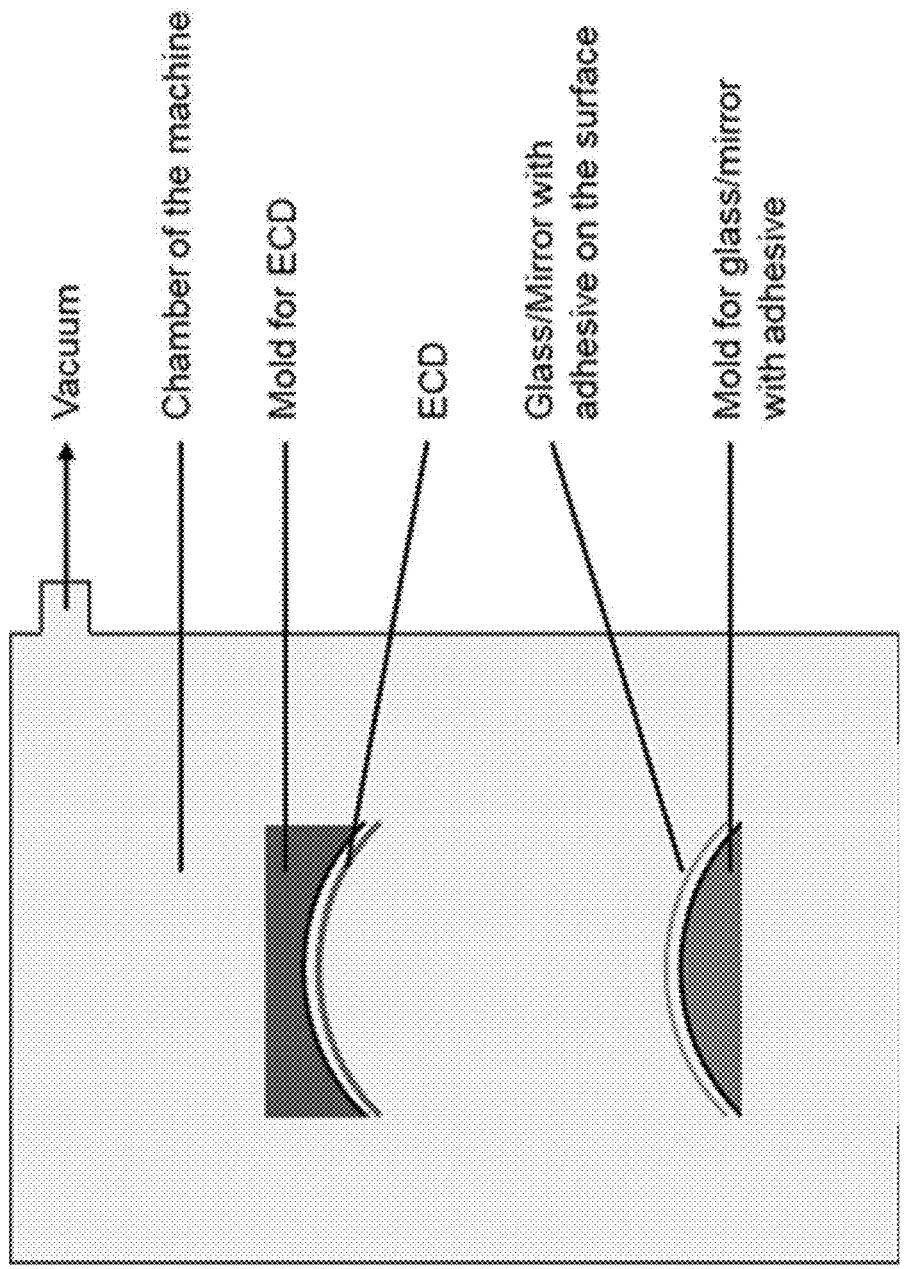
FIG. 19 is a diagram showing another process scheme for forming a rearview mirror, according to one example embodiment.

3.2 A vertical pressing method: FIG. 19 is a diagram showing another process scheme for forming a rearview mirror according to one example embodiment. Fix the glass or mirror with adhesive on the surface (including the flat, curved and spherical ones) onto a mold with curvature determined based on the glass/mirror. The deviation between the curvature radius of the mold and the one of the glass/mirror may range, for example, from 0 mm to 100 mm. Fix the ECD onto another special mold which curvature is designed based on the mirror/glass. The deviation between the curvature radius of the mold and the one of the glass/mirror may range, for example, from 0 mm to 500 mm. The mold with the ECD and the one with the mirror/glass with the adhesive on the surface are separated and held by a machine to avoid any contact before the pressing process starts. After the vacuum reaches the set number, normally more than 95%, the mold with the adhesive is pressed onto the glass/mirror held by the other mold for 5 s-15 min. During the pressing process, the pressure applied may range, for example, from 1 kPa to 1000 kPa.

Figure 20:
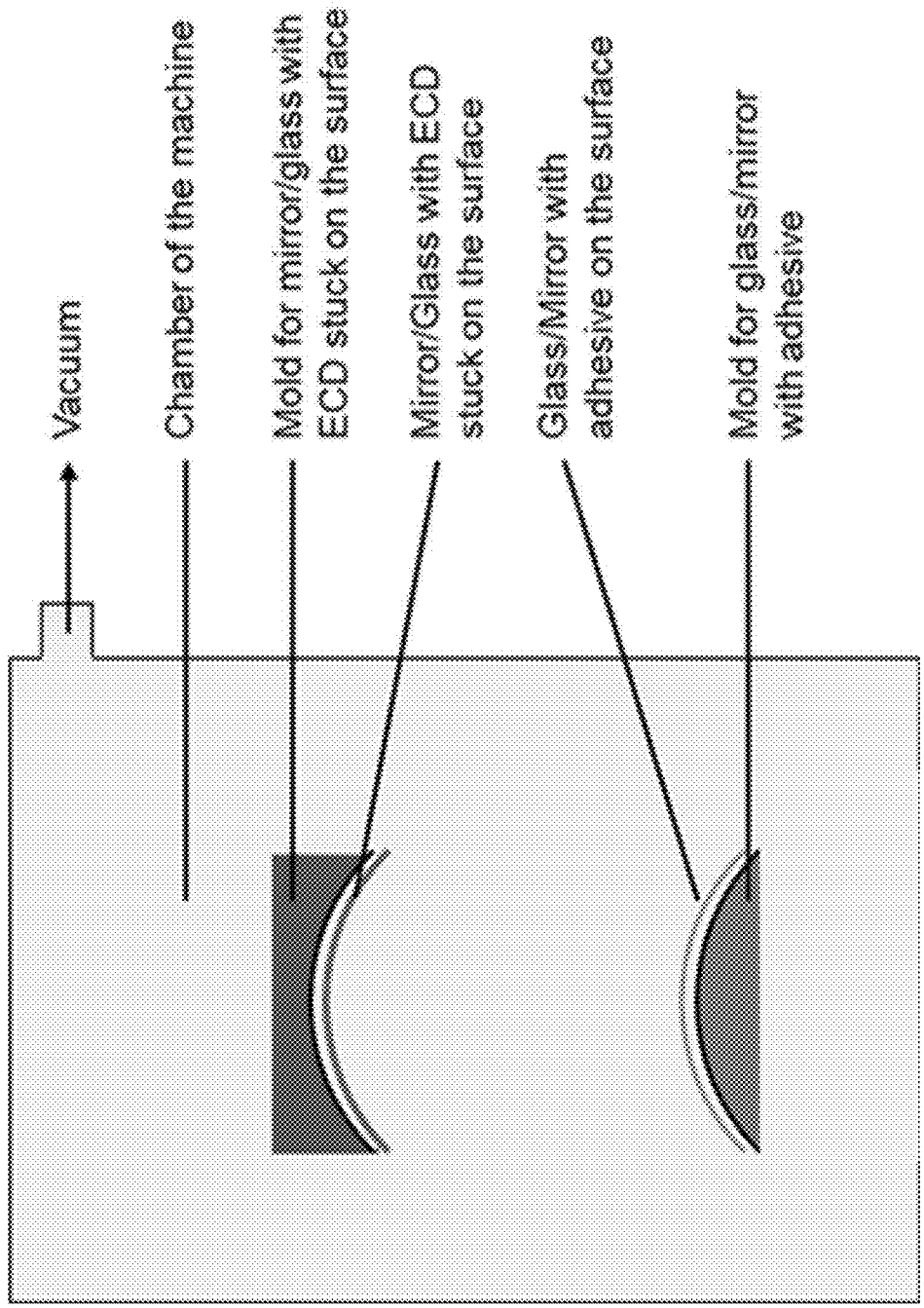
FIG. 20 is a diagram showing another process scheme for forming a rearview mirror according to one example embodiment.

4. Pack the two half cells together: FIG. 20 is a diagram showing another process scheme for forming a rearview mirror according to one example embodiment. One half-cell is made via step 1 and the other one is made via step 2. For this step, the two half cells may be packed together via different methods, including but not be limited to pressing with or without heating and with or without vacuum. Fix the glass or mirror with adhesive on the surface (including the flat, curved and spherical ones) of a mold which curvature is determined based on the glass/mirror. The deviation between the curvature radius of the mold and the one of the glass/mirror may range from 0 mm to 100 mm. Fix the mirror/glass with ECD stuck on the surface of another special mold which curvature is also designed based on the mirror/glass. The deviation between the curvature radius of the mold and the one of the glass/mirror may range from 0 mm to 500 mm. The mold with the adhesive and the one with the mirror/glass are separated and held by a machine to avoid any contact before the pressing process. After the vacuum reaches the set number, normally more than 95%, the mold with the adhesive is pressed onto the glass/mirror held by the other mold for 5 second to 15 minutes. During the pressing process, the pressure applied is normally 1 kPa- to 1000 kPa.

5. Encapsulate the edge with proper sealant: This step can be done after the first 4 steps (described in step 5.1) or it can be integrated into one of them depending on the various aspects, including the properties of the sealant, of the edge of the glass (described in 5.2). If the viscosity of the sealant is low, normally range from 100 cps to 10,000 cps, method 5.1 is adopted. When the viscosity of the sealant is very high, normally range from 100,000 cps to 2,000,000 cps, then method 5.2 is adopted. When the viscosity is in the middle (neither too high nor too low), then either method can be used.

Figure 21:
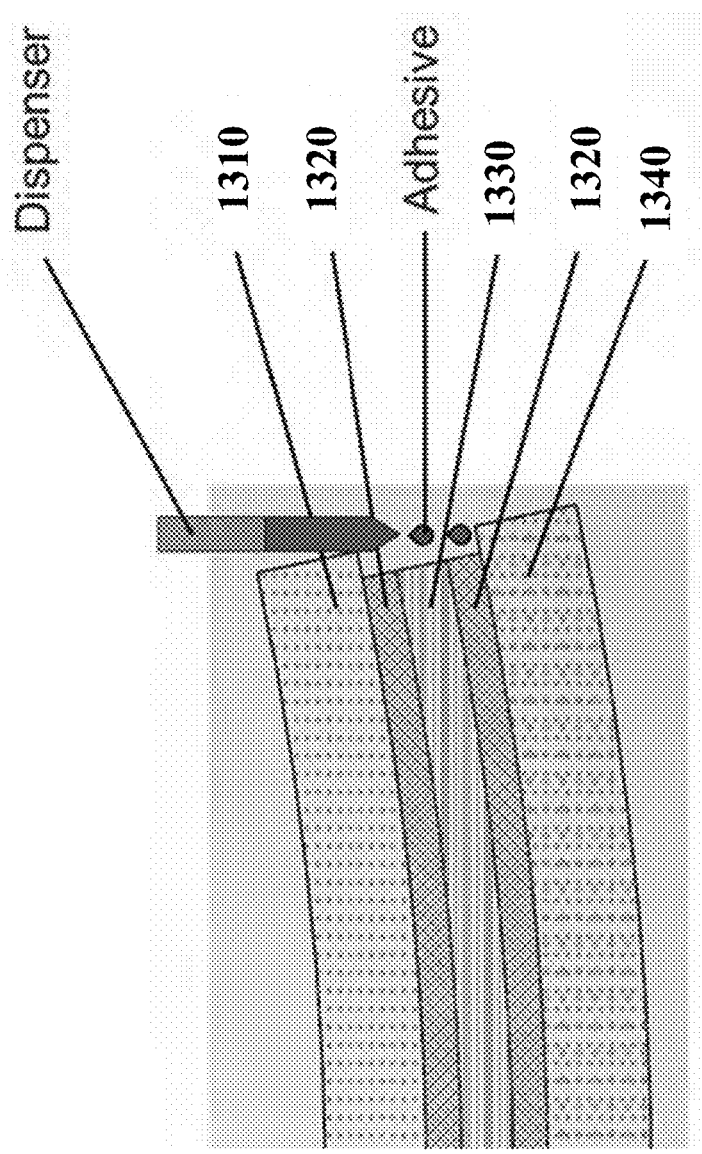
FIG. 21 is a schematic diagram showing a sealing process for forming a rearview mirror, according to one example embodiment.

5.1 FIG. 21 is a schematic diagram showing a sealing process according to one example embodiment. As shown in FIG. 21, after the first four steps, encapsulant is evenly dripped onto the edge between the mirror 1310 and the glass 1340 by an appropriate machine including but not limited to glue dispenser, holt-melt adhesive dispenser, among others known in the arts. The amount of the encapsulant is well controlled to avoid bubbles and overflow. The flow rate may range, for example, from 0.001 mL/min to 50 mL/min. The flow rate is determined by the thickness and width of the encapsulant. The thickness of the encapsulant commonly ranges, for example, from 0.1 mm to 3 mm. The width of the encapsulant commonly ranges, for example, from 0.01 mm to 5 mm. The diameter of the dispenser needle may range, for example, from 0.01 mm to 5 mm. After being dispensed, the encapsulant is cured via an appropriate curing method, including but not limited to radiation (e.g. UV) curing, heat curing, moisture curing, among others known in the arts.

Figure 22A:
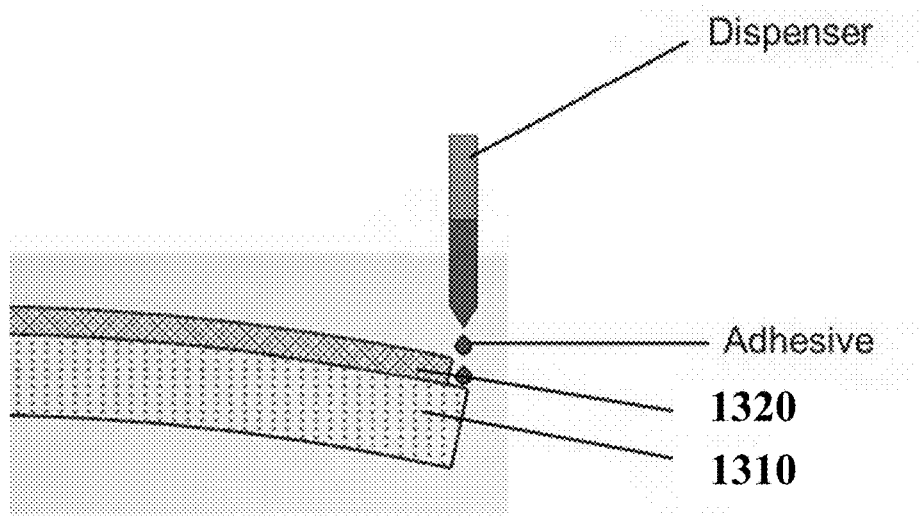
FIGS. 22A and 22B are schematic diagrams showing sealing processes for forming a rearview mirror, according to example embodiments.
Figure 22B:
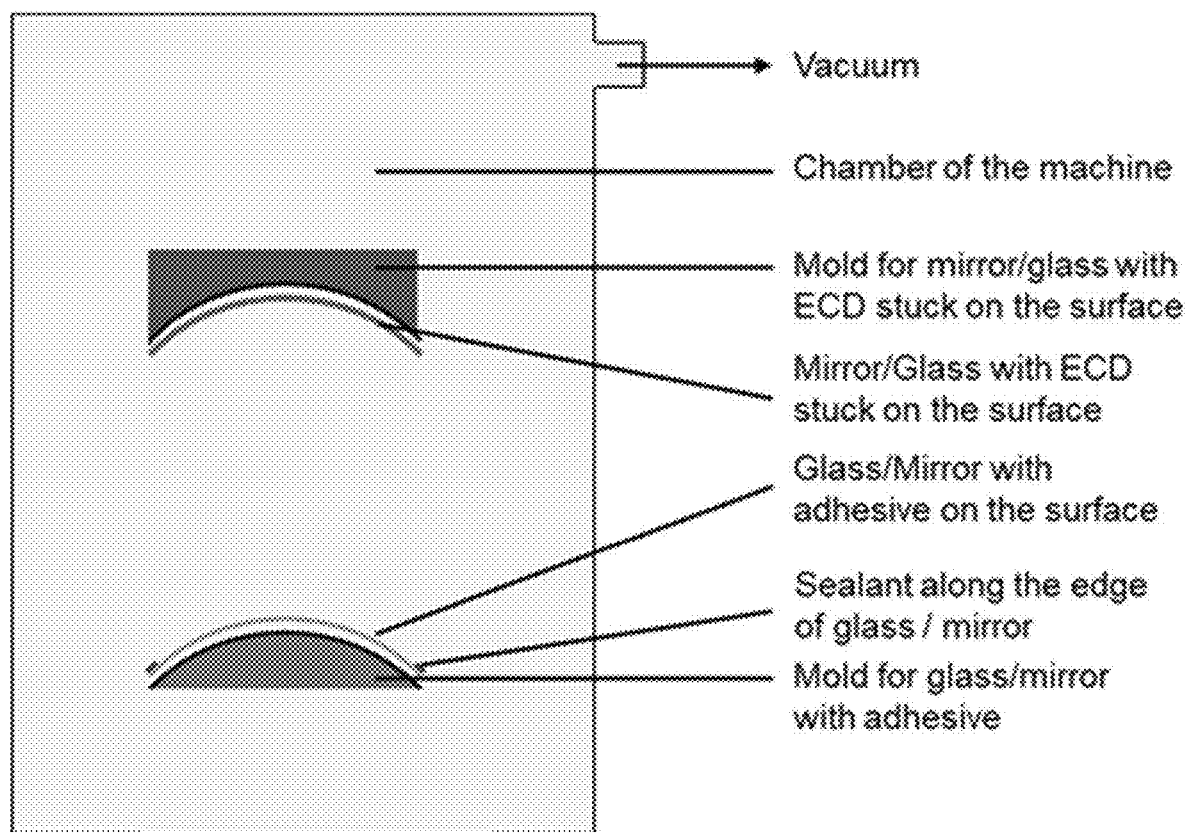
Figure 23:
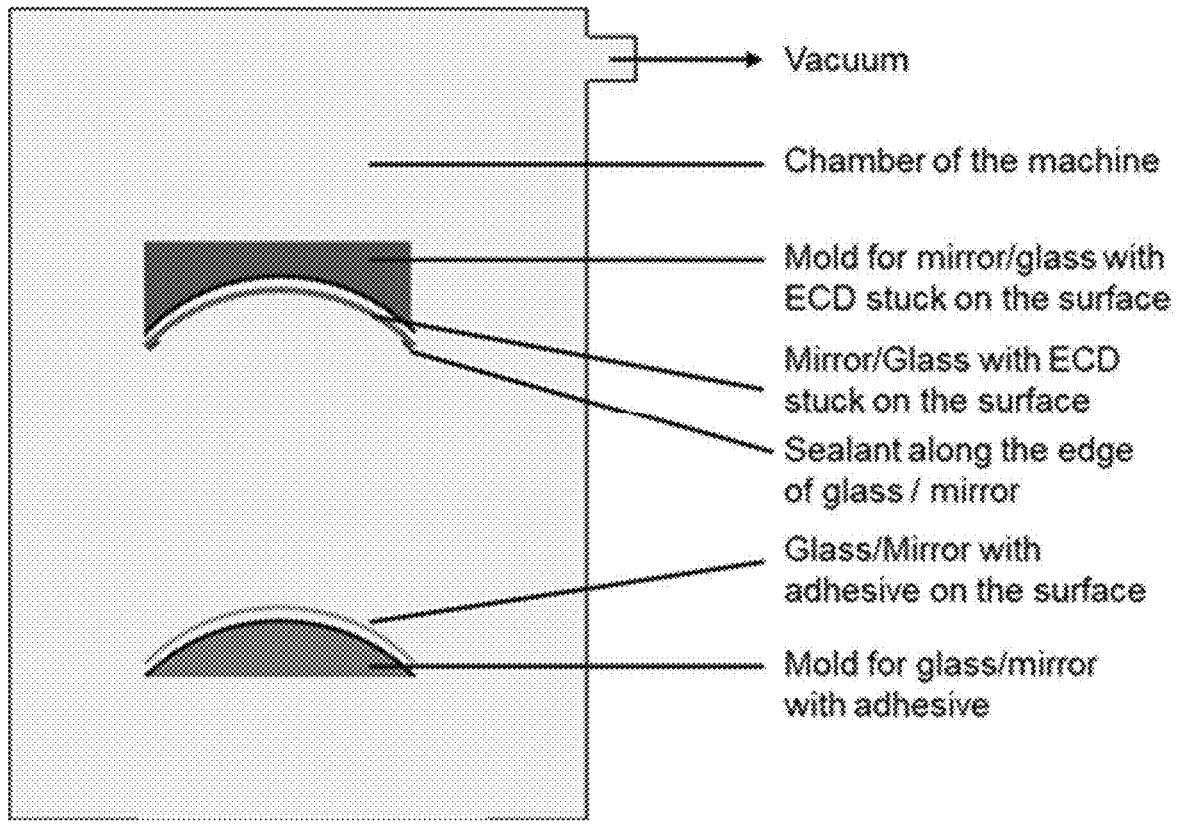
FIG. 23 is a schematic diagram showing another sealing process for forming a rearview mirror, according to one example embodiment.

5.2 The encapsulant dispensing can also be integrated into one of the step 2 to step 4. The encapsulant is evenly dripped onto the edge of the mirror or the glass by an appropriate machine including but not limited to glue dispenser, holt-melt adhesive dispenser, among others known in the arts. For example, as shown in FIGS. 22A and 22B, the encapsulant is dispensed after step 2 which means after the adhesive is adhered to the surface of glass/mirror, the encapsulant is distributed evenly along with edge of glass/mirror. Then the steps that follow step 2 can be performed. Another sample is shown in FIG. 23, the encapsulant is dispensed after step 3 which means after the ECD is adhered to the surface of glass/mirror, the encapsulant is distributed evenly along with edge of glass/mirror. Then the steps that follow step 3 can be performed.

Method B: Hot Melting Adhesives

1. Prepare the materials: Cut the adhesive and ECD into a desired shape and size with a die cutting machine or a laser machine or others known in the art. Set the right instrument parameters to ensure that the cutting process is performed smoothly. The thickness of the hot melting adhesives may range, for example, from 0.01 mm to 5 mm.

2. Thermoforming of the materials: To prepare a flat rearview mirror, this step is not necessary. When it comes to a curved rearview mirror, thermoforming is optional, but helpful to keep the ECD at a fixed shape to eliminate the defect possibility caused by the change of shape. To prepare a curved rearview mirror, the electrochromic thin film device is first thermally bent into a curved shape with a certain curvature in an oven at the temperature ranging from 50° C. to 200° C. for 5-30 min using a mold conforming to the shape and curvature of the curved surface. The radius for the curvature can range, for example, from 50 mm to infinity.

3. Stack the adhesive, mirror, glass together: Stack the adhesive, mirror and glass together layer by layer in an order shown in FIGS. 13A and 13B. Then melt and cure the adhesive. After this step, the five layers are integrated into one single piece.

4. Encapsulate the edge with sealant: this step can be performed by the same way as step 5 in method A.

Embodiment 8: Use Method a to Make a Curved EC Mirror with a Curvature Radius of 1200 mm 800. Prepare the materials with a laser machine. To cut an optical clear adhesive with a thickness of 100 μm, the moving speed of the laser machine is set to be 100 mm/s, laser power is set to be 10 W, and the frequency is set to be 100 Hz. The height of the laser over the adhesive layer is 0.2 cm.

810. Thermoforming step: Put the electrochromic thin film device into a customized mold (both upside and downside mold) with a curvature radius of 1200 mm, then set the temperature of the oven as 100° C. for 15 min, then take them out and cool down to the room temperature. The electrochromic thin film device is thermally bent into a curved shape with a certain curvature radius of 1200 mm.

820. Stick the adhesive to the glass (half-cell) with a rolling method: Fix the surface of the glass/mirror on the special fixture of the rolling platform with a mold made by polyurethane. The mold is customized with a curvature radius of 1200 mm which is the same as the glass/mirror. The Shore hardness of the mold is 85. Align the edge of the transparent adhesive (with a thickness of 150 μm) with the edge of the glass (with the thickness of 1.1 mm). The transparent adhesive and the surface of the glass are pressed by a roller made by rubber with the same curvature as the one from the glass. The Shore hardness of the roller is 65. During the rolling process, the pressure applied on the adhesive layer and glass/mirror is 1 kPa.

830. Stick the ECD to the mirror (half-cell) with a rolling method: Fix the mirror with adhesive on the surface of the special fixture from the rolling platform with a mold which is made by polyurethane and is customized with the curvature radius of 1200 mm. The Shore hardness of the mold is 85. Align the edge of the ECD with the edge of the transparent adhesive, then the ECD and the adhesive on the surface of the mirror are pressed by a roller made by rubber with the curvature radius of 1200 mm. The Shore hardness of the roller is 65. During the rolling process, the pressure applied on the adhesive layer and glass/mirror is 10 kPa.

840. Pack the two half cells together: Fix the glass with adhesive on the surface of a mold with the curvature radius of 1250 mm. Fix the mirror with ECD on the surface of another special mold with a curvature radius of 1150 mm. The mold with the adhesive and the one with the mirror/glass are separated and held by a machine to avoid any contact before the pressing process. After vacuum reaches 99.5%, the mold with the adhesive is pressed onto the glass/mirror held by the other mold for 1 min. During the pressing process, pressure applied is 100 kPa.

850. Encapsulate the edge with UV curing sealant: UV curing encapsulant is evenly dripped onto the edge between the mirror and the glass by a glue dispenser. The flow rate is 0.5 mL/min and the diameter of the dispenser needle is 0.5 mm. After dispensing, the encapsulant is cured via UV curing, with an energy of 2000 mJ/cm².

Embodiment 9: Use Method a to Make a Curved EC Mirror with a Curvature Radius of 1200 mm

900. Prepare the materials with a laser machine. The same as Embodiment 8.

910. Stick the adhesive to the glass/mirror (half-cell) with a vertical pressing method: Fix the glass onto a mold which curvature radius is 1250 mm. Fix the adhesive onto another special mold which curvature radius is 1150 mm. The mold with the adhesive and the one with the glass are separated and held by a machine to avoid any contact before the pressing process. After vacuum reaches more than 99.5%, the mold with the adhesive is pressed onto the glass/mirror held by the other mold for 30 s. During the pressing process, pressure applied is 100 kPa.

920. Stick the ECD to the mirror (half-cell) with a vertical pressing method: Fix the mirror with adhesive on the surface onto a mold which curvature radius is 1250 mm. Fix the ECD onto another special mold which curvature radius is 1150 mm. The mold with the ECD and the one with the mirror with adhesive on the surface are separated and held by a machine to avoid any contact before the pressing process. After vacuum reaches more than 99.5%, the mold with the adhesive is pressed onto the mirror held by the other mold for 30 s. During the pressing process, pressure applied is 100 kPa.

930. Pack the two half cells together: The same as embodiment 8.

940. Encapsulate the edge with UV curing sealant: The same as embodiment 8.

Embodiment 10: Make a Flat EC Mirror with Method B

1000. Prepare the materials with a die cutting machine. Set the parameters of a die cutting machine as follow to cut PVB: the customized mold is used which shape is determined based on the shape of the glass, the pressing power is set to be 5 t. The height of the mold over the adhesive layer is 1.0 cm.

1010. Stack the adhesive, mirror, glass together (FIG. 24) and put them into a hot-pressing machine which has the function of vacuum, heating and pressure. Set the vacuum as 99%, temperature of 140° C. and time for 30 min with a pressure of 6 bar. After this step, the 5 layers are combined.

1020. Encapsulate the edge with proper sealant: The same as embodiment 8.

Embodiment 11: Make a Curved EC Mirror with Method B

1100. Prepare the materials with a laser machine. Set the parameters of a laser machine as follow to cut PVB, the moving speed of the laser is 100 mm/s, power is 100 W, and the frequency is 100 Hz. The height of the laser over the adhesive layer is 0.5 cm.

1110. Thermoforming of the materials: Fix the PVB onto the customized mold with a curvature radius of 1200 mm. And put them together into an oven of 100° C. for 15 min. Then take them out and cool down to the room temperature. PVB has the same curvature as the mold.

1120. Stack the adhesive, mirror, glass together and then do the same as in 1010 of embodiment 10.

1130. Encapsulate the edge with proper sealant: The same as embodiment 1.

Figure 24:
FIG. 24 is a schematic diagram showing layer structures of an ECD rearview mirror, according to one example embodiment.

In some embodiments, in the structures shown in FIG. 24, a thickness of the glass and the mirror is about 0.5-1.8 mm; a thickness of the PVB/EVA adhesive is about 0.05-0.5 mm; as thickness of the ECD is about 0.1-1 mm.

In some embodiments, the techniques disclosed herein allows to form all solid-state flexible thin-film ECDs. Both electrochromic and ion-storage layers are deposited on the flexible plastic substrates to form thin films. The precursor of the electrolyte is coated on top of either thin film. Then, the other thin film is laminated on the top to form a laminated structure. The laminated structure is placed under the UV light or heated at 80-120° C. to induce the cross-linking of the precursor and form a solid-state electrolyte which further adheres the electrochromic and ion storage layer together. The pre-assembled thin-film ECDs can be then easily applied to different glass surfaces with different sizes and curvatures. Moreover, compared with the traditional glass-based ECDs with gel or liquid electrolytes, the ECDs are lighter without the need for the bulky sealing.

To overcome the disadvantages of the conventional ECDs, disclosed is a new configuration of an electrochromic rearview mirror that has a thin film ECD. In this thin film ECD, both electrochromic layers and ion storage layers are fabricated on flexible substrates such as polyethylene terephthalate (PET) substrates via a high-throughput processing method, e.g., roll-to-roll processing and laminated with the precursor of the electrolyte interposed therebetween. The precursor electrolyte is crosslinked via the UV irradiation or heating which forms solid-state electrolyte and further adheres the electrochromic and ion storage layer together to form a pre-assembled thin film device.

In some embodiments, both the electrochromic layers and ion storage layers are coated on flexible ITO/PET substrates via spray coating, or spin coating, or slot-die coating or any other solution compatible coating techniques now known or later developed, and then laminated with the precursor of the electrolyte in the middle through roll forming process at a temperature ranging from 20-100° C., a speed ranging from 0.1-5 m/min, and a pressure ranging from 0.01-5 MPa. The roller used in this process can be made of rubber, stainless steel, ceramic, aluminum, or any other materials that can sustain high temperature (200° C.) and pressure (10 MPa). The precursor of the electrolyte in the laminated thin film was cured through either UV light with energy ranging from 50-10000 mJ cm-2 or heating at 80-120° C. oven. The crosslinking of the electrolyte forms a solid-state electrolyte and adheres both the electrochromic and ion storage layer together, resulting in an all-solid state thin-film device. This as-assembled flexible solid-state thin film ECD can also be easily applied to fabricate other window-type devices and can easily transform any glasses with/without curvatures into electrochromic smart glasses.

In some embodiment, the electrochromic layer can be one of these materials: tungsten oxide (WO3), poly(decylviologen) and its derivatives, polyaniline and its derivatives, all kinds of electrochromic conjugated polymers such as polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and their copolymers, or their copolymers containing a certain ratio of acceptor units, such as benzothiadiazole, benzoselenadiazole, benzooxazole, benzotriazole, benzoimidazole, quinoxalines, and diketopyrrolopyrroles, and others now known or later developed. The electrochromic layer has the thicknesses of 1-1500 nm. The ion storage layer can be nitrioxyl based radical polymer, NiOx, PEDOT, etc. with thicknesses in the range of 1-1000 nm.

These techniques provide an easy way to fabricate flat and curved auto-dimming rearview mirrors with solid-state flexible thin film ECDs. Compared with the conventional materials and encapsulation methods, the all-solid-state ECDs are safer as nothing will leak when the glass is broken. Further, the transparent optical glue can help improve the explosion protection. In addition, the all-solid-state ECDs and the proposed processes make it possible to use thinner glass and mirror to help reduce the product weights.

The disclosed processes make the industrial production of the anti-glare rearview mirror more manufacturing friendly and cost efficient with improved production yield and reduced waste and defect rate.

Other than anti-glare rearview mirrors disclosed in this disclosure, the pre-assembled flexible solid-state thin film ECD can also be easily applied to fabricate other window-type devices and can easily transform any glasses with/without curvatures into electrochromic smart glasses.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An electrochromic apparatus, comprising:
   a first glass;
   a first adhesive layer disposed on the first glass;
   a second glass;
   a second adhesive layer disposed on the second glass;
   a solid-state electrochromic device (ECD) interposed between the first adhesive layer and the second adhesive layer, wherein the solid-state electrochromic device comprises a solid electrolyte layer containing solid electrolyte polymers having a polymer backbone structure that includes no amine group, wherein the solid electrolyte polymers include:
   (a) ion conducting polymers copolymerized with monomers or oligomers, wherein the monomers or the oligomers have plasticizing moieties as a side chain;
   (b) ion conducting polymers covalently linked with plasticizing linear polymers that have a glass transition temperature less than −20° C.;
   (c) ion conducting polymers covalently linked with plasticizing polymer blocks that have plasticizing groups as side chains; or
   (d) brush copolymers with side chains of one or more ion-conducting species and one or more non-miscible groups; and
   a sealant disposed at edges of the first glass and the second glass to seal the ECD, the first adhesive layer and the second adhesive layer being disposed between the first glass and the second glass,
   wherein,
   the first adhesive layer and the second adhesive layer are optically transparent;
   edges of the first adhesive layer and the second adhesive layer are flush with or beyond edges of the ECD; and
   the sealant is adhesive and waterproof.

2. The electrochromic apparatus of claim 1, wherein one surface of the second glass has a reflective layer.

3. The electrochromic apparatus of claim 1, wherein the first adhesive layer and the second adhesive layer include one or more of liquid optical clear adhesives, resin optical clear adhesives, solid optical adhesives, and hot melting adhesives.

4. The electrochromic apparatus of claim 3, wherein the hot melting adhesives include one or more of an ethylene vinyl acetate membrane, and a polyvinyl butyral membrane.

5. The electrochromic apparatus of claim 1, wherein the sealant includes one or more of butyl rubber, epoxy rubber, polyurethane, and acrylic.

6. The electrochromic apparatus of claim 2, wherein the reflective layer is made by one or more of a pure metal, an alloy, a non-metallic material, and a hybrid material.

7. The electrochromic apparatus of claim 1, wherein the solid-state electrochromic device further comprises
   a first flexible substrate;
   a first transparent electrode disposed on the first flexible substrate;
   an electrochromic layer disposed on the first transparent electrode, wherein the solid electrolyte layer is disposed on the electrochromic layer;
   an ion storage layer disposed on the solid electrolyte layer;
   a second transparent electrode disposed on the ion storage layer; and
   a second flexible substrate disposed on the second transparent electrode.

8. The electrochromic apparatus of claim 7, wherein the first flexible substrate and the second flexible substrate include one of polyethylene terephthalate, cyclic olefin copolymer, or triacetate cellulose.

9. The electrochromic apparatus of claim 7, wherein the first transparent electrode and the second transparent electrode include indium-tin oxide (ITO), aluminum zinc oxide (AZO), fluorine doped tin oxide (FTO), silver nanowires, graphene, carbon nanotube, metal mesh based transparent conductive electrodes, or silver-nanoparticle ink.

10. The electrochromic apparatus of claim 7, wherein the ion storage layer includes one or more oxides of metal elements in Group 4-12, or a mixture of the oxides, or one of the oxides doped by any other metal oxides.

11. The electrochromic apparatus of claim 10, wherein the metal oxides include the oxides of Ti, V, Nb, Ta, Cr, Mo, W, Mn, Fe, Co, Ir, Ni, Cu, or Zn.

12. The electrochromic apparatus of claim 7, wherein the ion storage layer includes a transition-metal complex.

13. The electrochromic apparatus of claim 7, wherein the ion storage layer includes one or more of redox-active polymers including redox active nitroxyl or galvinoxyl radical polymers, or conjugated polymers.

14. The electrochromic apparatus of claim 7, wherein the electrochromic layer includes one or more of WO3, poly (decylviologen) and its derivatives, polyaniline and its derivatives, electrochromic conjugated polymers including polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and copolymers thereof, or the copolymers containing acceptor units including benzothiadiazole, benzoselenadiazole, benzooxazole, benzotriazole, benzoimidazole, quinoxalines, or diketopyrrolopyrroles.

15. A method for preparing the electrochromic apparatus of claim 1, comprising:
   applying the first adhesive layer to the first glass to form a first half-cell and applying the second adhesive layer to the second glass to form a second half-cell;
   sticking the ECD to the first half-cell to form an ECD-first half cell;
   packing the ECD-first half cell and the second half-cell together;
   applying the sealant to the ECD-first half cell or the second half-cell; and
   curing the sealant to form the electrochromic apparatus.

16. The method of claim 15, wherein applying the sealant to the ECD-first half cell or the second half-cell comprises:
   (a) applying the sealant to an end portion between the first glass and the second glass; or
   (b) applying the sealant to edges of one or both the ECD-first half cell and the second half-cell.

17. A method for preparing the electrochromic apparatus of claim 1, comprising:
   stacking the first glass, the first adhesive layer, the ECD the second adhesive layer, and the second glass together layer by layer in a certain order;
   dripping the sealant to an end portion between the first glass and the second glass; and
   curing the sealant to form the electrochromic apparatus.

18. The method of claim 17, further comprising cutting the first adhesive layer, the second adhesive layer, and the ECD into predetermined shapes.

19. The method of claim 17, further comprising thermally bending the ECD into a curved shape in an oven.

* * * * *